(12) United States Patent
Easterbrook

(10) Patent No.: US 7,047,786 B2
(45) Date of Patent: *May 23, 2006

(54) METHOD AND APPARATUS FOR IMPROVING THE FATIGUE LIFE OF COMPONENTS AND STRUCTURES

(75) Inventor: Eric T. Easterbrook, Kent, WA (US)

(73) Assignee: Stresswave, Inc., Kent, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 10/066,408

(22) Filed: Jan. 30, 2002

(65) Prior Publication Data

US 2002/0148270 A1    Oct. 17, 2002

Related U.S. Application Data

(63) Continuation-in-part of application No. 09/858,325, filed on May 15, 2001, now Pat. No. 6,615,636, which is a continuation-in-part of application No. 09/668,769, filed on Sep. 22, 2000, now Pat. No. 6,711,928, which is a continuation-in-part of application No. 09/401,065, filed on Sep. 22, 1999, now Pat. No. 6,230,537, which is a continuation-in-part of application No. 09/270,428, filed on Mar. 16, 1999, now Pat. No. 6,389,865.

(60) Provisional application No. 60/078,356, filed on Mar. 17, 1998.

(51) Int. Cl.
*B21D 28/26* (2006.01)
*B21D 31/00* (2006.01)

(52) U.S. Cl. ............................. 72/334; 72/412; 72/377

(58) Field of Classification Search ................ 72/334, 72/407, 412, 416, 355.2, 355.6, 377
See application file for complete search history.

(56) References Cited

U.S. PATENT DOCUMENTS

| 2,377,558 | A |   | 6/1945  | Johnson  |          |
|-----------|---|---|---------|----------|----------|
| 2,697,953 | A | * | 12/1954 | Chapman  | 72/356   |
| 2,810,191 | A | * | 10/1957 | Hanna    | 72/340   |
| 2,909,281 | A |   | 10/1959 | Koskinen |          |

(Continued)

FOREIGN PATENT DOCUMENTS

CA    2121120    *    5/1993

(Continued)

OTHER PUBLICATIONS

** "Analysis of Stress and Deformation" Introduction To Contact Mechanics, Elastic Indentation Stress Fields, Chapter 5, pp. 116-117.(Not Prior Art Based on Date).

(Continued)

*Primary Examiner*—Daniel C. Crane
(74) *Attorney, Agent, or Firm*—R. Reams Goodloe, Jr.

(57) ABSTRACT

Metal cold-working tooling and a method of employing such tooling. The tooling is used to produce deformation in a workpiece, to provide a selected beneficial residual stress profile in the workpiece, in order to provide high fatigue life structures in a minimum number of manufacturing steps. An indenter is used to coldwork a workpiece, causing dimples in the workpiece. Preferably, the dimples are provided with a shape formed by application of a uniform pressure profile to the workpiece surface. As optimized, a relatively uniform beneficial residual stress profile is provided at both the surface and at the midplane apertures in a workpiece, so as to improve overall fatigue life. Also, an improved indenter tool profile shape is described, having a smoothly curved indenter surface portion. And, the use of consumable lamina wafers provides the benefit of easy application of uniform stress profile to a workpiece.

56 Claims, 43 Drawing Sheets

U.S. PATENT DOCUMENTS

| | | | |
|---|---|---|---|
| 3,110,086 A * | 11/1963 | Phillips | 29/897.1 |
| 3,270,410 A * | 9/1966 | Salter | 29/446 |
| 3,412,593 A | 11/1968 | Price | |
| 3,434,327 A | 3/1969 | Speakman | |
| 3,520,418 A | 7/1970 | Guinard | |
| 3,551,015 A | 12/1970 | Whiteside et al. | |
| 3,646,791 A | 3/1972 | Leftheris | |
| 3,673,833 A | 7/1972 | Cadwell | |
| 3,796,086 A | 3/1974 | Phillips | |
| 3,803,898 A | 4/1974 | Speakman | |
| 3,803,989 A * | 4/1974 | Kuckhermann et al. | 493/318 |
| 3,824,824 A | 7/1974 | Leftheris | |
| 3,895,922 A * | 7/1975 | Phillips | 428/596 |
| 3,945,109 A * | 3/1976 | Leftheris | 29/525 |
| 4,034,585 A | 7/1977 | Straub | |
| 4,091,260 A | 5/1978 | Leftheris et al. | |
| 4,129,028 A | 12/1978 | Leftheris | |
| 4,245,921 A * | 1/1981 | Falcioni | 403/408.1 |
| 4,248,075 A | 2/1981 | Whitley | |
| 4,417,463 A | 11/1983 | Nelson | |
| 4,423,619 A | 1/1984 | Champoux | |
| 4,493,141 A | 1/1985 | Krezak | |
| 4,711,115 A | 12/1987 | Sukonnik | |
| 4,771,627 A | 9/1988 | Speakman | |
| 4,836,705 A | 6/1989 | La Barge et al. | |
| 4,862,043 A | 8/1989 | Zieve | |
| 4,885,829 A | 12/1989 | Landy | |
| 4,918,970 A | 4/1990 | Ishinaga | |
| 4,934,170 A | 6/1990 | Easterbrook et al. | |
| 5,024,075 A | 6/1991 | Simonetto | |
| 5,059,059 A * | 10/1991 | Cox | 403/408.1 |
| 5,146,668 A | 9/1992 | Gulistan | |
| 5,398,537 A | 3/1995 | Michalewski et al. | |
| 5,746,085 A | 5/1998 | Harada et al. | |
| 5,755,133 A | 5/1998 | Hirai | |
| 5,771,729 A | 6/1998 | Bailey et al. | |
| 5,816,093 A | 10/1998 | Takeuchi et al. | |
| 5,841,033 A | 11/1998 | Burris et al. | |
| 5,943,897 A * | 8/1999 | Tsue et al. | 72/335 |

FOREIGN PATENT DOCUMENTS

| | | | |
|---|---|---|---|
| DE | 390726 | | 2/1924 |
| JP | 52-28087 | | 3/1977 |
| JP | 60-216931 | * | 10/1985 |
| JP | 60-216931 A | | 10/1985 |
| JP | 2-151321 | | 6/1990 |
| JP | 2-274414 | | 11/1990 |
| JP | 4-138824 | | 5/1992 |
| RU | 1808878 | * | 4/1993 |
| SU | 439330 | | 8/1974 |
| SU | 1648619 | * | 5/1991 |
| SU | 1648619 A1 | | 5/1991 |
| SU | 1808878 A1 | | 5/1991 |

OTHER PUBLICATIONS

** "The Propagation of Waves in Elastic Solid Media", S.P. Timoshenko and J.N. Goodier, Theory of Elasticity, Third Edition, Chapter 14, pp. 485-504.

** "Plastic Waves and Shock Waves", H. Kolsky, Stress Waves in Solids, Chapter VII, pp. 163-182.

** "Coining of Holes in Aluminum Plates: Finite Element Simulations and Experiments", Rutger Ogeman, Journal of Aircraft, vol. 29, No. 5, Sep.-Oct., 1992. pp. 947-952.

** "Extending the Fatigue Life of Aircraft Engine Components by Hole Cold Expansion Technology", Antonio C. Rufin, ASME, presented at International Gas Turbine and Aeroengine Congress and Exposition, Cologne, Germany, Jun. 1-4, 1992. (9 pages).

** "Fatigue Improvement by Sleeve Coldworking", Joseph L. Phillips, SAE, Inc., National Aerospace Engineering and Manufacturing Meeting, Los Angeles, California, Oct. 16-18, 1973. (13 pages).

** "The Latest Technology in Hole Finishing: Ballizing", Sid Grodsky, Final Finish Technology, Spring, 1988, pp. 10-18.

** "A Comparison of Two Manufacturers' Coldwork Tooling Systems: Does a Hole Recognize a Manufacturers' Part Number?", G. Rodman and M. Creager, West Coast Industries, (12 pages).

** "Shear Crack Issues Addressed by Split Mandrel and Automated Coldworking", Matthew Weigel, Anthony Leon, SAE Aerofast 1996 Conference, Bellevue Washington, Oct. 1-3, 1996 (9 pages).

** "Improvement of Fatigue Performance By Cold Hole Expansion. Part 1: Model of Fatigue Limit Improvement", V. Kliman, M. Bily and J. Prohacka, International Journal Fatigue, Mar. 1993, pp. 93-100.

** "Improvement of Fatigue Performance By Cold Hole Expansion. Part 2: Experimental Verification of Proposed Model", V. Kliman, M. Bily and J. Prohacka, International Journal Fatique, Mar. 1993, pp. 101-105.

** "Automated Applications For The Split Mandrel Coldworking System", West Coast Industries, Fatigue Tech-Notes, Split Mandrel Automation 1093, (5 pages).

** "The Effect of Interference on the Dimpled, Loaded-Hole Fatigue Strength of 2024-T3 Alclad® Aluminum Alloy", A.P. Kuc and J. Shewchuk, Journal of Testing and Evaluation, JTEVA, vol. 6, No. 3, May, 1978, pp. 157-166.

** "Stress Corrosion Susceptibility of Stress-Coined Fastener Holes in Aircraft Structures", A.E. Carter and S. Hanagud, AIAA Journal, vol. 13, No. 7, pp. 858-863.

** "Incorporating Hole Cold Expansion to Meet Durability and Damage Tolerance Airworthiness Objectives", L. Reid, Fatigue Technology Inc., #972624, (9 pages).

* cited by examiner

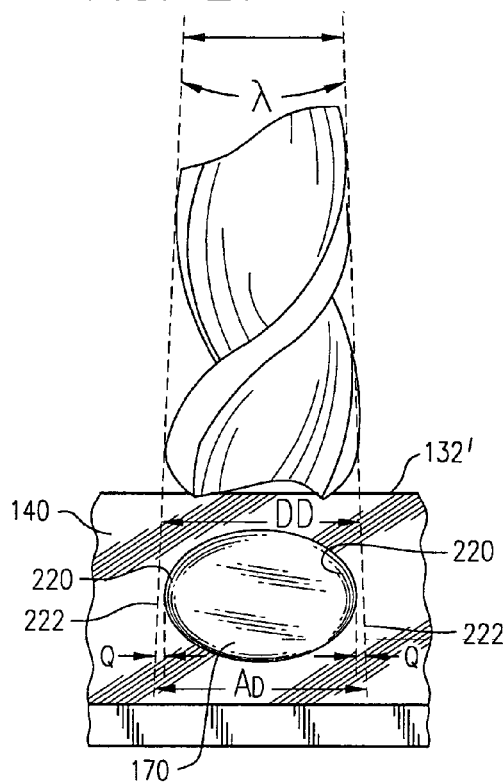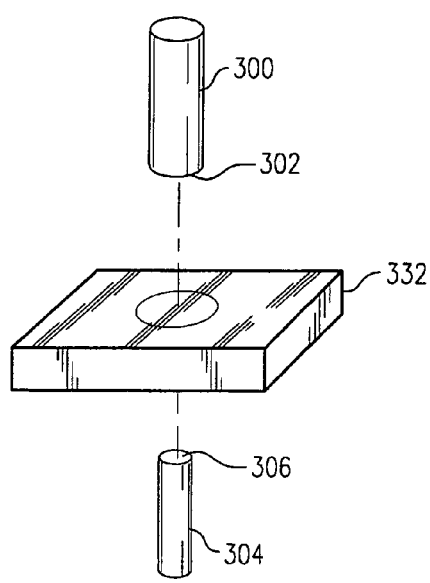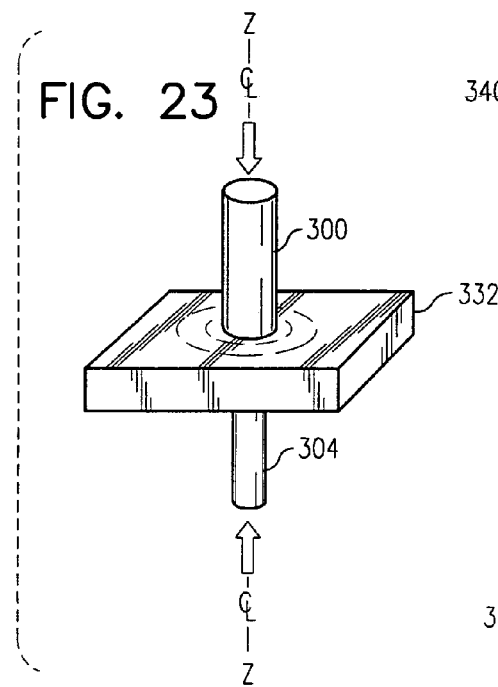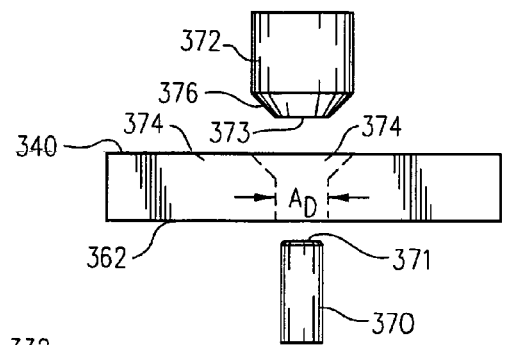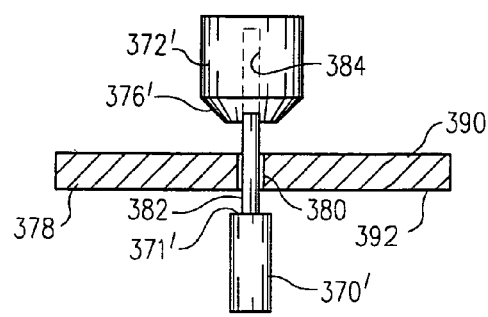

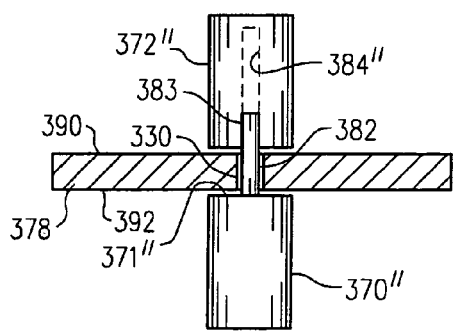
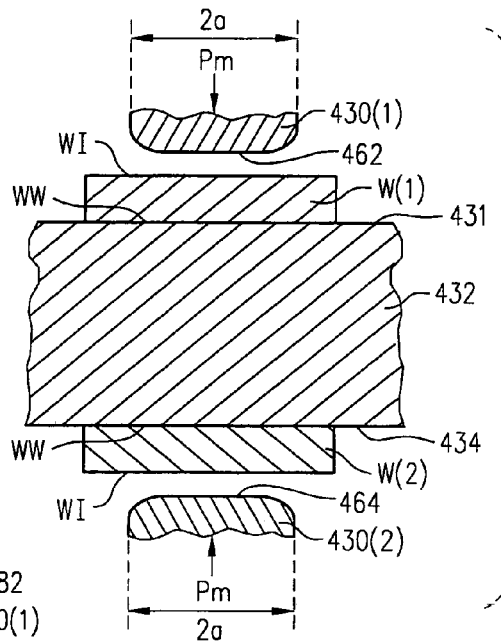
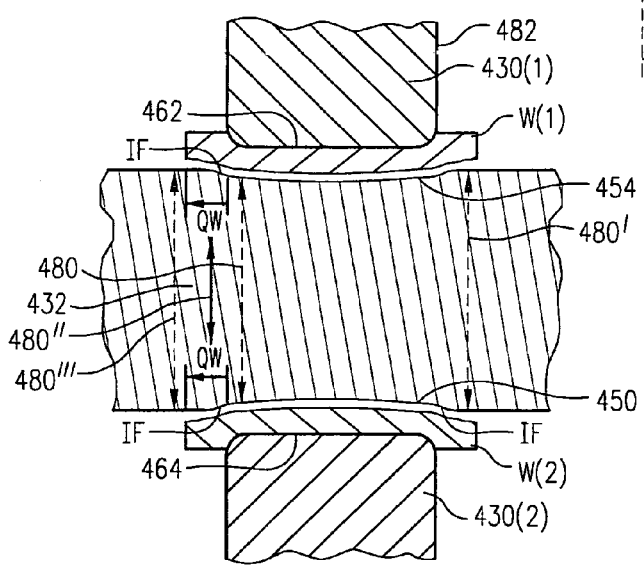
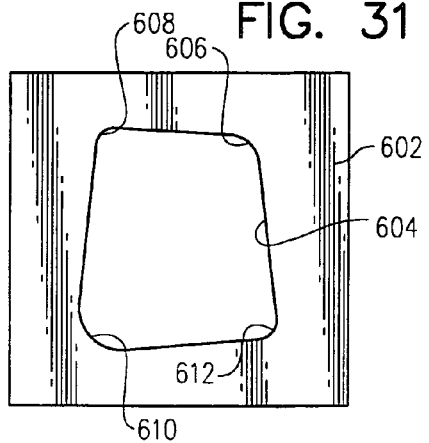
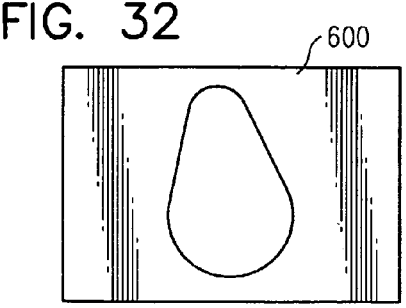

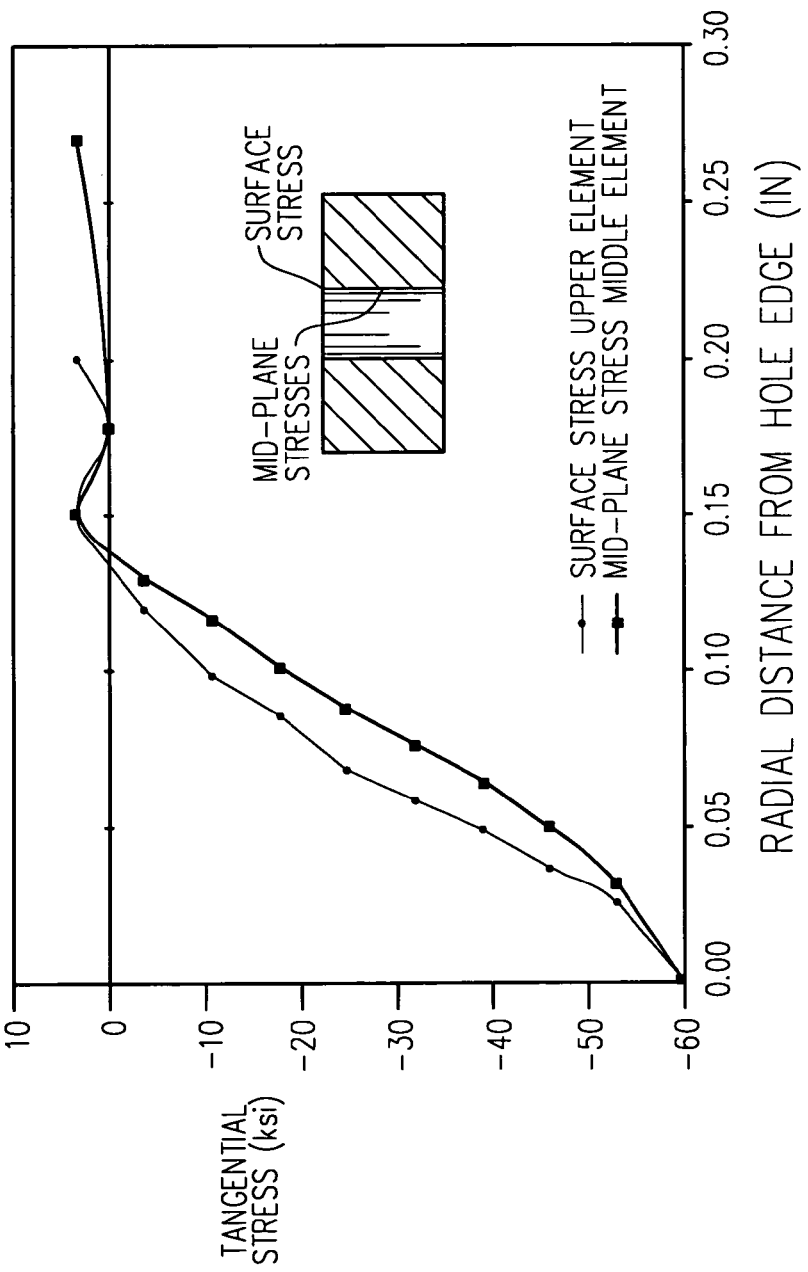

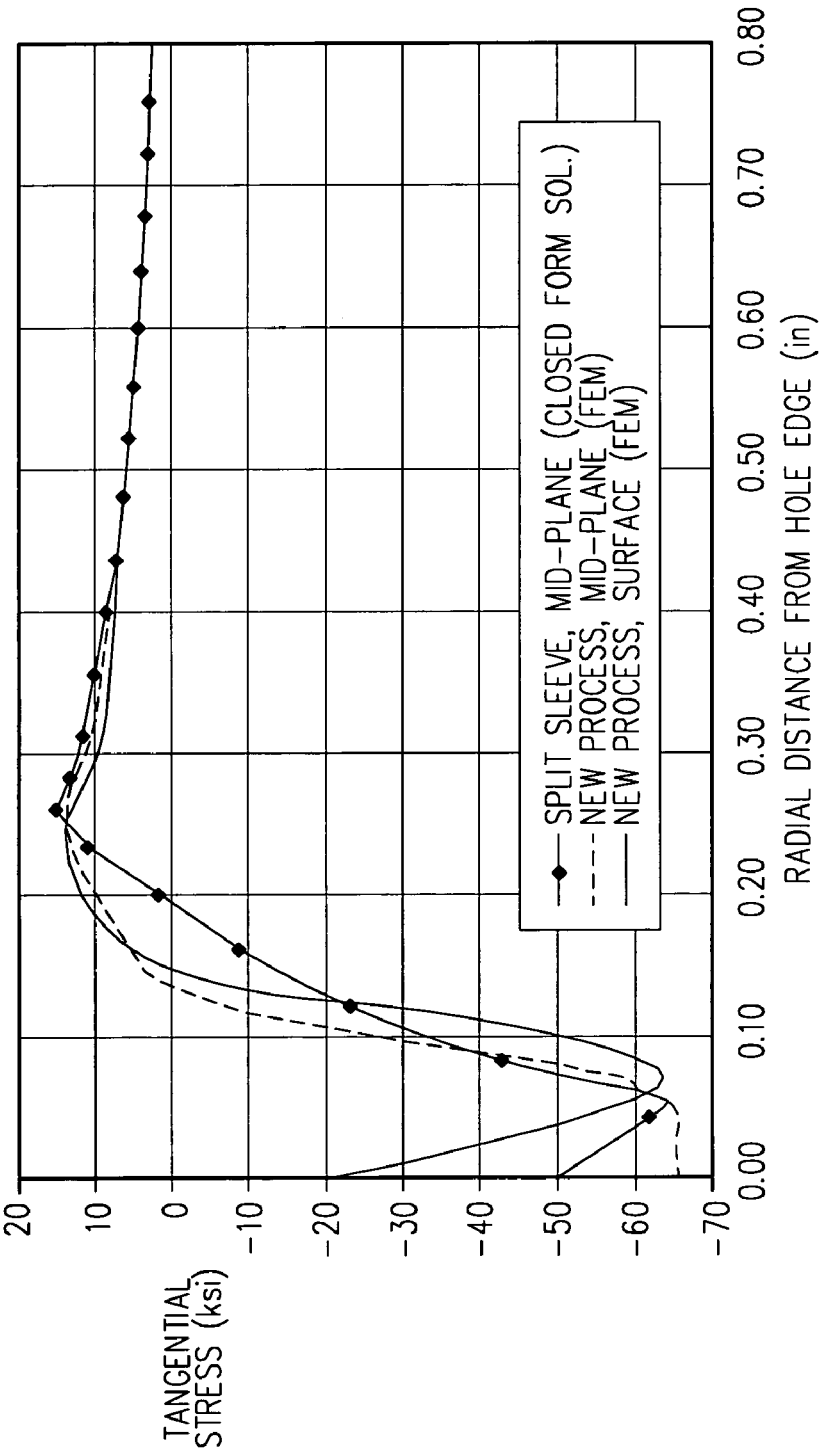

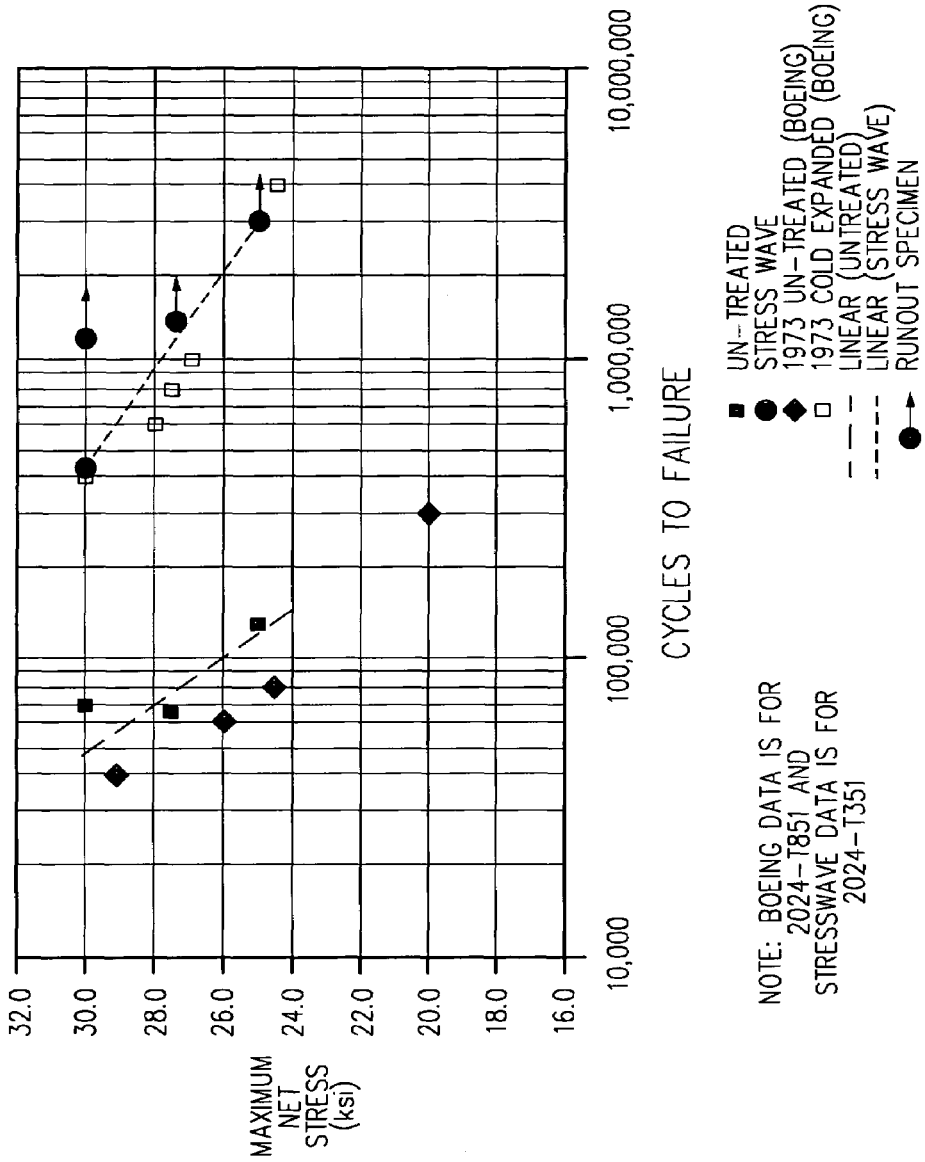

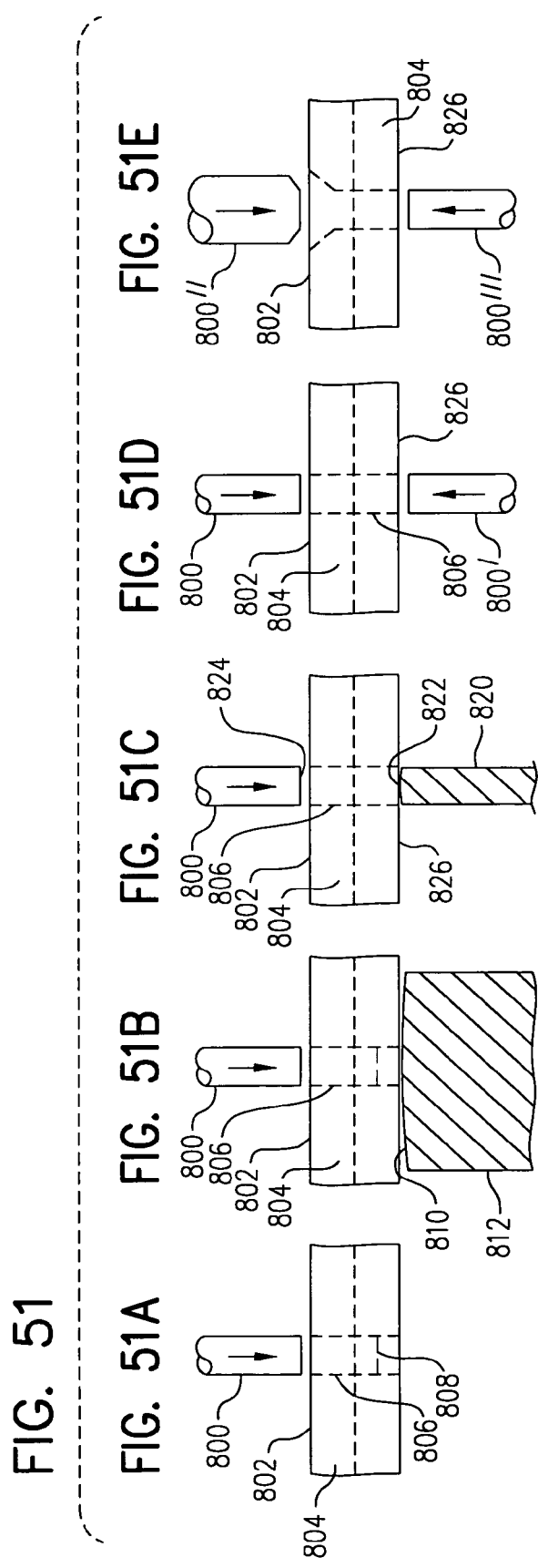

FINISHED DETAIL

TEMPORARY (TACK) FASTENER CONFIGURATION

SHAVE FASTENER HEAD OFF

ALIGN INDENTERS WITH TACK FASTENER CENTER

ACTUATE INDENTERS

DRILL TO BOLT DIAMETER

FINISHED TREATED HOLE

TREATMENT OF TUBULAR BAR
WITHOUT INTERNAL SUPPORT

SETUP STEP

PROCESSING

DRILL HOLE

FINAL CONFIGURATION

TREATMENT OF TUBULAR BAR
WITH INTERNAL SUPPORT

CROSS-SECTIONAL VIEW
OF PROCESSING STEP

LONGITUDINAL CROSS-SECTIONAL
VIEW OF PROCESSING STEP

TAPERED MANDREL WITH FLAT TO SUPPORT TUBE WHILE PROCESSING. MANDREL IS TAPERED ON BOTH ENDS TO FACILITATE INSERTION AND REMOVAL AND TO "RESHAPE" CROSS-SECTION AFTER PROCESSING.

CROSS SECTION OF HOLLOW TUBE
TREATED WITH INDENTER END SHAPE
THAT CONFORMS TO TUBE DIAMETER

TREATMENT OF SOLID BAR
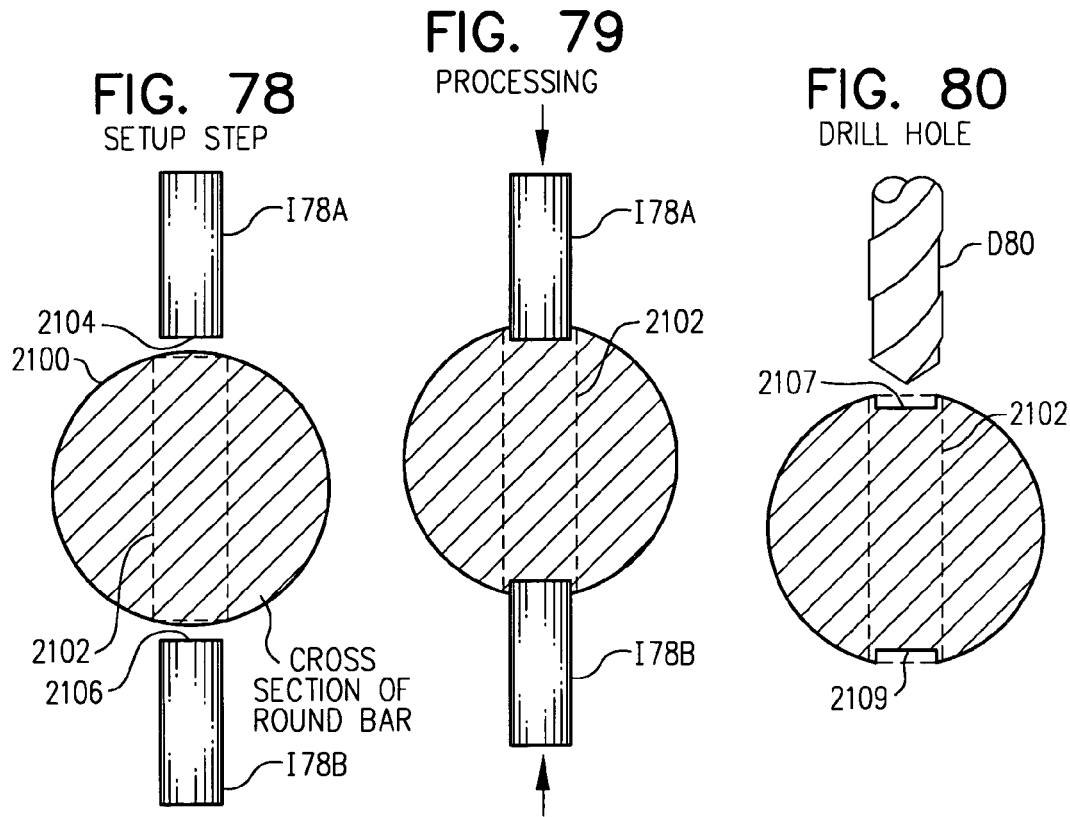
FIG. 78 SETUP STEP
FIG. 79 PROCESSING
FIG. 80 DRILL HOLE
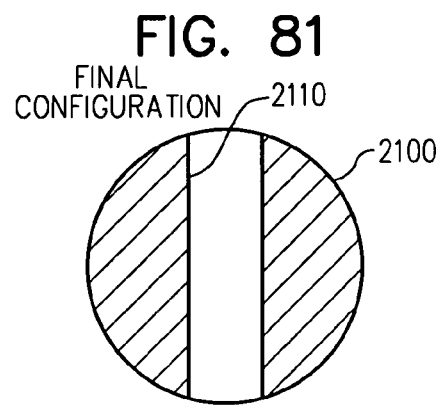
FIG. 81 FINAL CONFIGURATION
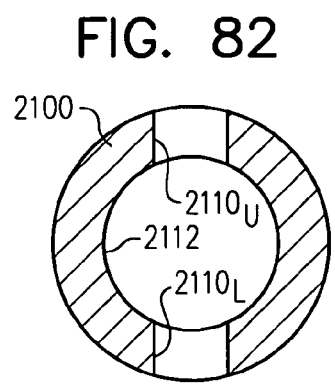
FIG. 82

TREATMENT OF AN INITIALLY OVERSIZED SOLID BAR

SETUP STEP

PROCESSING

DRILL HOLE

FINAL CONFIGURATION

TREATMENT OF AN INITIALLY OVERSIZED SOLID BAR
WITH OPPOSING "FLATS" TO FACILITATE TREATMENT

SETUP STEP

PROCESSING

DRILL HOLE

FINAL CONFIGURATION

TREATMENT OF A SOLID BAR WITH MILLED OR INTEGRAL "FLATS" TO FACILITATE THE PROCESS

SETUP STEP

PROCESSING

DRILL HOLE

FINAL CONFIGURATION

TREATMENT OF A STRUCTURE
WITH TWO TAPERED SURFACES

PROCESS SETUP STEP

DRILL

FINAL CONFIGURATION

PROCESS SETUP STEP

FINAL CONFIGURATION

PROCESS

DRILL HOLE

MACHINE OR TAP THREADS

ASSEMBLED CONNECTION

FINISHED HOLE

SIMULTANEOUS OR SEQUENTIAL TREATMENT
OF A PATTERN OF HOLES, ONE-SIDED
OR TWO-SIDED

SIMULTANEOUS OR SEQUENTIAL TREATMENT OF
A PATTERN OF HOLES, ONE-SIDED OR
TWO-SIDED WITH INTERNAL SUPPORT

TREATMENT OF A STEPPED HOLE

PROCESS LARGE DIAMETER

MACHINE LARGE HOLE DIAMETER

PROCESS SMALL DIAMETER

FINISHED PART AFTER SMALL DIAMETER MACHINED

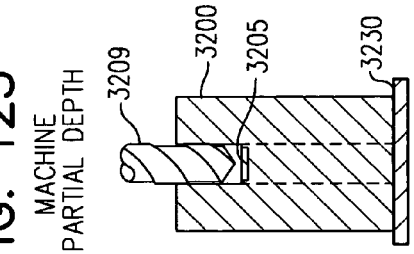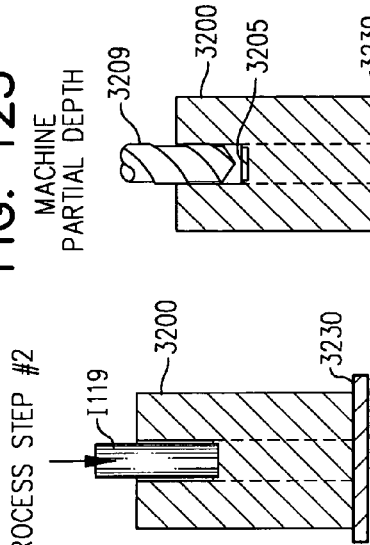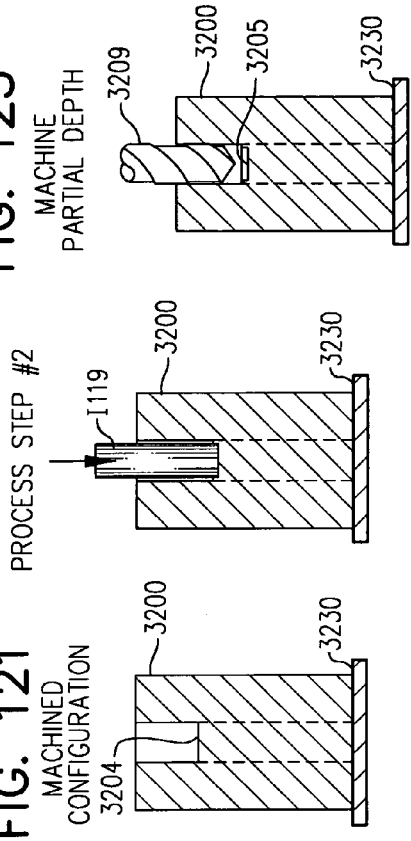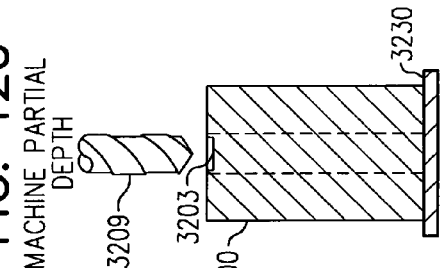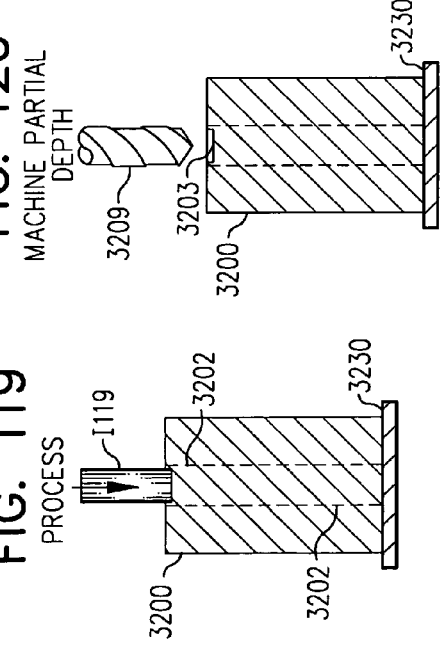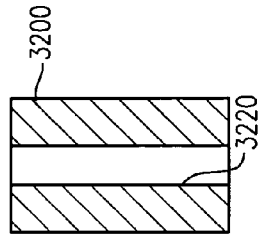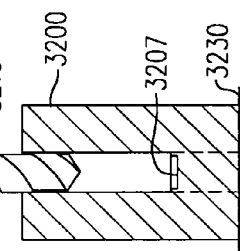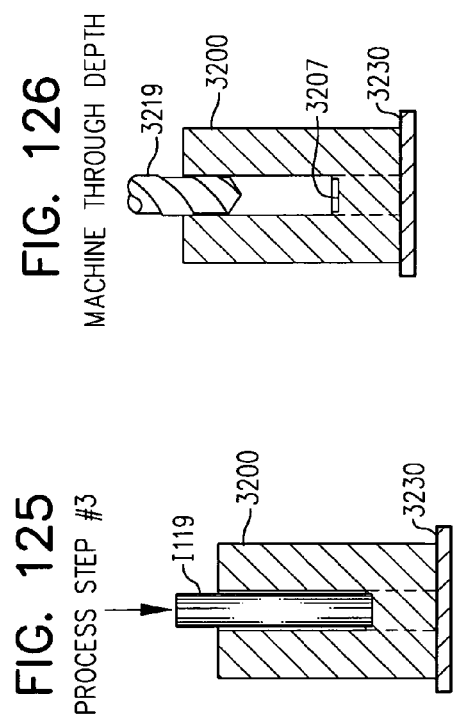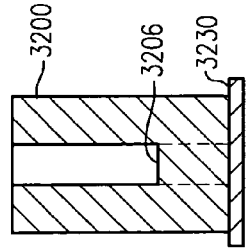

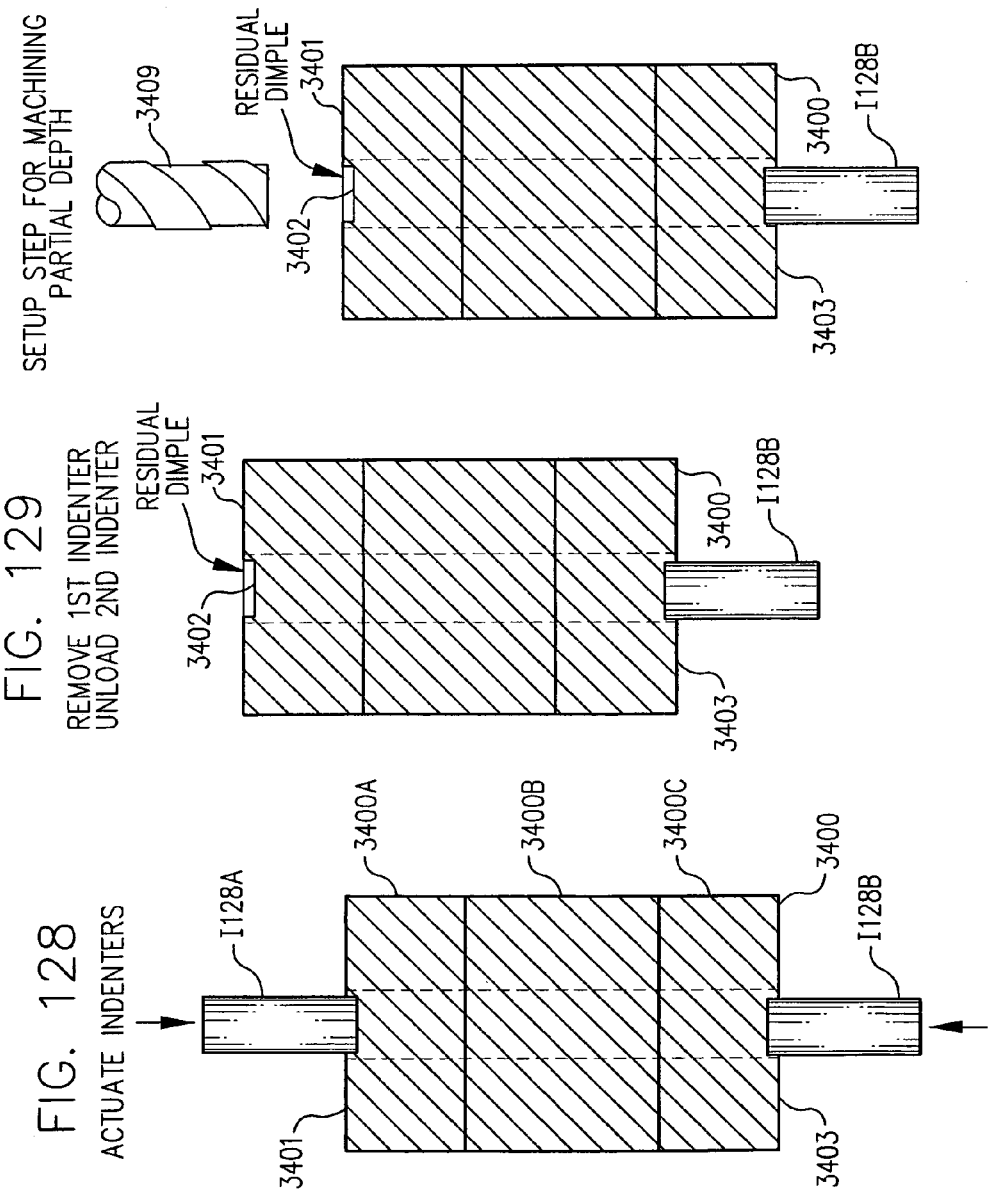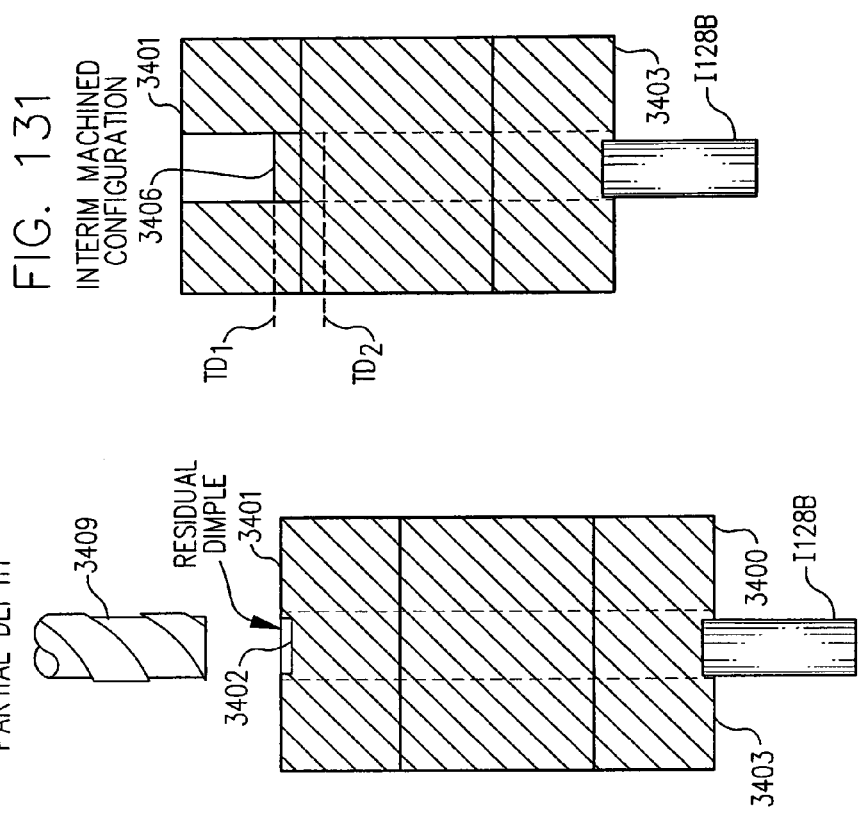

FINAL CONFIGURATION
NOTE: HOLE MAY HAVE
COUNTERSINK, COUNTERBORE,
STEP, OR OTHER FEATURE

FINAL MACHINE HOLE

RELEASE AND
REMOVE INDENTERS

PROCESS STEP #2
ACTUATE INDENTERS

FIG. 136
TREATMENT OF A SLOTTED STRUCTURE SUCH AS A GEAR OR DISK
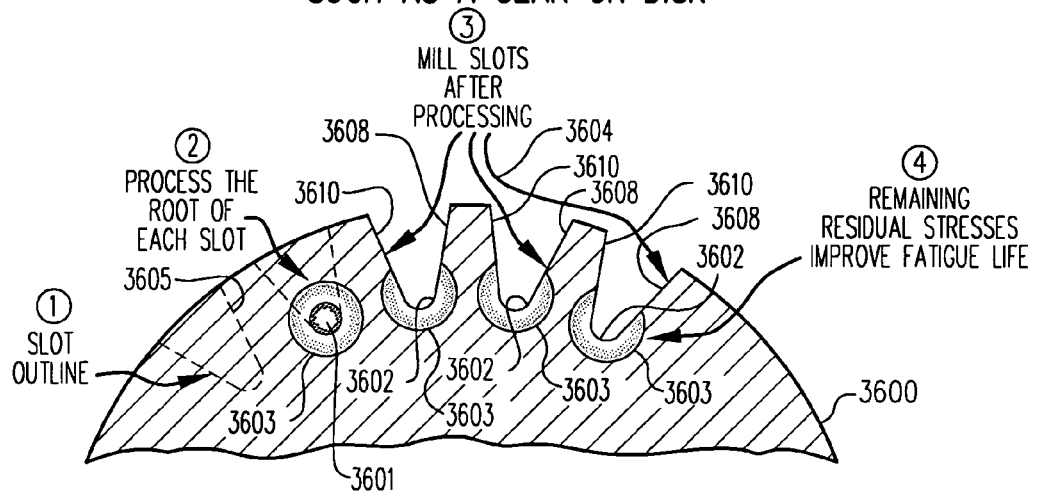
TREATMENT OF A ROUND APERTURE USING AN OVERLAPPING PATTERN OF DIMPLES AROUND THE PERIMETER
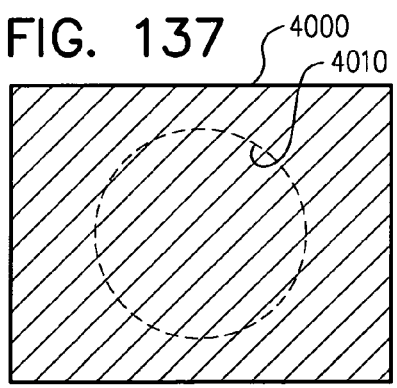
FIG. 137
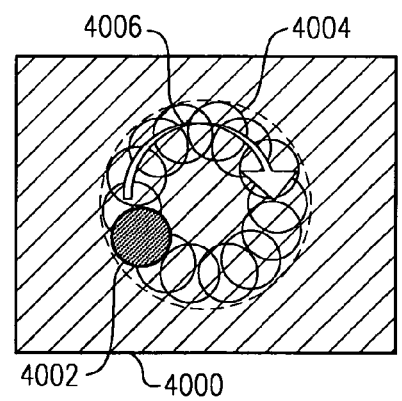
FIG. 138
FIG. 139
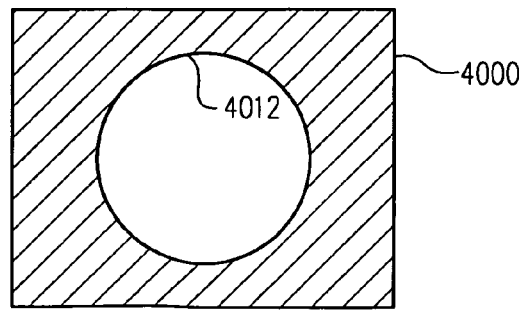

TREATMENT OF A NON-CIRCULAR APERTURE USING AN OVERLAPPING PATTERN OF DIMPLES AROUND THE PERIMETER

INDENTER END SHAPE USING FLAT, CHAMFERED AND CURVED PORTIONS FOR APPROXIMATING A UNIFORM PRESSURE PROFILE

INDENTER END SHAPE FOR APPROXIMATING A UNIFORM PRESSURE PROFILE WITH DRILL CENTER FEATURE

SETUP STEP FOR TWO INDENTER END STYLES WITH DRILL ALIGNING FEATURE. ONE CONICAL AND THE OTHER TRUNCATED CONE

ACTUATION OF INDENTERS INTO PART

CROSS SECTION OF DIMPLES AFTER TREATMENT AND INDENTER WITHDRAWAL

DRILL OUT HOLE, DRILL CENTERS ON DIMPLE

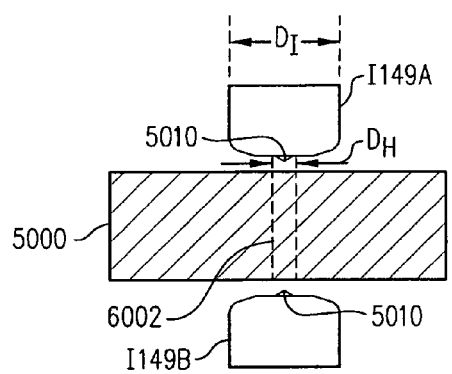

FIG. 149
SETUP STEP FOR TREATING PART WITH EXTRA THICKNESS USING INDENTERS MUCH LARGER THAN THE FINAL HOLE DIAMETER

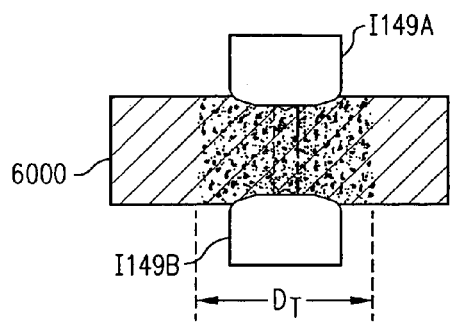

FIG. 150
ACTUATION OF INDENTERS INTO PART, EXTENT OF RESIDUAL STRESS WELL BEYOND THE FUTURE WALL OF THE SMALL DIAMETER HOLE

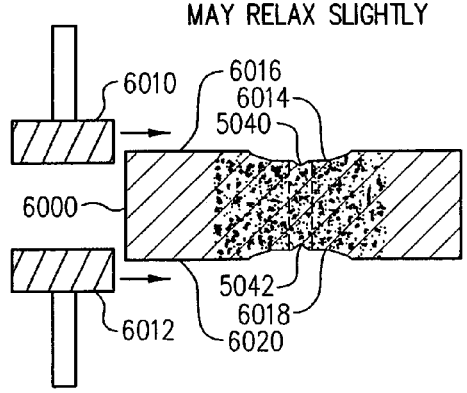

FIG. 151
MILL FRONT AND/OR BACK FACES OF STRUCTURE TO REMOVE DIMPLES-RESIDUAL STRESSES MAY RELAX SLIGHTLY

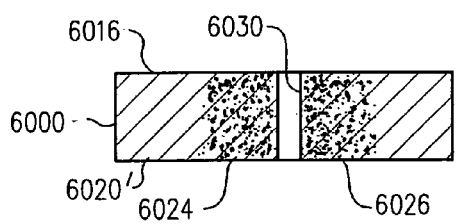

FIG. 152
DRILL OUT HOLE LEAVING LARGE ZONE OF COMPRESSIVE RESIDUAL STRESS

METHOD AND APPARATUS FOR IMPROVING THE FATIGUE LIFE OF COMPONENTS AND STRUCTURES

RELATED APPLICATIONS

This application is a continuation-in-part of U.S. patent application Ser. No. 09/858,325, filed May 15, 2001, now U.S. Pat. No. 6,615,636, which was a continuation-in-part of U.S. patent application Ser. No. 09/668,769, filed Sep. 22, 2000, now U.S. Pat. No. 6,711,928, which was a continuation-in-part of U.S. Ser. No. 09/401,065, filed Sept. 22, 1999, now U.S. Pat. No. 6,230,537, issued May 15, 2001, which was a continuation-in-part of U.S. patent application Ser. No. 09/270,428, filed on Mar. 16, 1999, now U.S. Pat. No. 6,389,865, which claimed the benefit of U.S. Provisional Patent Application Ser. No. 60/078,356, filed Mar. 17, 1998, the disclosures of each of which are incorporated herein by this reference, including, in particular, color figures provided in the drawing of U.S. Pat. No. 6,230,537.

TECHNICAL FIELD

This invention is related to novel methods and tools for use in manufacturing parts with improved fatigue life, particularly for parts having fastener apertures therein, or cutouts therein, and which parts are subject to repeated or prolonged stress. More specifically, this invention relates to novel manufacturing techniques for providing improved fatigue life in parts, to methods for cold working parts, by quasi-statically squeezing, by actuating tools at a high velocity, or by propagating a stress wave through tools, and to improved tools for cold working parts, and to finished parts made thereby, which parts have improved stress fatigue resistance characteristics.

BACKGROUND

Metal fatigue is a problem common to just about everything that experiences cyclic stresses. Such problems are especially important in transportation equipment, such as aircraft, helicopters, ships, trains, cars and the like. Fatigue can also be present in other less obvious applications such as pressurized vessels, space vehicles, farm equipment, internal combustion engines, turbine engines, medical implants, industrial equipment, sporting equipment. Metal fatigue can be defined as the progressive damage, usually evidenced in the form of cracks that occurs to structures as a result of cyclic loading. This failure mode is not to be confused with a failure due to overload. The lower surface of an aircraft wing is a classical example of the type of loading that produces fatigue. The wing is subjected to various cyclic stresses resulting from gust, maneuver, taxi and take-off loads, which over the lifetime of a particular part eventually produces fatigue damage. Similarly, the pressurized envelope of an aircraft, including the fuselage skin and rear pressure bulkhead, are subject to a stress cycle on each flight where the aircraft interior is pressurized.

Fatigue can be a problem for holes and cutouts found in frames and bulkheads of fighter aircraft. Typically these structures have a variety of hole shapes and sizes (some non-round in shape) for the purpose of routing cables, wires, tubing and actuators through the aircraft. They can also serve as a means for allowing fuel flow from one bay to the next. In addition to serving as passageway holes they can also serve as lightening holes for reducing the weight of the structure. Lightening holes can also be found on bridges, trusses, construction equipment, semi-trailers and the like. Regardless of the function or purpose of the hole if they experience cyclic stresses they are subject to fatigue damage.

One problem inherent in fatigue damage is that it can be hidden since it generally occurs under loads that do not result in yielding of the structure. Fatigue damage is most often observed as the initiation and growth of small cracks from areas of highly concentrated stress. Undetected, a crack can grow until it reaches a critical size. At that point, the individual structural member can suddenly fail. Catastrophic failure of an entire structure can also occur when other members of the adjacent portions of the overall structure cannot carry the additional load that is not being carried by the failed structural member.

Automotive vehicles are also subjected to the damaging effects of cyclic stress. Vehicles driven on rough roads or off-road experience far more damaging loads on suspension, steering, wheels and the like than for those driven on smooth pavement. The firings of the pistons create cyclic loads on valves, valve guide holes, piston and connecting rod assembly, holes in and connecting both blocks and heads. Some fatigue is a result of high vibration of small stress. Metal covers surrounding and protecting mechanical assemblies may crack at holes due to vibratory loads. Holes created for the purpose of providing flow of lubricant or fluids are sometimes located in areas of high stress. These too, may experience fatigue damage.

Fortunately, failure due to the fatigue of an automotive component has generally less severe consequences than with an aircraft component failure. Even so, fatigue in automotive components has a large economic impact on the manufacturer because of the extent of the problem. Fatigue failures may show up only after the production of hundreds of thousands of units. Warranties work on that many vehicles can be very expensive and create a negative public image. Since fatigue damage usually occurs on highly stressed and typically more expensive parts these are the ones that are generally most costly to fix.

Large cylindrical and tubular rollers used in the manufacture of paper are perforated with thousands of holes allowing for the escape of liquids associated with the pulping process. The rollers used in paper production are basically rotating cylinders that are simply supported at both ends. The action of squeezing the pulp or pressing the paper under very high pressures creates bending stresses in the rollers. At the bottom of the roller tensile stresses are created and at the top of the roller compressive stresses are created. As the roller rotates through one complete turn the material experiences one cycle of alternating stresses; negative to positive. These applied cyclic stresses, coupled with the stress risers of many thousands of holes produce many potential fatigue damage sites on the rollers. Even non-perforated rollers experience fatigue because of the need for high speed, vibration free operation. Since the rollers typically rotate at a high velocity, any imbalance in the system can cause severe vibration. Typically, balance weights are attached to the roller through small bolt holes. The holes are subjected to the previously mentioned alternating stress cycle. Because the holes concentrate the stress they are a major source of fatigue cracks.

Orthopedic implants are subjected to repetitive cyclic loading from patient movements. Consequently, such implants are designed to resist fatigue. Orthopedic implants frequently include holes through which screws and other fasteners pass to attach the implant to the bone. The holes, while necessary for attachment to the bone, reduce the overall strength of the implant since they provide less cross-sectional area to accommodate the loads being transferred to the implant through the bone and also act as stress risers which reduce the ability of the implant to tolerate cyclic fatigue loading. The problem is particularly acute in trauma implants, such as bone plates, intramedullary nails and compression hip screws since these devices, in effect, stabilize broken bone fragments until healing occurs. Thus the loading imposed on the bone during the normal movements of the patient is immediately translated to the trauma implant which is then placed under greater stresses than a permanent prosthetic implant might be. The situation is aggravated if the bone does not heal as expected. In that case, the implant is required to accommodate not only greater stresses but also a longer cyclic loading period. Under such conditions, fatigue failure of the trauma implant is more likely.

Even stationary objects, such as railroad track or pressure vessels, may fail in fatigue because of cyclic stresses. The repeated loading from wheels running over an unsupported span of track causes fatigue loads for railroad track. In fact, some of the earliest examples of fatigue failures were in the railroad industry and in the bridge building industry. Sudden pressure vessel failures can be caused by fatigue damage that has resulted from repeated pressurization cycles. Importantly, government studies report that fatigue damage is a significant economic factor in the U.S. economy.

Fatigue can be defined as the progressive damage, generally in the form of cracks, which occur in structures due to cyclic loads. Cracks typically occur at apertures (holes), notches, slots, fillets, radii and other changes in structural cross-section, as at such points, stress is concentrated. Additionally, such points often are found to contain small defects from which cracks initiate. Moreover, the simple fact that the discontinuity in a structural member such as a fuselage or wing skin from a hole or cutout forces the load to be carried around the periphery of such hole, cutout or notch. Because of this phenomenon, it is typically found that stress levels in the structure adjacent to fastener holes, cutouts or changes in section experience stress levels at least three times greater than the nominal stress which would be experienced at such location, absent the hole, cutout or notch.

It is generally recognized in the art that the fatigue life in a structure at the location of a through aperture or cutout can be significantly improved by imparting beneficial residual stresses around such aperture or cutout. Various methods have been heretofore employed to impart beneficial residual stress at such holes or cutouts. Previously known or used methods include roller burnishing, ballizing, and split sleeve cold expansion, split mandrel cold working, shot peening, and pad coining. Generally, the compressive stresses imparted by the just mentioned processes improve fatigue life by reducing the maximum stresses of the applied cyclic loads at the edge of the hole. Collectively, these processes have been generically referred to as cold working. The term cold working is associated with metal forming processes where the process temperature is lower than the recrystallization temperature of the metal. Of all the methods used to cold work holes, presently the most widely used processes are the split sleeve process and split mandrel process. Together, these processes are referred to as mandrel cold working processes.

Cold working has shown to be effective on a wide variety of materials including cast iron, ductile iron, carbon steels, low alloy steels, intermediate alloy steels, stainless steels, high alloy steels, aluminum alloys, magnesium, beryllium, titanium alloys, high temperature alloys, bronze and the like. Historically, mandrel cold working was accomplished through strictly manual means. As an example, split sleeve cold expansion of holes is still done using hand-held hydraulic tools attached to air-actuated hydraulic power units. The variables involved in tool selection, implementation, and control of the cold expansion process require skilled operators to reliably produce properly treated holes. Unfortunately, the requirement of having a skilled operator to perform the task is a disadvantage in that it continuously presents the risk of improper or inaccurate processing. Also, such labor-intensive techniques effectively preclude automated feedback necessary for statistical process control. Although development of that process continues, the complexity of the split sleeve processes and the apparatus utilized presently precludes the widespread adoption of the process for automated fastening environments. The split mandrel process it at a similar stage of development; manually performed, but with some minor automation.

The mandrel cold working processes have a particular disadvantage in that they require precision in the size of the starting holes, usually in the range of from about 0.002 inch to about 0.003 inch in diametric tolerance, in order to achieve uniform expansion. Also, an undersize starting hole is required in that process, in order to account for the permanent expansion of the hole and the subsequent final ream that is necessary to remove both the localized surface upset around the periphery of the hole, as well as the axial ridge(s) left behind by the edges of the sleeve split or mandrel splits at their working location within the aperture, and of course, to size the holes. Moreover, treatment requires the use of two reamers; one that is undersized, for the starting hole diameter, and one which is provided at the larger, final hole diameter.

Another undesirable limitation of mandrel cold working processes is the requirement for, presence of, and residual effect of lubricants. For the split sleeve cold expansion process the starting hole must be free of residual lubricants (used for drilling) to prevent sleeve collapse during processing. A collapsed sleeve can be very difficult to remove and necessitates increasing the hole diameter beyond the nominal size, to remove the subsequent damage. The split mandrel process uses a liquid cetyl alcohol lubricant that must be cleaned from the hole after cold working, in order to ensure proper paint adhesion. In either case, the cold worked hole must be cleaned with solvents, in order to remove lubricants. Such chemical solvents are costly, require additional man-hours for handling and disposal, and if not effectively controlled during use or disposal, can have a deleterious effect on operators and/or the environment.

Still another limitation of the prior art mandrel cold working processes is their effect on the surface of the aperture being treated, i.e. the metal wall which defines the hole. The "split" in the split sleeve or the multiple splits in a split mandrel can cause troublesome shear tears in type 7050 aluminum, and in some other alloys. Shear tears, which are small cracks in the structural material near the split(s), are caused by the relative movement of the material near the split. Significantly, the increasing use of type 7050 aluminum in aircraft structures has created a large increase in the number of shear tears reported. Although such tears are generally dismissed as cosmetic flaws, they nevertheless produce false positives in non-destructive inspections for cracks.

Also, in the mandrel cold working processes, the sliding action of a mandrel produces a large amount of surface upsetting around the periphery of the hole, especially on the side of the structure where the mandrel exits the hole. In the split mandrel process, this effect is clearly seen, because of the direct contact of the mandrel with the aperture sidewall. The undesirable surface upset can increase the susceptibility to fretting, which may lead to a reduction in life for fastened joints. Additionally, surface upset in a stackup of structural layers can cause disruption of the sealant in the faying surface. To some extent the undesirable surface upset can be reamed out when sizing the final hole diameter, but at least some portion (and normally a substantial portion) remains.

Present methods of cold working holes and other cutouts using tapered mandrel methods, coining, punching, and such are not readily adaptable to automated fastening systems and other automated environments because of their complexity and bulkiness of equipment. Also, presently known methods used by others are not adapted to treat the entire periphery of non-circular cutouts, thus leading to fatigue life degradation. Finally, prior art countersink cold working methods require re-machining of the formed countersink to achieve the desired fastener flushness. Thus, the heretofore known processes are not entirely satisfactory because:

- they often require mandrels, split or solid, and disposable split sleeves, which demand precision dimensions, which make them costly;
- mandrels and sleeves are an inventory and handling item that increases actual manufacturing costs when they are employed;
- "mandrel only" methods require a different mandrel for roughly each 0.003 to 0.005 inch change in hole diameter, since each sleeve is matched to a particular mandrel diameter, and consequently, the mandrel system does not have the flexibility to do a wide range of hole existing hole diameters;
- each hole diameter processed with "mandrel only" methods requires two sets of reamers to finish the hole, one for the starting dimension and another for the final dimension;
- mandrel methods rely on tooling and hole dimensions to control the amount of residual stress in the part, and therefore the applied expansion can be varied only with a change of tooling;
- mandrel methods require some sort of lubricant; such lubricants, and especially the liquids, require solvent clean up;
- splits in a sleeve or splits in a mandrel can cause troublesome shear tears, especially in certain 7000 series aluminum alloys;
- the pulling action against mandrels, coupled with the aperture expansion achieved in the process, produces large surface marring and upsets around the periphery of the aperture;
- split sleeve methods are not easily adapted to the requirements of automation, since the cycle time is rather long when compared with the currently employed automated riveting equipment;
- mandrel methods are generally too expensive to be applied to many critical structures such as to aircraft fuselage joints, and to large non-circular cutouts;
- mandrel methods have limited quality control/quality assurance process control, as usually inspections are limited to physical measurements by a trained operator.

Thus, it would be desirable to provide an improved process for treating structures to improve their fatigue life, especially if such a process avoided many, if not most of the various drawbacks of prior art processes as just discussed above.

BRIEF DESCRIPTION OF THE DRAWING

In order to enable the reader to attain a more complete appreciation of the invention, and of the novel features and the advantages thereof, attention is directed to the following detailed description when considered in connection with the accompanying drawings, wherein:

FIG. 21 is a perspective view of the step of drilling an aperture in a workpiece in which a dimple has been formed, in order to create an aperture having improved fatigue life at a pre-selected location.

FIG. 22 illustrates one type of set-up step for utilizing this method for impacting both the obverse and the reverse sides of a workpiece with indenters of a pre-selected, unequal diameter, to form dimples in both sides of the workpiece at a pre-selected location where it is desired to create a shaped aperture having enhanced fatigue life, such as a "rivet-hole", particularly for a flush rivet hole.

FIG. 23 illustrates the step of impacting both the obverse and the reverse sides of a workpiece with indenters of a pre-selected, unequal diameter, to form dimples in both sides of the workpiece at a pre-selected location where it is desired to create an aperture having improved fatigue life, such as a "rivet-hole", and in one embodiment, for a flush rivet hole.

FIG. 24 is a side elevation view of one type of set-up step for utilizing this method impacting both the obverse and the reverse sides of a workpiece with indenters of both different shape and of unequal size, to create dimples in both sides of the workpiece at a pre-selected location where it is desired to create an aperture having improved fatigue life, such as a chamfered "flush-rivet hole".

FIG. 25 is a partial cross-sectional view, illustrating one type of set-up step for utilizing this method for impacting both the obverse and the reverse sides of a workpiece with indenters which are both of different shape and of unequal size, and where the indenters are centered by use of pilot guide tool received in a centering receiver in one or the other indenter.

FIG. 26 is a partial cross-sectional view, illustrating the set-up step for utilizing this method for impacting both the obverse and the reverse sides of a workpiece with indenters which are of identical shape and size, and where the indenters are centered by use of pilot guide tool received in a centering receiver in one or the other indenter.

FIG. 27 is a cross-sectional view which shows one type of set-up step for utilizing yet another embodiment of a method for impacting both the obverse and the reverse sides of a workpiece, utilizing indenters which are both of identical shape, and further utilizing a consumable wafer between the indenters and the workpiece.

FIG. 28 is a cross-sectional view which illustrates the step of disengaging opposing indenters from their respective consumable wafers on opposing sides of a workpiece, after impacting both the obverse and the reverse sides of a workpiece to create dimples at pre-selected locations where it is desired to create an aperture having improved fatigue life.

FIG. 31 is a top plan view of a structure with one non-circular hole therein which can advantageously be treated by the method disclosed herein to provide beneficial residual stress levels at desired locations in a bounding portion adjacent the interior edge wall of the hole.

FIG. 32 is a top plan view of yet another structure having a non-circular hole therein which can advantageously be treated by the method(s) disclosed herein to provide beneficial residual stress levels in a bounding portion at desired locations in the structure adjacent an interior edge wall portion of a passageway in the structure.

FIG. 45 is a graphical plot of the residual tangential stress versus radial distance from a hole (aperture) edge, in a structure which has been cold worked.

FIG. 46 is a graphical plot of the residual tangential stress versus radial distance from a hole (aperture) edge, in a structure which has utilized the split sleeve method for improving fatigue life, as compared to results at both the surface and at an aperture mid-plane in a structure fabricated in Type 2024-T3 Aluminum utilizing my new process.

FIG. 47 is semi-log graphical plot of the maximum net stress versus cycles to failure for (a) sample results for parts treated by cold expansion; (b) untreated control samples of the material type treated and tested herein, and (c) results for sample structures treated by the method(s) taught herein.

FIG. 51 includes a series of FIGS. 51A, 51B, 51C, 51D, and 51E, which series illustrate a variety of ways in which an indenter can be utilized to place a dimple in one or both sides of a workpiece, as taught herein.

FIG. 55 illustrates the setup step of providing a hole in the composite that is slightly undersized from the final diameter, but which is slightly larger than the indenter, so that the indenter is allowed passage through the composite material.

FIG. 56 illustrates the step of processing the metallic component with indenters to create desirable residual compressive stress at a preselected location in the workpiece.

FIG. 57 illustrates the step of match drilling a hole through a metal/composite high strength workpiece.

FIG. 58 illustrates a finished hole that has been prepared in the composite workpiece first shown in FIG. 55.

FIG. 78 shows the setup step in a process for improving the fatigue life of a transverse hole in an initially solid bar (round bar is illustrated).

FIG. 79 shows the processing step for a method of treating a transverse hole in an initially solid bar; here, impacting the top and bottom of the bar is illustrated, but any desired location could be chosen.

FIG. 80 shows the step of drilling out the desired hole in an initially solid bar (a round bar is illustrated), as a step in providing a hole with desirable fatigue life enhancement.

FIG. 81 shows a cross-sectional view of a round, solid bar after processing to provide a transverse hole having desirable fatigue life enhancement.

FIG. 82 illustrates a cross-sectional view of a round, solid bar after processing to provide (a) a transverse hole having desirable fatigue life enhancement, and (b) a longitudinal through passageway, so that a tubular component having one or more transverse outlet passageways results.

FIG. 104 shows the process step of stresswave process treatment of a workpiece in which a threaded hole (future threads shown in hidden lines) is to be installed.

FIG. 105 shows the step of drilling out an aperture at a preselected location in a workpiece for installation of a threaded hole with improved fatigue life.

FIG. 106 illustrates the finishing step of machining or tapping threads in an aperture at a preselected location in a workpiece, for installation of a threaded hole with improved fatigue life.

FIG. 107 illustrates a finished workpiece in which a threaded hole having improved fatigue life has been installed using the method(s) taught herein.

FIG. 114 shows the use of an internal support during simultaneous or sequential (via pairs of opposing indenters) double sided processing of a workpiece, where the internal support resists deformation along a free edge of the support device normal to the direction of the indenter.

FIGS. 115 through 118 illustrate the use of the method(s) taught herein for treatment of a very thick part such as an engine block or a cylinder head for valve guide apertures, attachment holes, or other uses, where treatment at a first surface of the part (which may be either one-sided or two-sided), is not sufficient to improve the fatigue life along the entire length of a desired hole, so a sequential process is utilized.

Figure 115:
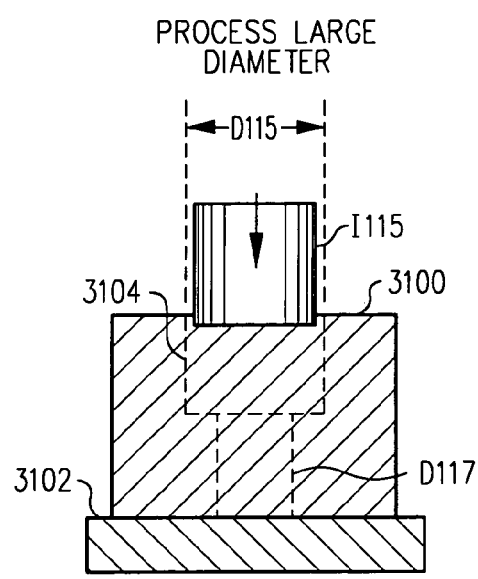

In FIG. 115, a first surface is processed with an indenter, to provide desirable residual stresses at a first surface or along a desired length of a hole for a preselected hole diameter.

Figure 116:
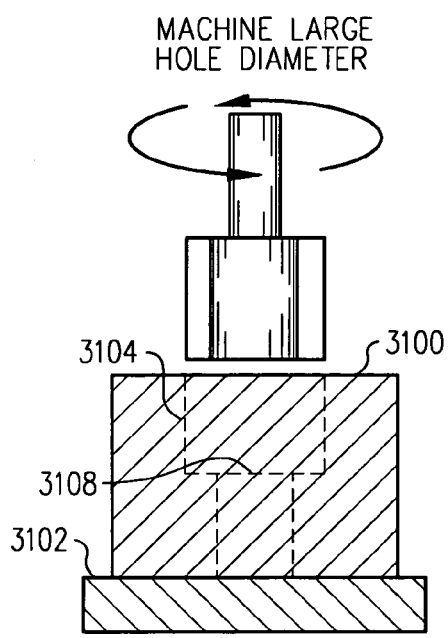

In FIG. 116, a further processing step is provided to drill or ream out the hole to provide a hole portion having a wall of preselected length and diameter, and optionally, processing the hole with sufficient diameter to provide a shoulder for further treatment.

Figure 117:
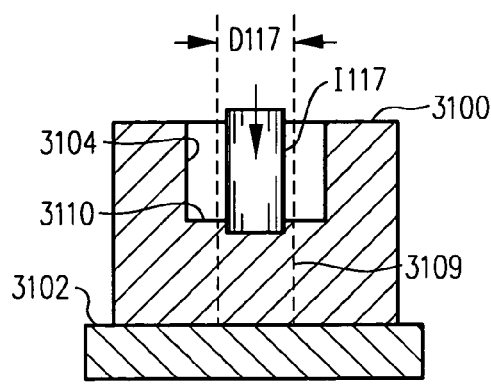

In FIG. 117, the additional step of indenting a processing shoulder is illustrated, in order to provide an additional length of hole having a desired residual stress profile.

Figure 118:
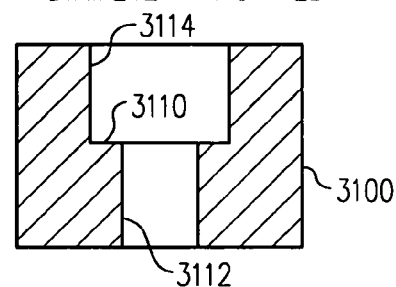
Figure 135:
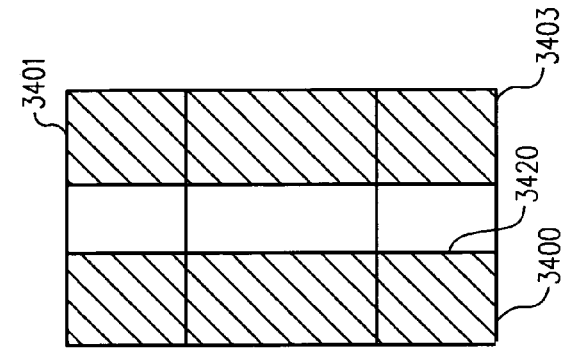

FIG. 118 shows one embodiment for a final hole configuration, processed as just illustrated in FIGS. 115, 116, and 117, with the hole having a preselected hole length and hole diameter, and having a desired residual stress profile.

FIGS. 119 through 127 illustrate the use of the method(s) disclosed herein to work through a deep workpiece material, by first processing the part of at least one end (see FIG. 119), then machining (see FIG. 120) to a partial depth to provide a first interim shoulder (see FIG. 121). Then, processing is again effected via an indenter (see FIG. 122). The process is repeated (see FIGS. 123 and 124), and again (see FIGS. 125 and 126) until the entire length of a desired through hole is effected, and a final drill of preferably larger outside diameter is utilized as seen in FIG. 126, to provide the final structure as noted in FIG. 127.

FIGS. 128 through 136 illustrate the use of the method(s) taught herein to work through a multi-component workpiece, by first processing the part of at least one end (see FIG. 128, where two ends are processed), then machining (see FIG. 130) to a partial depth to provide a first interim shoulder (see FIG. 131). Then, processing is again effected via another indenter sized to fit within the hole portion already machined (see FIG. 132). The process is repeated (see FIGS. 133 and 134), until the entire length of a desired through hole is effected, as noted in FIG. 135.

Figure 108:
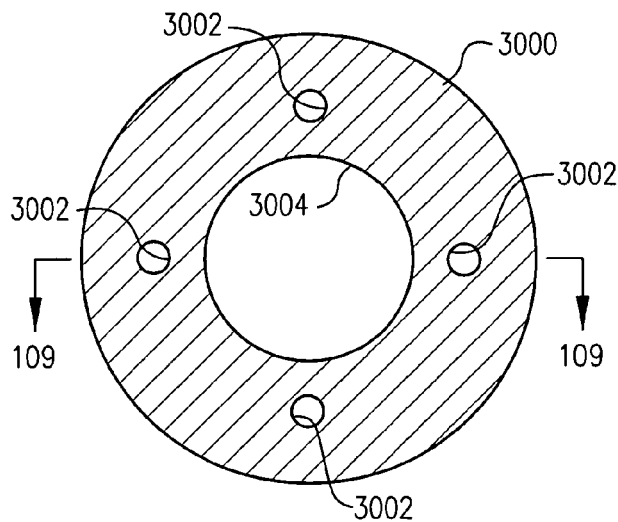
FIG. 108 shows the use of either simultaneous or sequential treatment of a pattern or set of two or more holes in workpiece; here, a plan form view of a pattern of four holes around a center hole is shown, although such a pattern is only one of innumerable possible hole patterns, but the design shown is used for illustrative purposes only.
Figure 109:
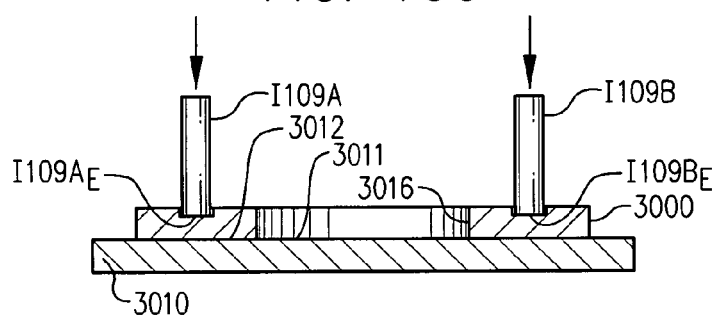
FIG. 109 shows the multi-hole workpiece first illustrated in FIG. 108, taken along line 109—109 of FIG. 108, now further illustrating the use of indenters to create desirable residual stresses at locations for apertures through a workpiece, utilizing an anvil or other structure that provides a backing support to resist motion opposite the direction of motion of the indenter, so as to facilitate one sided processing of a workpiece.
Figure 110:
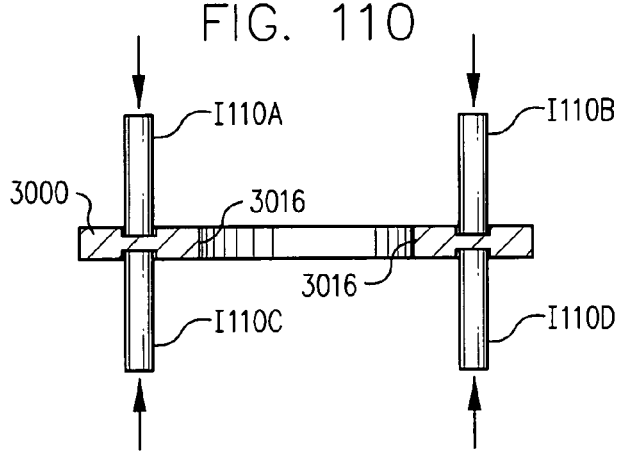
FIG. 110 shows the use of first and second indenters acting on obverse and reverse sides of a workpiece, at one or more locations for installation of holes in a multi-hole workpiece; such treatment can be performed either simultaneously or sequentially (via pairs of opposing indenters) to provide a pattern of holes, and can be performed in either a one-sided manner as shown in FIG. 109, or a two sided manner as shown here in FIG. 110.
Figure 111:
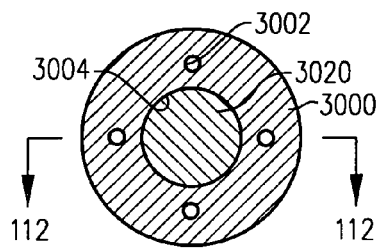
FIG. 111 illustrates the workpiece first shown in FIG. 108, but now further illustrating the use of an internal support for resisting deformation of the workpiece during processing.

FIG. 136 illustrates steps 1 though 4 in a method to treat slots and notches in turbine disks, shafts, gears and the like, where residual stress is imparted in the area most needed, which in the case illustrated, is at the root of the notch or slot, with treatment normally effected in the manner first illustrated in FIGS. 108–110 above, before final machining to create the desired slots or notches.

FIG. 137 shows a setup step for processing of a large hole in a workpiece by using a smaller diameter indenter via imparting an overlapping pattern of dimples in a workpiece, to create a fairly uniform residual stress around the perimeter of the hole.

FIG. 138 shows the use of an overlapping indenter technique just mentioned in relation to FIG. 137, for sequentially indenting preselected locations in a workpiece to substantially effect the workpiece along the edge location of a hole to be installed in the workpiece, to create a fairly uniform residual stress around the perimeter of the hole.

FIG. 139 illustrates a final hole installed in workpiece; here, the hole is circular, and the workpiece has been provided with desirable fatigue life enhancement along the edgewalls of the hole in the workpiece, to create a fairly uniform residual stress around the perimeter of the hole, to create a fairly uniform residual stress around the perimeter of the hole.

Figure 140:
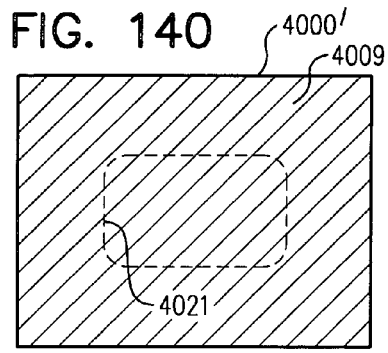

FIG. 140 is very similar to FIG. 137, showing a setup step for processing of a large hole in a workpiece by using a smaller diameter indenter via imparting an overlapping pattern of dimples in a workpiece, to create a fairly uniform residual stress around the perimeter of the hole, except that in this FIG. 140, the hole is non-circular; thus it is shown that the same overlapping indenter technique just illustrated in FIG. 138 can also be adapted to non-round holes as well.

Figure 141:
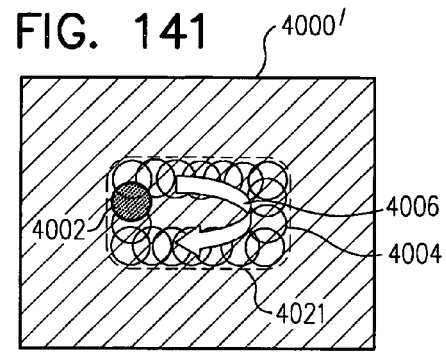

FIG. 141 shows that an overlapping indenter technique, as just illustrated in FIG. 138 can also be adapted to non-round holes as well, to create a fairly uniform residual stress around the perimeter of the hole.

Figure 142:
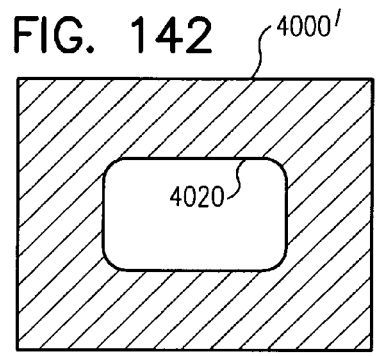

FIG. 142 illustrates a non-round hole in a workpiece, where the workpiece has been processed according to the stresswave technique, to provide aperture edges having desirable fatigue life improvement by creating a fairly uniform residual stress around the perimeter of the hole.

Figure 143:
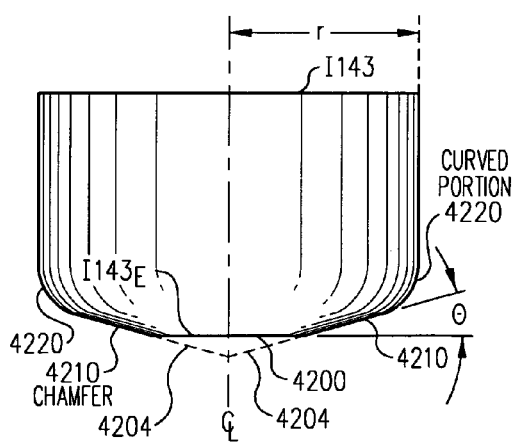

FIG. 143 illustrates another embodiment of a compound indenter for use in cold working method(s) to create desirable residual stress patterns in a workpiece; the indenter illustrated in this FIG. 143, utilizes a flat portion, a chamfered portion and a curved portion are used to approximate a uniform pressure profile curvature at the working end of the indenter.

Figure 144:
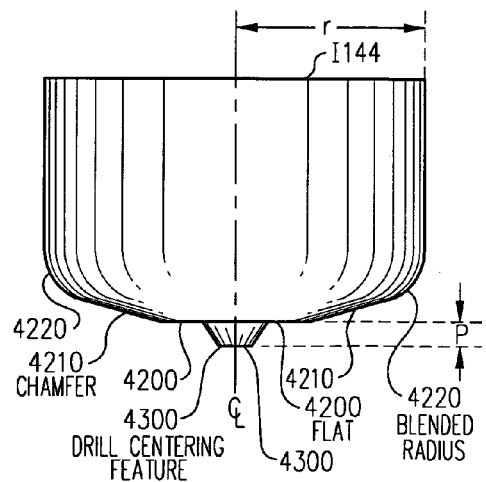

FIG. 144 shows an indenter similar to that first illustrated in FIG. 143, but showing the further addition of a raised feature to create a drill-centering feature in a workpiece has been added, which allows a drilling tool to align itself with the drill centering feature in a dimple to improve hole concentricity with the dimple, reduce drill chatter and increase drill life, and to improve the quality of the hole.

Figure 145:
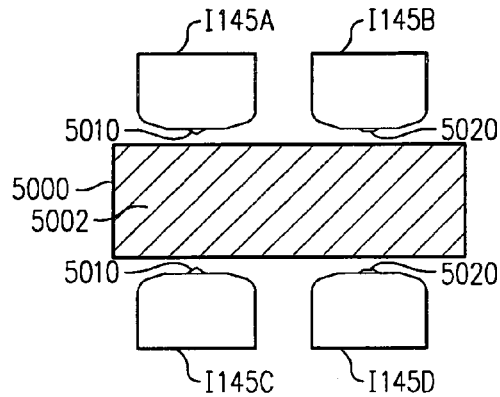

FIG. 145 illustrates the setup step for two indenter end styles, wherein each of the indenter end styles includes a centering feature to create a drill aligning indentation in a workpiece; both conical and truncated cone shapes are shown.

Figure 146:
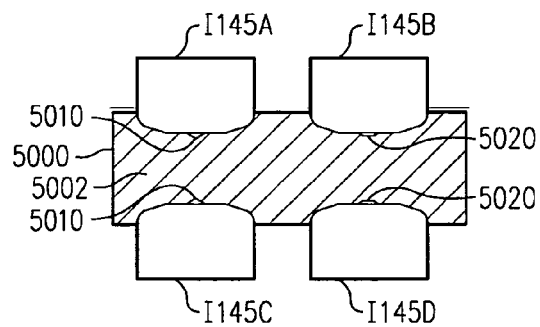

FIG. 146 illustrates the step of actuating the indenters first depicted in FIG. 145, to provide displacement of the body of the workpiece and to impart desirable residual stress therein.

Figure 147:
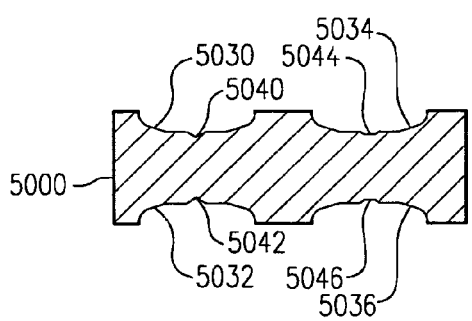

FIG. 147 shows a workpiece in which dimples have been formed to impart a desirable residual stress in the workpiece, and including a drill centering feature in the dimple.

Figure 148:
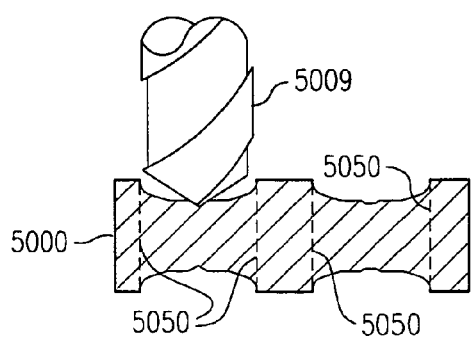

FIG. 148 shows the step of drilling out a workpiece using the drill centering feature formed by use of the indenters depicted in FIG. 145, in order to form finished holes in the workpiece.

FIG. 149 illustrates a setup step for treating a relatively thick part by utilizing indenters much larger than the desired final hole diameter, where the relative size and location of the desired hole being installed is illustrated in broken lines.

FIG. 150 shows the step of actuating indenters into a relatively wide portion of the workpiece, to develop residual stress well beyond, laterally, the future wall of the small diameter hole to be installed in the workpiece.

FIG. 151 illustrates the step of milling obverse and/or reverse faces of the workpiece structure, to remove the dimples provided by actuation of the indenters, so that residual stresses relax slightly, to leave behind a large zone of desirable residual compressive stress.

FIG. 152 shows the finished workpiece constructed by the steps illustrated in FIGS. 149 to 151, providing a relatively thick finished workpiece having a large zone of residual compressive stress, through the workpiece thickness along the walls of the finished hole, and laterally outwardly therefrom.

The foregoing figures, being merely exemplary, contain various elements that may be present or omitted from actual implementations depending upon the circumstances. An attempt has been made to draw the figures in a way that illustrates at least those elements that are significant for an understanding of the various embodiments and aspects of the invention. However, various other elements of the method(s) are also shown and briefly described to enable the reader to understand how various optional features may be utilized in order to provide an efficient, reliable process for improving fatigue life in various structures.

DETAILED DESCRIPTION

Method(s) are provided in which a beneficial residual stress is imparted to holes and other features in parts that are subject to strength degradation as a result of fatigue damage. Such method(s) impart beneficial stresses using an indenter that impinges the surface of a workpiece, preferably normal to the surface of the workpiece. In one embodiment of this process, the action of a dynamic indenter on the workpiece at a pre-selected velocity and with sufficient force causes waves of elastic and plastic stress to develop and to propagate through a workpiece, resulting in instantaneous plastic deformation of the structure. In other embodiments, quasi-static work of indenters may be utilized on a workpiece. In yet another embodiment, high velocity impacts of indenters may be utilized to act on a workpiece.

Unlike the techniques employed in various prior art methods, it has been discovered that by carefully controlling the amount and distribution of pressure applied to a workpiece, the resulting residual stress in the workpiece can be substantially stratified, in cross-section, so that a substantially uniform residual tangential stress is maintained along the sidewall profile of an aperture through a structure.

Figure 1:
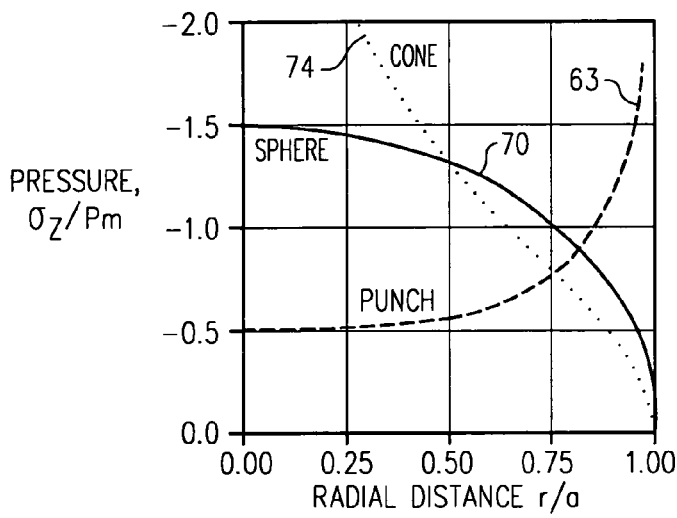
FIG. 1 shows a summary of normalized contact pressure distribution, $\sigma_z/P_m$ at radial distance from a punch centerline, for a structure undergoing deformation by (a) a cone, (b) a sphere, and (c) a circular, flat bottomed punch.
Figure 2:
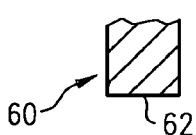
FIG. 2 is a vertical cross-section of a flat bottom circular punch, of the type which displays the curve depicted in FIG. 1 when cold working metal.

To understand this phenomenon, it is helpful to look at several prior art indenter shapes and the results provided by their use, as set out in FIG. 1. In FIG. 1, a summary of normalized contact pressure distribution, $\sigma_z/P_m$, at radial distance from a punch centerline, is shown for a structure undergoing deformation by (a) a cone, (b) a sphere, and (c) a circular, flat bottomed punch. When using a punch 60 having a circular flat face 62 as depicted in FIG. 2, the pressure is relatively uniform only near the center of the area of engagement, and increases exponentially near the edge of the contact area, where shearing tends to occur, as indicated by broken line 63 in FIG. 1. Thus, flat faced, cylindrical indenters (see FIG. 2) are efficient at imparting large zones of residual stresses in thick sheets as they displace material uniformly over their entire surface area. Unfortunately, the edge at the periphery of the end of the flat cylindrical indenter shears the edge of the surface of the structure being worked, leading to a much smaller zone of residual stress at the surface of a workpiece. As a result, the reduced amount of residual stress (as more particularly seen in FIGS. 38 and 39, discussed hereinbelow) leads to a less than optimal fatigue life of a structure fabricated using such method.

Figure 3:
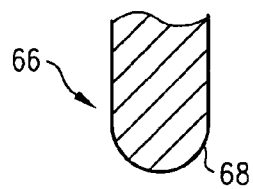
FIG. 3 is a vertical cross-section of a spherical bottom bunch, of the type which displays the curve depicted in FIG. 1 when cold working metal.

When using a prior art punch 66 with a spherical bottom shape 68 (as shown in cross-section in FIG. 3), increased pressure is seen at the center of the contact area (reference axis at r/a=0.00 in FIG. 1), and the contact pressure drops off exponentially toward the edge of the contact area, as indicated by solid line 70 in FIG. 1. Resultantly, indenters with spherical end shapes provide large zones of beneficial residual stresses at the sheet surface, but lack the ability to treat thick structures because of the reduced contact area associated with the spherical shape. Also, such spherical indenter shapes tend to induce large amounts of upset at the surface of a workpiece, which may require further attention in order to provide a suitable final product.

Figure 4:
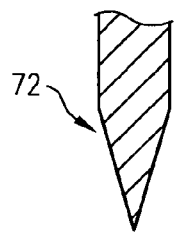
FIG. 4 is a vertical cross section of a cone shaped punch, of the type which displays the curve depicted in FIG. 1 when cold working metal.

If a prior art cone shaped punch 72 were utilized (as depicted in cross section in FIG. 4), the pressure exerted by the punch 72 is very high toward the center of the contact area, but drops off sharply toward the edge, as indicated by dotted line 74 in FIG. 1. Thus, such cone shaped indenters are not very effective at producing desirable residual stress profiles, since they tend to tear the surface and move it radially outward.

Figure 5:
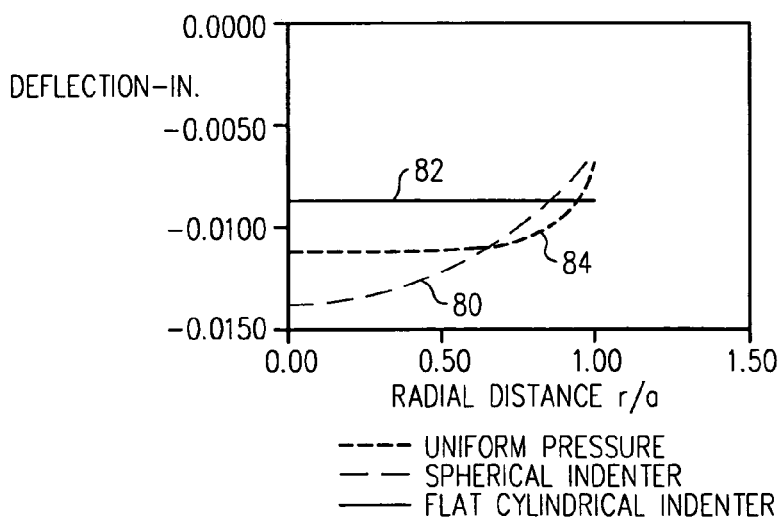
FIG. 5 is graphical illustration of the deflection of a workpiece structure, at radial distance from a punch centerline, for a workpiece structure undergoing deformation by (a) a flat bottom cylindrical indenter, with a configuration such as is illustrated in FIG. 2 above, (b) a spherical bottom indenter such as is illustrated in FIG. 3 above, and (c) an optimized, uniform pressure type indenter as taught herein, one embodiment of which is illustrated in FIG. 6 below.

In the new method disclosed herein of producing beneficial stresses at desired locations in structures, it is instructive to examine the amount of deflection achieved on a workpiece by various tools, and then to achieve improved results by way of optimization of the deflection achieved, by use of a sufficiently optimized indenter tool shape. This phenomenon is graphically represented in FIG. 5, which compares the amount of deflection achieved at radial distance from the centerline of a contact surface area being acted upon by spherical, flat, and optimized indenters. The deflection achieved by a spherical indenter 68, is shown in line 80 of FIG. 5. The deflection achieved by a flat faced cylindrical indenter 62 (such as is depicted in cross-section in FIG. 2), is shown by line 82 of FIG. 5.

For the novel apparatus and method of the present invention, a desirable generalized pressure profile provided by use of an optimized indenter tool desirably results in a relatively uniform pressure across the contact surface areas, so as to achieve a varying amount of deflection in a workpiece. Thus, at the center of the contact area, this results in more deflection than that achieved by a traditional prior art flat-bottomed punch. However, at the edge of the contact area, this results in less deflection (and hence, less shearing) than that achieved by a traditional flat-bottomed punch. Confirming this phenomenon is the broken line 84 depicted in FIG. 5, which shows the variable deflection achieved by an optimized indenter when acting on a workpiece.

Figure 6:
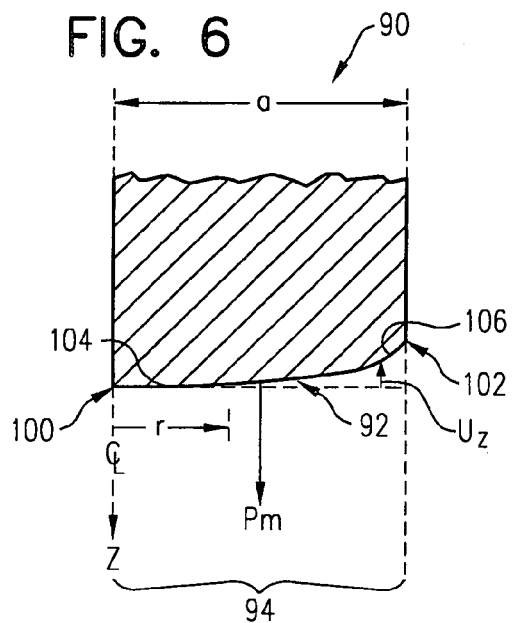
FIG. 6 is a partial cross-sectional view, showing an optimized tooling indenter as taught herein, and indicating key parameters for shaping such a tool.

FIG. 6 is a partial cross-sectional view, showing on embodiment for an optimized tooling indenter as taught herein, and indicating key parameters for shaping such a tool. For purposes of this discussion, FIG. 6 is best envisioned as depicting in one-half cross-section of a cylindrical, circular faced indenter 90 or punch with a contact face 92 with shaped profile, in the radially outward direction, as further discussed hereinbelow. The overall radius is a, and the instantaneous radius is r at any pre-selected location in the radially outward direction along the contact face 92. The initial contact pressure, $P_M$, for initial yield (indentation) is in the normal direction z, and is indicated by the downward arrow in FIG. 6, and such contact pressure is provided by the instantaneous contact pressure $\sigma_z$ at any point along the profile of contact face 92, or more generally shown below, in the contacting end 94 of the indenter 90.

In one embodiment, an indenter 90 contact face 92 profile shape is determined from the deflected shape of a dimple induced by uniform pressure acting on a selected workpiece. By selecting the deflected shape for a pre-selected depth of indentation in a workpiece resulting from uniform pressure as the shape for the contact face profile 92 of the contacting end 94, the optimum shape for an indenter can be determined. Such deflected shape, or, more precisely as shown, the shape for the end shape of an indenter (that is the contract face profile 92 in tool 90), is given by the elliptical integral as follows:

$$u_z = \frac{C(4(1-v^2))}{E} P_m a \int_0^{\pi/2} \sqrt{1 - \frac{a^2}{r^2}(\sin^2\theta)} \, d\theta$$

Where:
a=a pre-selected radius of uniform pressure
C=a constant for a specific indenter that is dependent on the hole diameter, workpiece thickness, and mechanical properties of the workpiece material to produce a preselected residual stress
E=Elastic modulus
$P_M$=contact pressure distribution (i.e., yield stress)
r=radial distance (instantaneous)
$u_z$=normal displacement of the workpiece
v=Poisson's Ratio In my previous work, the constant C was developed for thin section materials with relatively low mechanical properties. The values of C ranging from 1 through 4 were sufficient for imparting a uniform residual stress profile through the thickness of a thin structure; that approach provide a residual stress improvement over those residual stresses produced by prior art, flat bottom punches. It should be noted that C is constant over the entire diameter of the indenter end shape, but varies according to hole diameter, thickness and the mechanical properties of the workpiece material. The value of $P_m$ is typically set to the yield stress of the workpiece material, as any pressure below that value would not be enough to permanently deform the part. Thus the product of the constant C and the contact pressure distribution $P_m$ is simply a multiple of the yield stress of the material being treated.

Further research, analysis and testing have shown that for higher strength and thicker materials the constant C needs to be increased above 4, in order to achieve a desired residual stress profile in higher strength materials. Even though $u_z$ is directly proportional to the constant C, the normal displacement, $u_z$ is changed in a relatively small amount by the change in the constant C. Therefore, much larger values of the constant C have been shown to improve the residual stress profile of higher strength materials. Further, a higher C constant produces a more pronounced indenter end shape, resulting in reduction of the amount pressure required to produce a desired dimple depth. The reduction in pressure, or load, to produce the dimple is significant, particularly for applications where existing devices have loads limits.

The constant C is primarily dependent on the material strength and hole diameter. The higher the material strength or the larger the hole diameter, the higher the constant C required to produce a substantially uniform residual stress. C values ranging from 4 to 110 have been used producing substantially uniform residual stresses and subsequent fatigue life improvements. Those of ordinary skill in the art and to whom this disclosure is addressed should be able to easily resolve the required parameters, for a given hole size, workpiece material thickness, and workpiece material properties.

Since beneath the indenter 90 at the center of contact face profile 92, i.e., the center of contact where r=0, the maximum normal displacement measured with respect to the first surface of a workpiece is given by the following expression:

$$u_z = \frac{C[2(1-v^2)]}{E} P_m a$$

At the outer edge of the dimple (where r=the total radius a of the indenter), the normal displacement measured with respect to the first surface of a workpiece is given by the following expression:

$$u_z = \frac{C[4(1-v^2)]}{\pi(E)} P_m a$$

Overall, the resultant shape of my improved indenter 90 is somewhat similar to a flat punch but with a gradually sloping face 104 along the low radial distance (r/a) points (up to about r/a 0.66 or slightly more), and a somewhat radiused edge face 106 along the high radial distance (r/a) points (where r/a is over about 0.66 or is in excess of about 0.75 or so).

As an example, a 0.250 inch indenter acting on a 0.040 inch thick sheet of 2024-T3 aluminum requires a constant C of 2 for a substantially uniform residual stress. Using a $P_m$ of the yield stress of 2024-T3 at 47,000 psi, a v of 0.33 and a modulus of 10×106 psi the maximum displacement, $u_z$, is 0.0021 inches. To achieve a substantially uniform residual stress for a thicker section such as 0.250 inches a C of 10 is required resulting in an indenter depth of 0.0105 inches.

Figure 14:
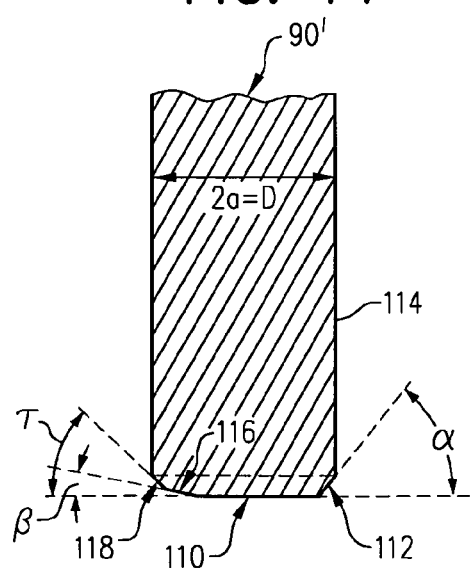
FIG. 14 illustrates another embodiment of an optimized indenter for use in cold working to create desirable residual stress patterns in a workpiece; in this embodiment, one or more chamfers are used at the edges of the indenter to approximate a desirable curvature near, and preferably at, the edge of the indenter.

In another embodiment, shown in FIG. 14, an optimized indenter 90' can be provided in a design which is slightly easier to manufacture, yet still substantially achieve many of the benefits of my invention. In this embodiment, the contact face profile 92 discussed above is instead provided by a relatively flat central portion 110, and one or more preferably flat, chamfered edges. Here, one edge 112 is shown on a first side 114 of indenter 90', and two edges 116 and 118 are depicted a second side 120 of indenter 90'. As depicted, edge 112 is offset from flat central portion 110 by an angle alpha ($\alpha$), which is preferably in the 30 degree to 60 degree range. Also, edge 116 is offset from the flat central portion 110 by an angle beta ($\beta$), which is preferably provided in the range from about zero degrees up to about fifteen degrees. In those tools in which a second chamfer is desired, the second chamber angle tau ($\tau$) is generally about the same as alpha, or from about 30 up to about 60 degrees.

Figure 15:
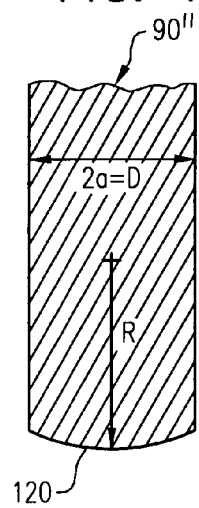
FIG. 15 illustrates yet another embodiment of an optimized indenter for use in cold working to create desirable residual stress patterns in a workpiece; in this embodiment, the indenter utilizes a pre-selected radius of curvature.

In FIG. 15, yet another embodiment of my indenter 90" is illustrated. Depending upon the materials of construction of a particular structure, and on the amount of beneficial residual stress necessary to provide in the workpiece to be used in such structure, in some cases it may be possible to achieve the results taught herein, at least to some significant degree, via use of a simple indenter 90" with a rounded contacting end 120. In such cases, I have found that the shape of the contacting end 120 can be described as having a curvature of radius R, where radius R is equal to or between 2D and 8D. When restated in terms of radius as shown above, R is in the range from (2a) to 8(2a), inclusive, i.e., R is between 4a and 16a. More preferably, R is between about 3D and 5D, and most preferably, R is about 3.2D.

Figure 7:
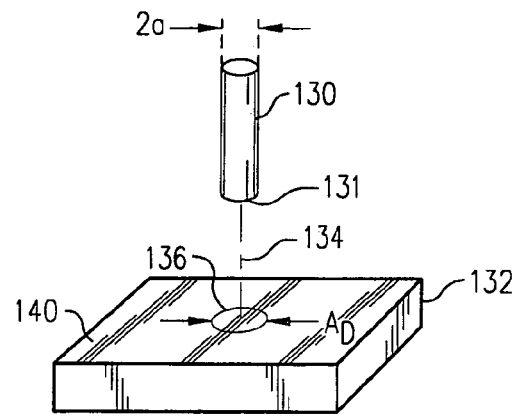
FIG. 7 illustrates one type of set-up step for utilizing a method in preparing a high fatigue life aperture on a relatively thin workpiece.
Figure 8:
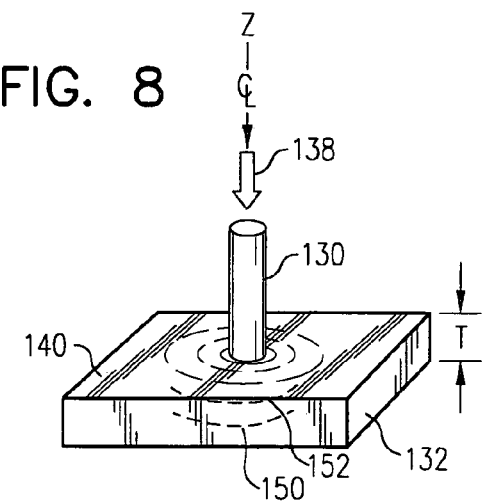
FIG. 8 illustrates the step of impacting one-side of a workpiece with an indenter to form a dimple in the workpiece at a pre-selected location for creation of an aperture having improved fatigue life properties.
Figure 9:
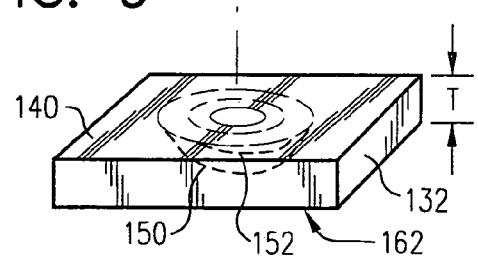
FIG. 9 represents a workpiece in which a dimple has been formed at a pre-selected location wherein it is desired to create an aperture, such as a "rivet-hole", having improved fatigue life properties.

Turning now to FIGS. 7, 8, and 9, the use of a single dynamic indenter 130 is illustrated for contacting end 131 to a workpiece structure 132. FIG. 7 shows the single, (here, upper) pre-selected indenter 130 of diameter 2a being positioned and aligned over the centerline 134 of a workpiece structure 132 in which an aperture 136 of a preselected diameter $A_D$ is desired. It should be understood that in one variation in my method, the indenter may be positioned in touching engagement with the workpiece 132, and the necessary force to create the desired result in the workpiece may be applied to the indenter while it remains in such touching contact. In FIG. 8, the step of dynamically driving indenter 130 in the direction of reference arrow 138 and into the obverse surface 140 of workpiece structure 132 to create a stress wave in workpiece structure 132 is depicted. A stylized view of the stress waves passing through workpiece 132 in response to impact from the dynamic indenter 130 is shown in FIG. 9. With a sudden compressive impact, such as by a dynamic indenter 130 on workpiece 132, an elastic wave of compression 150 hits the workpiece, and moves through the thickness T of the workpiece. This is followed by a plastic wave 152 which travels more slowly. The elastic wave moves through the metal at a velocity of $$c = (E/\rho)^{1/2}$$

where c=the speed of sound in the material, and $\rho$=the material density

The velocity of the plastic wave front is a little more complex, and is generally represented as follows:

$$C = [S(\epsilon)/\rho]^{1/2}$$

where

S(ε)=the modulus of deformation (elastic or plastic), which is equal to the change in stress divided by the change in strain speed, or (d σ/d ε).

It is important to note that by shaping contacting end 131 of the indenter 130, applied work is focused both normally along the direction z of the impact of the indenter 130 on workpiece 132 and radially along the first or obverse side of the workpiece 132.

Figure 10:
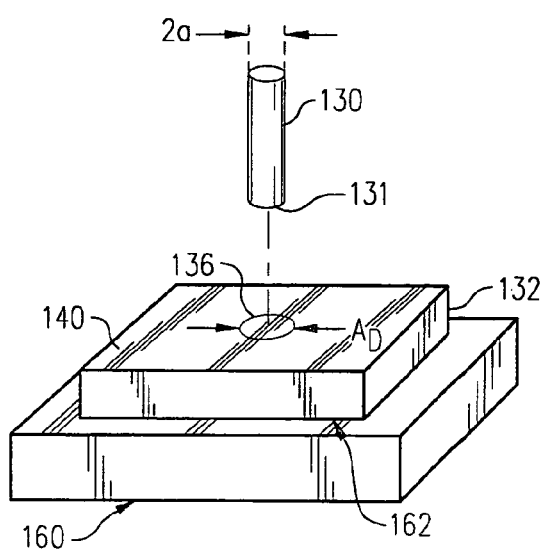
FIG. 10 illustrates one type of set-up step for creation of a dimple on a workpiece with an indenter, while utilizing a backing anvil for support of the workpiece, in preparation for forming an aperture having improved fatigue life properties in the workpiece at a pre-selected location.
Figure 11:
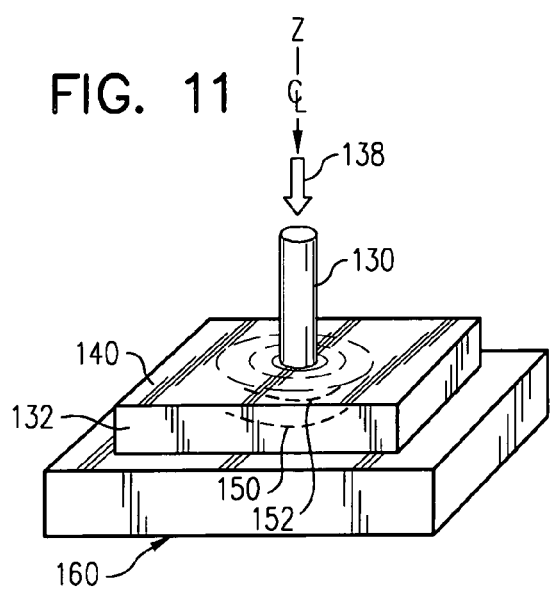
FIG. 11 illustrates the step for impacting one-side of a workpiece with an indenter to form a dimple in the workpiece at a pre-selected location where it is desired to create an aperture having improved fatigue life properties, such as a "rivet-hole".

Turning now to FIGS. 10 and 11, a slightly different method is illustrated, wherein the workpiece 132 is provided with a backing anvil 160 to support the workpiece 132 from the second or reverse side 162 of workpiece 132. In FIG. 10, the set-up step for method(s) to create a dimple on a workpiece with an indenter 130 is shown, in preparation for forming an aperture in the workpiece at a pre-selected location. FIG. 11 illustrates the step of impacting one side of workpiece 132 with indenter 130 to form a dimple in the workpiece 132 at a pre-selected location where it is desired to create an aperture such as a "rivet-hole".

Figure 12:
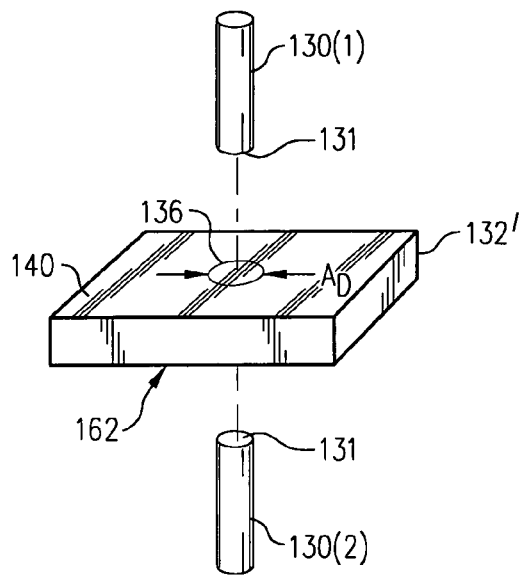
FIG. 12 illustrates one type of set-up step impacting both the obverse and the reverse sides of a workpiece with indenters to form dimples in both sides of the workpiece at a pre-selected location where it is desired to create an aperture with improved fatigue life properties, such as a "rivet-hole".
Figure 13:
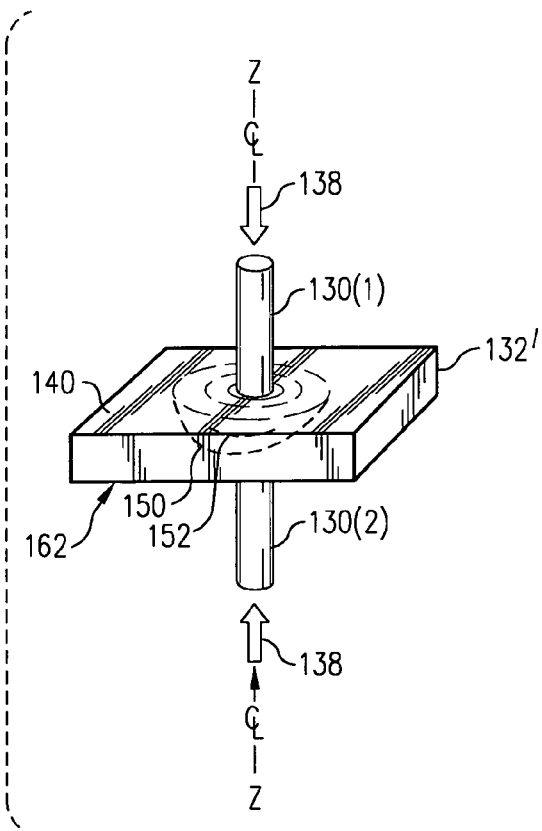
FIG. 13 illustrates the step of impacting both the obverse and the reverse sides of a workpiece with indenters to form dimples in both sides of the workpiece at a pre-selected location where it is desired to create an aperture with improved fatigue life properties, such as a "rivet-hole".

In FIGS. 12 and 13, the two-sided method for impacting both the obverse 140 and the reverse 162 sides of a workpiece 132 with a first indenter 130(1) and a second indenter 130( 2), to form dimples 170 (see FIG. 18) in both sides of the workpiece at a pre-selected location where it is desired to create an aperture A such as a "rivet-hole" of diameter $A_D$. The step of both the obverse 140 and the reverse 162 sides of a workpiece 132 with indenters 130( 1) and 130( 2), respectively, to create stress waves 150 and 152 and form dimples 170 in both sides of the workpiece 132 at a pre-selected location where it is desired to create an aperture such as a "rivet-hole". This technique is shown in additional detail in FIGS. 16, 17, 18, and 19, wherein the indenters 130(1) and 130(2) are shown in partial cross-sectional view. Also, as a slight variation in my method, but using the apparatus illustrated in FIGS. 12, 13, and 16, for example, one of the indenters can be provided in a stationary position adjacent the workpiece, and the necessary force to create indentations can be provided by the action of a single indenter.

Figure 17:
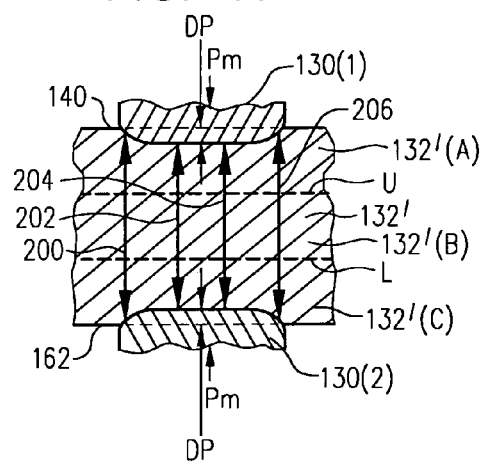
FIG. 17 is a vertical cross-sectional view of first and second optimized shape indenters during the step of impacting a workpiece (or a stack of workpieces) to form a dimple in both the obverse and reverse sides of the workpiece (or stack of workpieces) at a preselected location where it is desired to create an aperture having improved fatigue life.

Another aid to understanding the improvement offered in the art by the process is to look at FIG. 17, wherein workpiece 132' is being impacted by the indenters 130(1) and 130(2). Reference arrows 200, 202, 204, and 206 depict equal impact pressure lines experienced by workpiece 132'. It is important to note that workpiece 132' is not indented by an equal amount in the z direction (normal direction) when examined from side to side along the radial distance r of the indenter, as earlier presented in FIG. 5. In other words, the length of reference arrow 200, from indenter 130(1) to indenter 130(2), is longer than radially inward reference arrow 202, which also extends from indenter 130(1) to indenter 130(2). y direction (side-to-side). Similarly, the length of reference arrow 206, from indenter 130(1) to indenter 130(2), is longer than radially inward reference arrow 204 also extending from indenter 130(1) to indenter 130(2). Thus, equal pressure at the radial positions indicated by reference arrows 200, and 202 results in unequal deformation of the workpiece 132'. The idealized slope of this curve, for one embodiment of my invention, was earlier described in FIG. 6.

Figure 16:
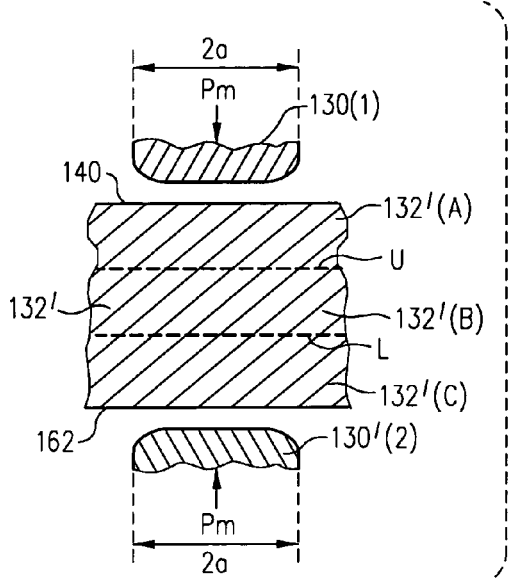
FIG. 16 is a vertical cross-sectional view of first and second optimized shape indenters in one type of set-up step for utilizing this method for forming a dimple in both the obverse and reverse sides of a workpiece (or stacked workpieces) at a preselected location where it is desired to create an aperture having improved fatigue life.

Also depicted in FIGS. 16 and 17 are some reference marks for analytical tools further revealed in FIGS. 38 through 43. It can be observed that workpiece 132' is actually three separate parts (sheets 132'(A), 132'(B), and 132'(C), as indicated by separation lines U and L). In FIGS. 38 through 43, further discussed below, the separation lines are used to modularly explode stress analysis diagrams of workpiece 132' into three components, representing sheets 132'(A), 132'(B) and 132'(C).

Figure 18:
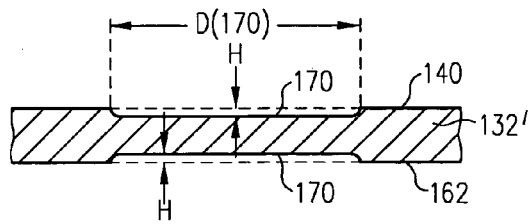
FIG. 18 is a cross-sectional view of a workpiece after formation of optimized dimples in both the obverse and reverse sides.
Figure 19:
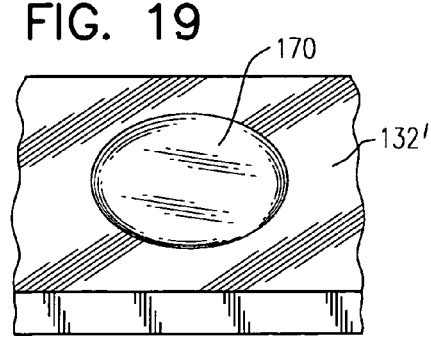
FIG. 19 is a perspective view of a workpiece in which a dimple has been formed a pre-selected location for formation of an aperture having improved fatigue life in the workpiece.
Figure 20:
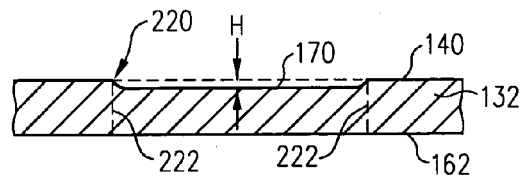
FIG. 20 is a cross-sectional view of a workpiece after formation of a dimple only in the obverse side at a location where it is desired to place an aperture having enhanced fatigue life.

FIGS. 18 and 20 represent a workpieces 132' and 132, respectively, wherein a dimple 170 has been created in both sides of workpiece 132', or in a single side of a workpiece 132, as desired. It is important to note that the actual dimple depth DP when under pressure, as indicated in FIG. 17, may be slightly more than the dimple depth H after the indenter 130(1) and/or 130(2) has been withdrawn due to the slight elastic springback or rebound of the workpiece, once the deforming pressure of the indenter(s) has been released.

As indicated in FIG. 21, a back-taper type drill having a backtaper angle lambda ($\lambda$) can be used to advantageously remove unwanted metal in workpiece 132 or 132'. Preferably, the working face diameter of the drill DD used to achieve an aperture of diameter $A_D$ is larger than the dimple diameter D(170) by a distance 2Q, where Q represents the radial distance from the edge 220 of a dimple to the edge 222 of the hole being drilled. In any event, Q is small, but in some cases, may range down to zero.

FIGS. 22 through 26 represent variations in my method that may be utilized to achieve desired results in unique situations. First, in FIG. 22, a first indenter 300 with contacting end 302 and a second indenter 304 with a contacting end 306 are provided wherein the contacting end 302 area and the contacting end 306 are of differing surface area. FIG. 22 shows the set-up step for using such differential area indenters, and FIG. 23 illustrates the step of providing force on first 300 and second 304 indenters to provide work on workpiece 332 to create dimples therein. As shown in FIG. 22, one type of set-up step for utilizing the method(s) disclosed herein allows for the impacting both the obverse and the reverse sides of a workpiece with indenters of a selected, unequal diameter or non-standard shape, to form dimples in both sides of the workpiece at a pre-selected location where it is desired to create a shaped aperture such as a "rivet-hole", or preferably, a flush rivet hole. FIG. 23 depicts the actual step of impacting both the obverse and the reverse sides of a workpiece with the indenters 300 and 306 of a selected, unequal diameter, to form dimples in both sides of the workpiece 332 at a pre-selected location where it is desired to create an aperture such as a "rivet-hole" or preferably a flush type rivet hole of shank diameter $A_D$, as seen in FIG. 24.

When chamfered or countersink type rivets are utilized, the set up illustrated in FIG. 24 can be advantageously employed for impacting both the obverse 340 and the reverse 362 sides of a workpiece 362 with indenter 370 (with contacting end 371) and indenter 372 of both different shape and of unequal size, to form dimples in both sides of the workpiece 362 at a pre-selected location where it is desired to create an aperture such as a countersink 374 edge "flush-rivet hole". In this case, indenter 372 is provided with a beveled edge 376 to impart stresses in the desired direction, as well as in the normal face end 373 of the indenter 372.

FIGS. 25 and 26 show the use of a pilot hole defined by wall 380 in workpiece 378. In FIGS. 25, an elongated alignment shaft 382 protrudes through workpiece 278 and is received by companion, complementary sized and shaped receiving chamber 384 in indenter 372'. Similarly, in FIG. 26, an elongated alignment shaft 382, preferably affixed to the distal end 371" of indenter 370", protrudes through workpiece 378 and is received in a companion, complementary sized and shaped receiving chamber 384".

Both FIGS. 25 and 26 are partial cross-sectional views which illustrate the set-up step for a method of impacting both the obverse side 390 and the reverse side 392 work piece 378 with indenters 370' and 372' which are both of different shape and of unequal size, or with indenters 370" and 372" which are both of similar shape and size, and where the indenters are centered by use of pilot guide tool 382 received in a centering receiving slot 384 or 384", respectively in at least one of the indenters. Also note that indenter 372' may have a beveled surface 376', and that indenter 370' may have a shaped surface 371'.

Turning now to FIG. 27 the set-up step for utilizing yet another embodiment of the method(s) disclosed herein for impacting both the obverse and the reverse sides of a workpiece is depicted. Here, the use of indenters 430(1) and 430(2), which are of identical shape and size, are provided. This variation in my method utilizes a consumable lamina or wafer W(1) between the indenters 430(1) and the obverse surface 431 of the workpiece 432. Likewise, a consumable lamina or wafer W(2) is utilized between the indenter 430(2) and the reverse surface 434 of the workpiece 432. Each of the consumable lamina has a workpiece side WW and an indenter side WI. The workpiece side WW impacts the workpiece, and when the lamina is squeezed between the workpiece 432 and an indenter, the lamina or wafer W(1) and/or W(2) deforms slightly, spreading the force to the workpiece outward radially a small distance QW from the radius of the indenter utilized, which force decreases rapidly beyond the end of the contacting end 462 or 464 of the respective indenter. After the step of dynamic impacting of the wafers W(1) and W(2), in the manner discussed hereinabove, the step of disengaging the opposing indenters 430(1) and 430(2) is illustrated in FIG. 28. Here, a cross-sectional view shows the disengagement of the opposing indenters from their respective consumable lamina or wafers W(1) and W(2) on opposing sides of a workpiece 432, while utilizing the method(s) disclosed herein for impacting both the obverse 431 and the reverse 434 sides of a workpiece 432 to create dimples 450 and 454 at pre-selected locations. It is preferred that the consumable lamina or wafers W(1) and W(2) be of the same or a similar material to the material comprising workpiece 432, although it should be understood that the method is not limited thereto, and any material which provides the desired uniformity in resultant residual stress profile, as further discussed herein below, can be utilized. However contact end 462 of indenter 430(1), and contacting end 464 of indenter 430(2), can be selected from a variety of shapes, so long as the pressure distribution to the workpiece 432 is substantially uniform, assuming that straight sides are desired on the apertures being created in the workpiece.

The method of use of lamina or wafers is further enhanced via application of a lubricant that performs under high stress, preferably a dry film type lubricant, on the indenter side WI of a wafer while leaving the workpiece side WW of the wafer free of lubricant. This method allows the efforts of the combination of the indenter and wafer to impart even greater residual stresses to the workpiece. Importantly, the reduction in friction on the indenter side WI of the wafer allows it to plastically flow more readily away from the indenter during execution of the process. Also, the clean, non-lubricated condition of the workpiece side WW of the wafer increases friction and allows the wafer to "lock" onto the workpiece surface. In this way, the increased radial displacement from the lubricated side is transferred to the non-lubricated side of the wafer, which is, in turn, transferred to the surface of the workpiece. This results in greater radial flow of the workpiece surface, which results in increased residual stress at, and improved fatigue life of, an aperture created at such location in the workpiece.

Figure 48:
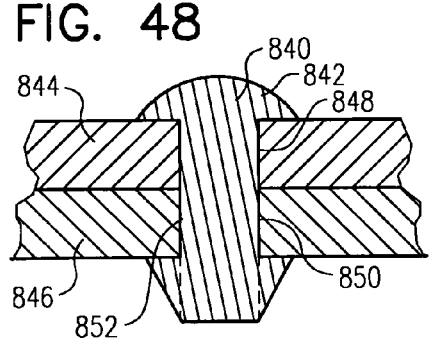
FIG. 48 illustrates a partial cross-sectional view of a structure which utilizes a fastener to join first and second structural parts, and wherein each of the first and second structural parts have had the fastener apertures prepared by the method(s) taught herein.
Figure 49:
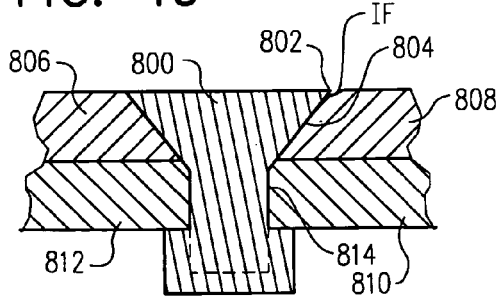
FIG. 49 provides a partial cross-sectional view of a second structure which utilizes a countersunk type fastener to join first and second structural parts, and wherein each of the first and second structural parts have had the fastener apertures prepared by the method(s) taught herein to provide improved fatigue life in the finished structural part.

Importantly, it should be noted that the anticipated actual aperture hole edge location 480 may be located radially inward, of or radially outward of, the peripheral edge 482 of the indenter 430(1) or 430(2). Similarly, the anticipated edge wall location which defines the aperture through workpiece 432 may be radially inward of (wall 480) or within the zone QW earlier discussed (wall 480"), or radially outward of zone QW (wall 480'''). The choice of wall location is dependent on various factors, most importantly of course the amount of beneficial residual stress present, after treatment, at the pre-selected wall location, and also whether or not a slight indentation ID would be advantageous at the outer peripheral edge of a fastener. In this regard, see FIG. 49, which shows the peripheral edge 802 of a fastener 800, with a small indentation IF adjacent thereto. FIG. 49 is particularly interesting since it provides an indication that a countersunk type outer edge wall 804 can be prepared according to the methods described herein to provide a desirable beneficial residual stress pattern in the body 806 of structure 808. Likewise, the body 810 of structure 812 adjacent to the more conventional perpendicular edge wall 814 can be treated to provide a desirable beneficial stress pattern in the body 810. More conventionally, as shown in FIG. 48, a fastener 840 having an externally protruding head 842 is provided to join structural members 844 and 846. In such structures, apertures defined by sidewalls 848 and 850, respectively, accommodate the fastener shank 852. The beneficial residual stress is advantageously provided in both structural members 844 and 846.

Figure 50:
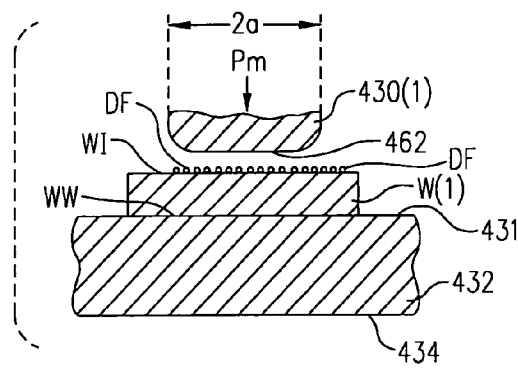
FIG. 50 is a cross-sectional view which shows one type of set-up step for utilizing method(s) for impacting a single side of a workpiece, here showing work on the obverse side of a workpiece, although the reverse side could similarly be worked, by utilizing one indenter and a consumable wafer between the indenter and the workpiece, in order to provide beneficial residual stress near the fastener apertures in the finished structure.
Figure 54:
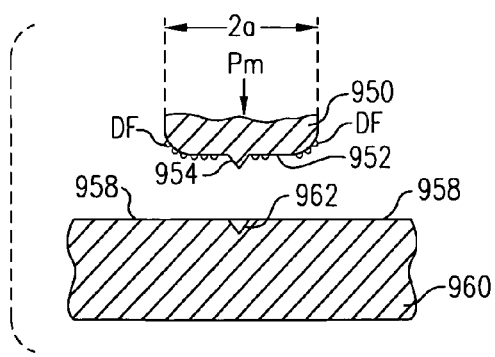
FIG. 54 shows the use of an indenter having an optimized shape contacting edge, but with a small alignment punch located at the center.
Figure 55:
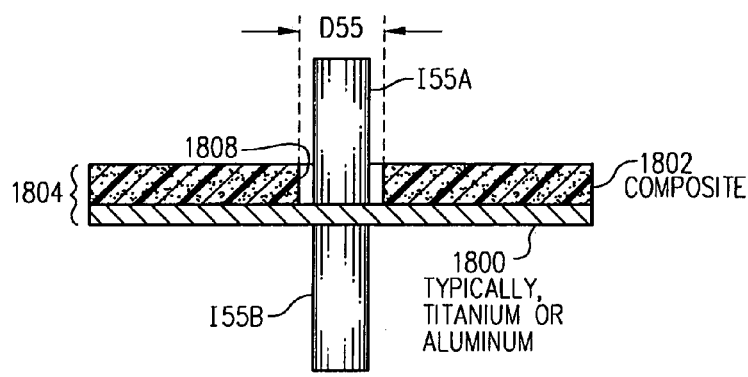
FIGS. 55 through 58 illustrate the use of the process taught herein for providing a fatigue enhanced hole in a composite structure.
Figure 56:
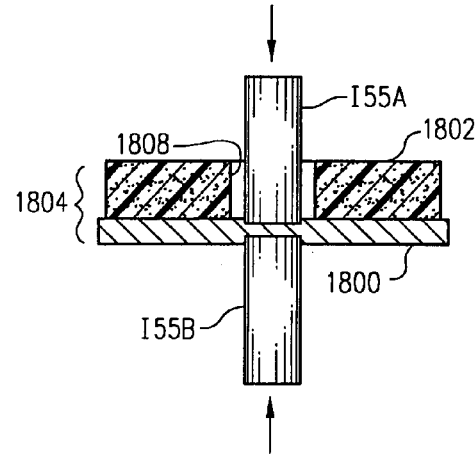

Although it is generally expected that most structures would substantially benefit from increased fatigue resistance being imparted from both the obverse and the reverse sides of the structure. However, in some applications, useful results may arise when only a single side is treated. Such one-sided treatment of a structure is depicted in FIG. 50. That cross-sectional view shows the set-up step for impacting a single side of a workpiece 432, by showing work on only the obverse side 431 of that workpiece. Note that use of a dry film lubricant DF is indicated between the indenter surface 462 and the indenter side WI of workpiece W(1). The reverse side 434 could similarly be worked, by utilizing another indenter 430(2) and an additional consumable wafer W(2) between the indenter 430(2) and the workpiece 432, in order to provide beneficial residual stress near the fastener apertures in the finished structure fabricated from the workpiece 432. Lubricant can also be utilized with an indenter alone (FIG. 54).

Figure 29:
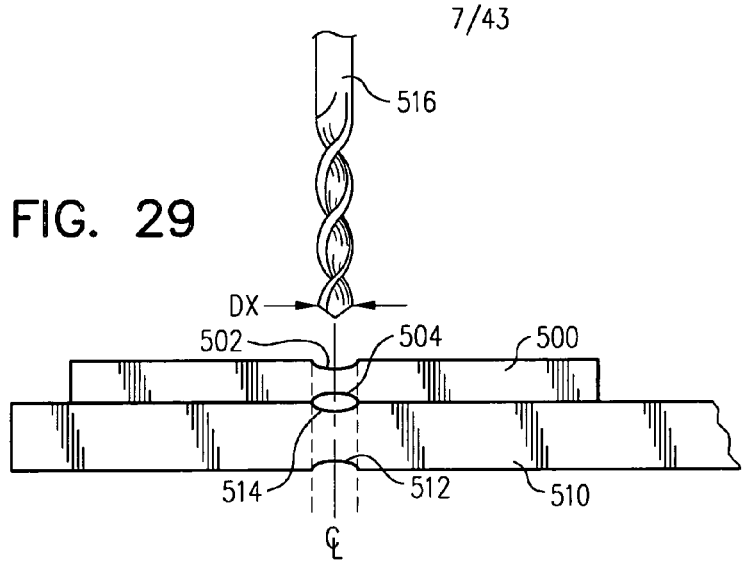
FIG. 29 is a side elevation view which illustrates one type of set-up step for drilling a pair of workpieces at an aligned, pre-selected location, and using workpieces wherein both have been prepared with dimples in the obverse and reverse side, and wherein the dimples have been centered in order to create beneficial residual stresses at a desired location for lap joint between the first and second workpieces.
Figure 30:
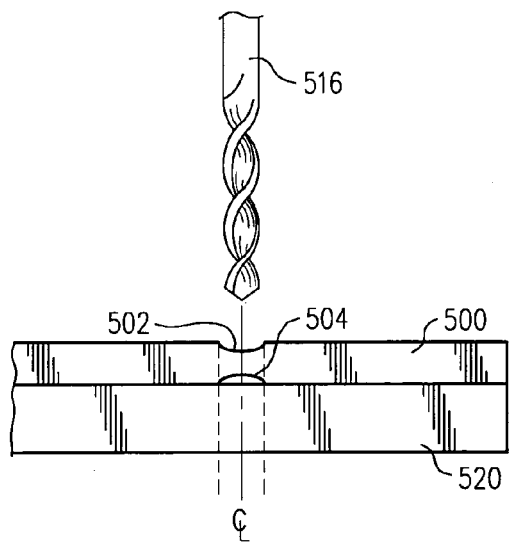
FIG. 30 is a side elevation view which illustrates one type of set-up step for drilling a pair of workpieces at an aligned, pre-selected location, and using workpieces wherein only one workpiece has been prepared for improved fatigue life, and wherein the dimples in the first workpiece have been centered over a desired location in the second workpiece in order to secure the first and second workpieces at a desired location for the beneficial residual stresses in a joint.

FIGS. 29 and 30 illustrate the set-up step for drilling a pair of workpieces at an aligned, pre-selected location, in order to eventually produce a finished fabricated structure as depicted in FIGS. 48 or 49. In FIG. 29, a workpiece 500 having dimples 502 and 504 therein, and workpiece 510, having dimples 512 and 514 therein, are aligned along a centerline so that concentric apertures can be created through workpieces 500 and 510 by drilling therethrough with drill 516 of preselected diameter DX. Similarly, in FIG. 30, workpieces 500 and 520 (in which no beneficial stress relief pattern has been created) are aligned along a centerline, so that concentric apertures can be created through both workpieces by drill 516. In both FIGS. 29 and 30, lap type joints can be created using at least one workpiece wherein a fastener receiving aperture has been provided with an improved fatigue life, by preparing dimples in the obverse and reverse side, and wherein the wherein the dimples have been centered in order to create beneficial residual stresses at a desired location with respect to the final fastener receiving apertures. Alternately, a workpiece 500 may be worked on only one side in the manner shown with respect to workpiece 132 in FIGS. 19 and 20.

It is also important to understand that many unusual configurations, non-circular type apertures can be treated to provide beneficial residual stress levels at desired locations adjacent the interior edge wall of the hole. In FIGS. 31 and 32, top plan views of two such structures, 600 and 602 are illustrated. In structure 600, an interior sidewall 604 is provided of generally elliptical shape. In structure 602, a parallelogram 604 shaped aperture wall having radiused corners 606, 608, 610, and 612 are provided. Thus, structures having non-circular holes therein can advantageously be treated to provide beneficial residual stress levels at desired locations in the structure.

Figure 33:
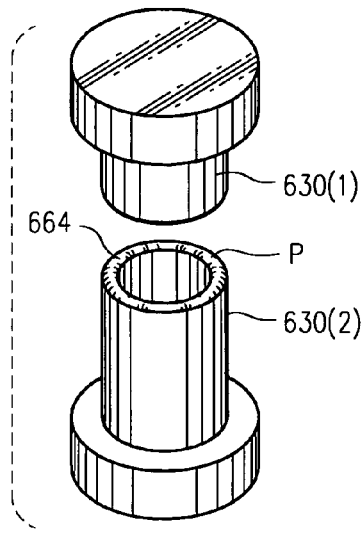
FIG. 33 is a perspective view of a opposing, shaped (and preferably hollow) oversize indenters which can be shaped, at least along the outer periphery of the indenter, in an optimized manner for treatment of a large cut-out, or of a non-round hole in a workpiece.
Figure 34:
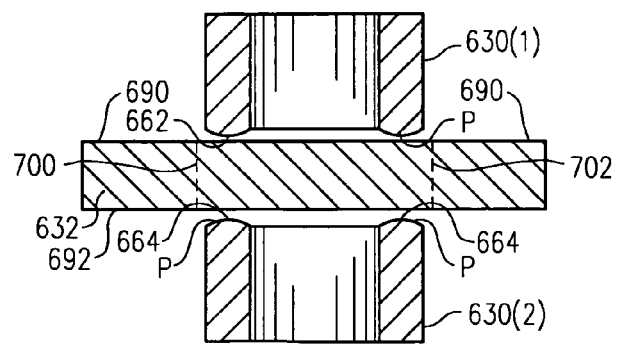
FIG. 34 is a vertical cross-sectional view of a pair of shaped (preferably hollow), oversize indenters at the step of being positioned adjacent the obverse and the reverse side of a workpiece, prior to working a structure in order to create beneficial residual stress at desired locations in a large cutout, or of a non-circular cutout.
Figure 35:
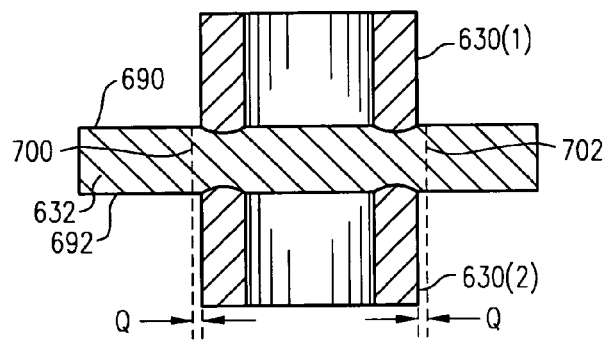
FIG. 35 is a vertical cross-sectional view of a pair of hollow, oversize indenters at the step of impacting the obverse and the reverse side of a workpiece, while working a structure in order to create beneficial residual stress at desired locations in an oversize cutout or in a non-circular cutout.

In order to provide the beneficial residual stress levels in relatively large or oversized circular apertures, or in unusual shaped structures, one useful method that I have found is to provide opposing, oversize indenters, preferably hollow (or at least with partial relief between the contacting face and the workpiece, even if not hollow, i.e., so that the footprint of the indenter is not the same as the area bounded by the sidewalls of the indenter) as depicted in FIGS. 33, 34, and 35. Such indenters 630(1) and 630(2) can be shaped, at least along the distal periphery P of the contacting end 662 and 664 of the indenters 630(1) and 630(2), respectively, in an optimized manner which is especially advantageous for treatment of large or non-round holes in a workpiece 632; however, it must be understood that the use of such indenter shapes is not limited to such over-size or non-round structures. In FIG. 33, a perspective view of such indenters 630(1) and 630(2) is shown. In FIG. 34, a vertical cross-sectional view of a pair of hollow type oversize indenters 630(1) and 630(2) are shown at the step of being positioned adjacent the obverse 690 and the reverse 692 side of a workpiece 632, prior to impacting a structure in order to create beneficial residual stress at desired locations in an oversize or non-circular cutout. Particularly in FIG. 34, and also throughout following FIGS. 35, 36, and 37, note that the broken lines 700 and 702 indicating the intended dimensions of an interior aperture through the workpiece 632, with that sidewalls 704 and 706 are ultimately created along the lines indicated at 700 and 702. In FIG. 37, an end wall 708 is also shown, which would be at another cross-sectional location at the rear of the indenters shown in the perspective view of FIG. 33. Note that the dimples 694 and 695 on the obverse side 690, and the dimples 696 and 697 on the reverse side 692 are located inwardly (here, radially, with circular indenters) from the broken sidewall indicating lines 700 and 702, so that the beneficial residual stress is at desired locations in an oversize or non-circular cutout.

Figure 36:
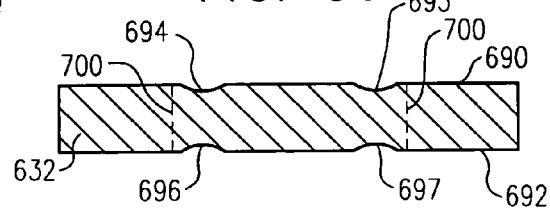
FIG. 36 is a vertical cross-sectional view of the structure just shown in FIGS. 34 and 35 above, but now shown with dimples in the obverse and reverse sides at the locations where my optimized shaped indenters have been utilized to impart beneficial residual stresses in the structure.
Figure 37:
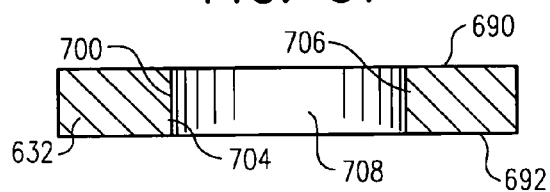
FIG. 37 is the oversize structure first shown in FIGS. 34, 35, and 36, but now showing the structure after cutout of material necessary to form an aperture of a desired size, which structure retains beneficial residual stress substantially uniformly from the obverse side to the reverse side, along pre-selected portions of the interior sidewall that defines the aperture through the structure.

The treated workpiece 632, before machining for removal of unwanted material, is shown in FIG. 36. The oversize or non-round cutout treatment is finally represented in FIG. 37, showing how interior sidewalls 704, 706, and 708 extend between the obverse and reverse sides of workpiece 632, with beneficial residual stresses in the structure.

Figure 38:
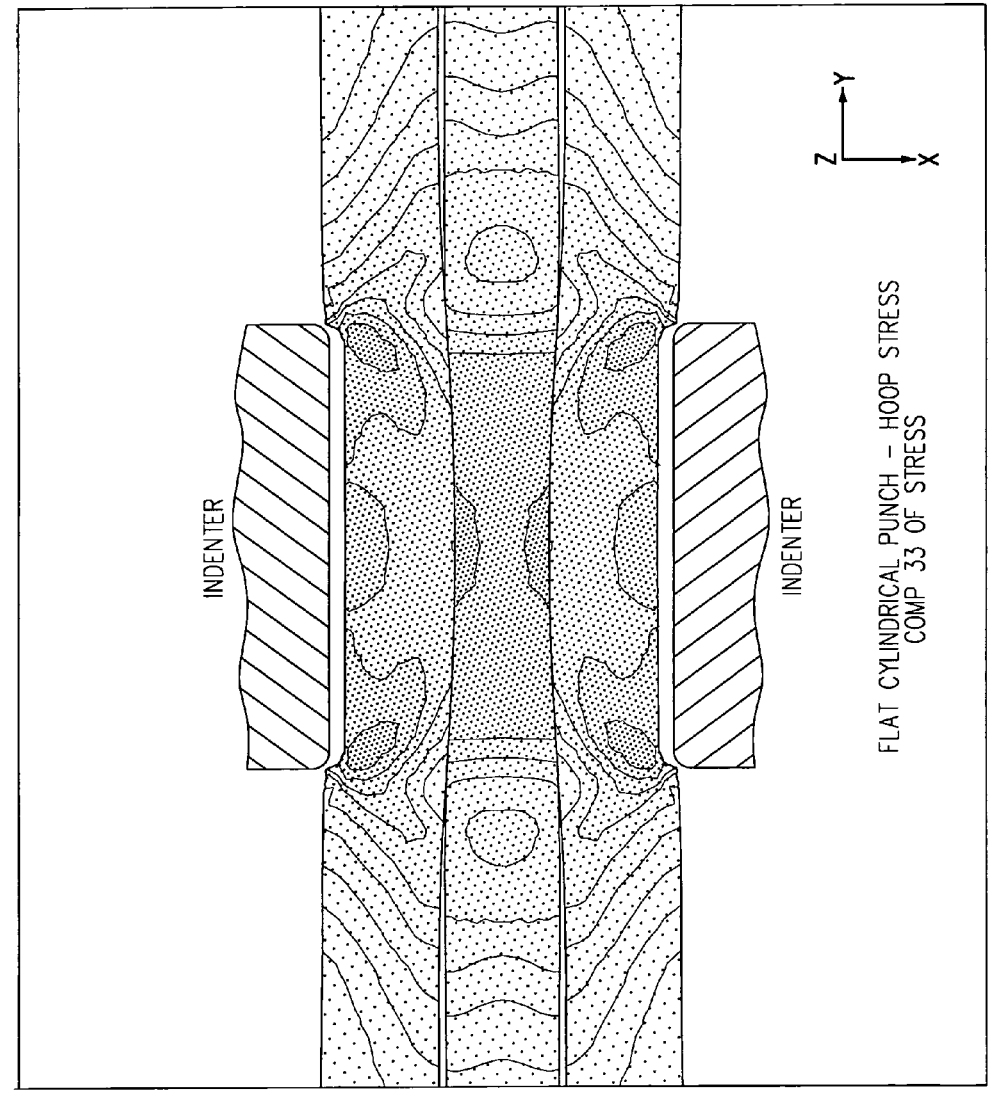
FIG. 38 shows the stress field in a modularly exploded cross-sectional view of three workpiece sheets being acted on by a pair of flat cylindrical punch type indenters, showing in detail the stress field created in the workpieces by such an indenter.
Figure 39:
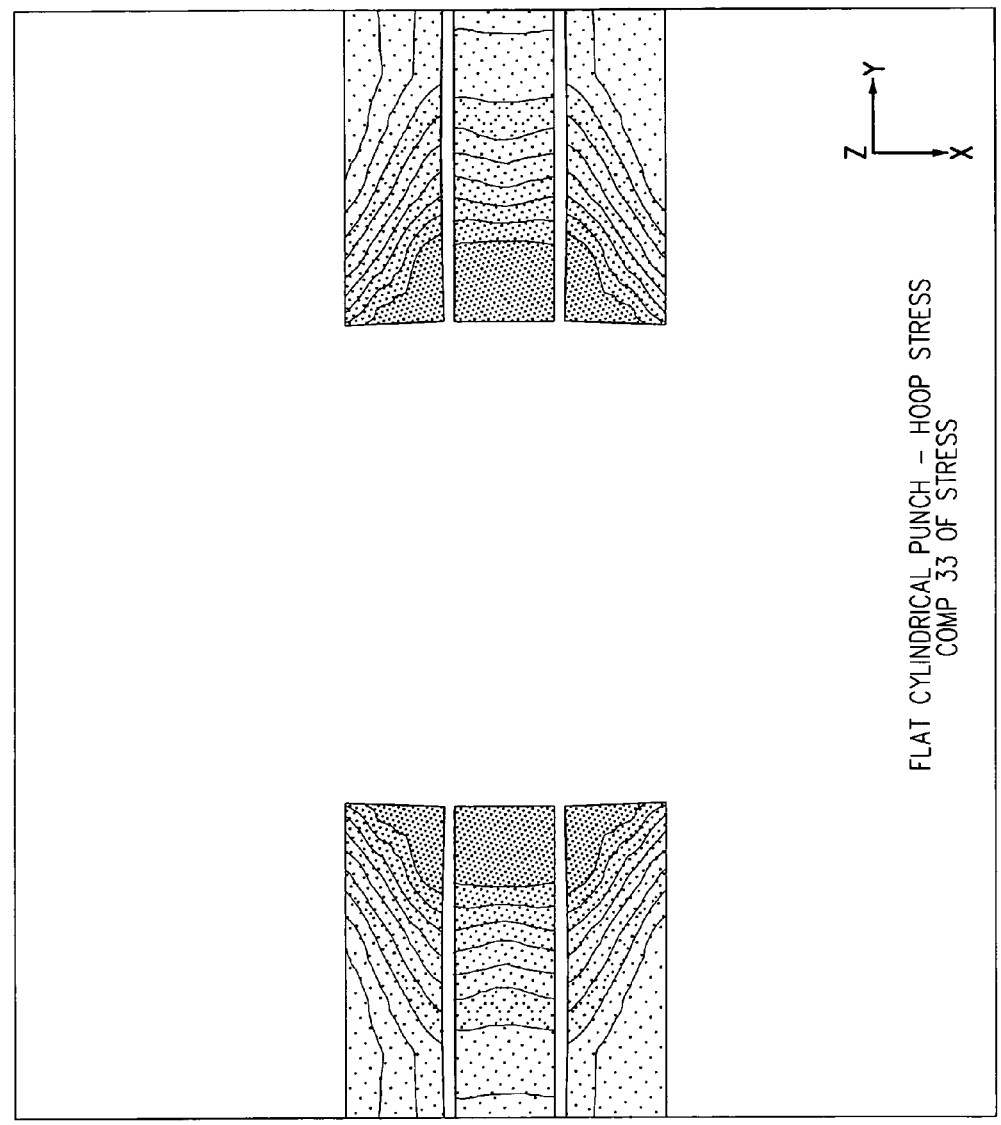
FIG. 39 is a modularly exploded cross sectional view of three workpiece sheets after being cold worked by a pair of flat cylindrical punch type indenters, as shown in FIG. 38, now showing in detail the stress field present in the workpiece sheets after drilling to create an aperture through the workpieces.

Attention is now directed to the series of drawings FIG. 38 through FIG. 43, where the results of the method(s) disclosed herein can be clearly compared to and its improvement shown over the prior art. A modularly exploded cross sectional view of a stack of three workpiece sheets is shown in FIG. 38 after being cold worked by a flat cylindrical punch. The detailed code, with a legend on the side indicating beneficial residual stress in pounds per square inch, clearly shows in FIG. 39 that the residual stress field present in the workpieces after drilling to create an aperture in the workpieces provides workpieces only modest beneficial stress increase near the obverse surface, and similarly on modest beneficial stress increase near the reverse surface. However, such prior art techniques create significant beneficial residual stress at the mid-plane of the aperture, as is seen in FIG. 39. Unfortunately, this allows fatigue cracks to initiate at the surface (either obverse or reverse sides).

Figure 40:
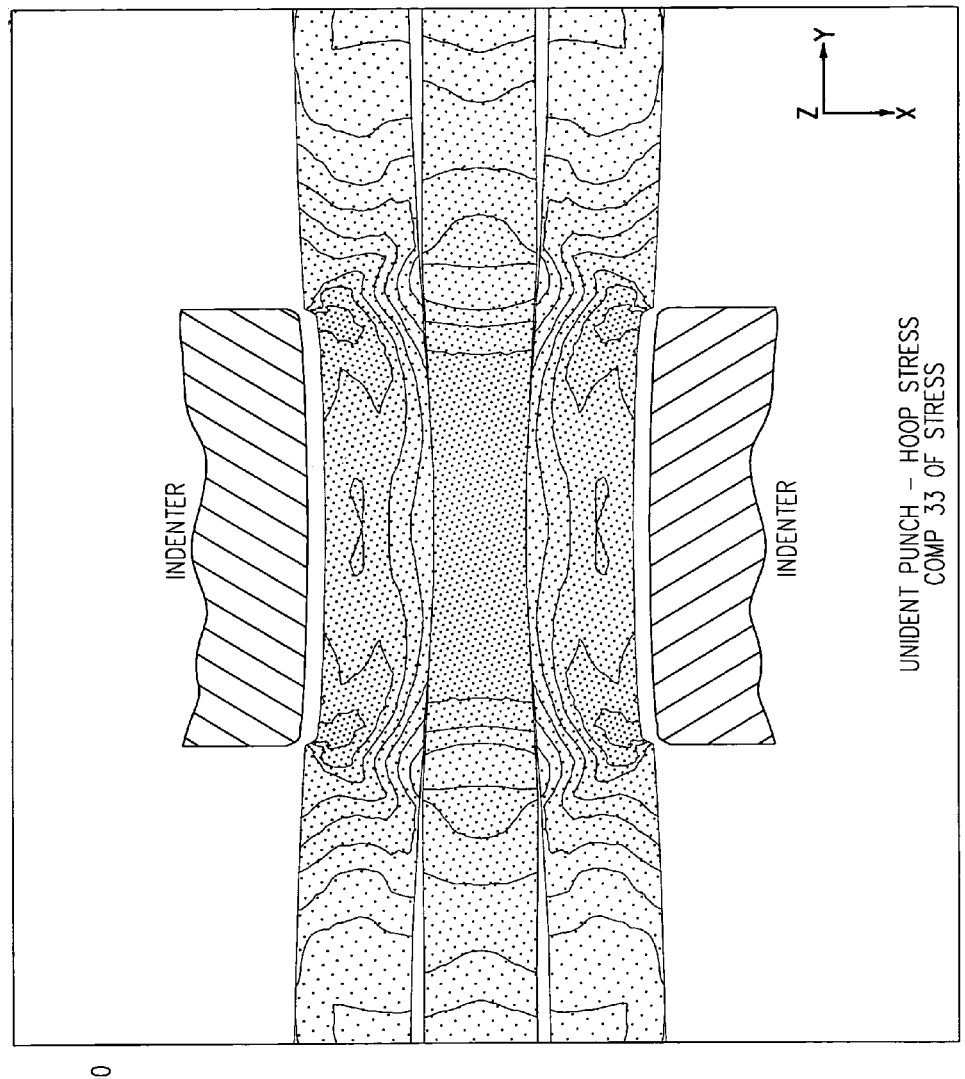
FIG. 40 is modularly exploded cross-sectional view of three workpiece sheets being acted on at the obverse and reverse sides by a pair of optimized shaped indenters, showing in detail the stress field created in the workpiece sheets by such indenters.
Figure 41:
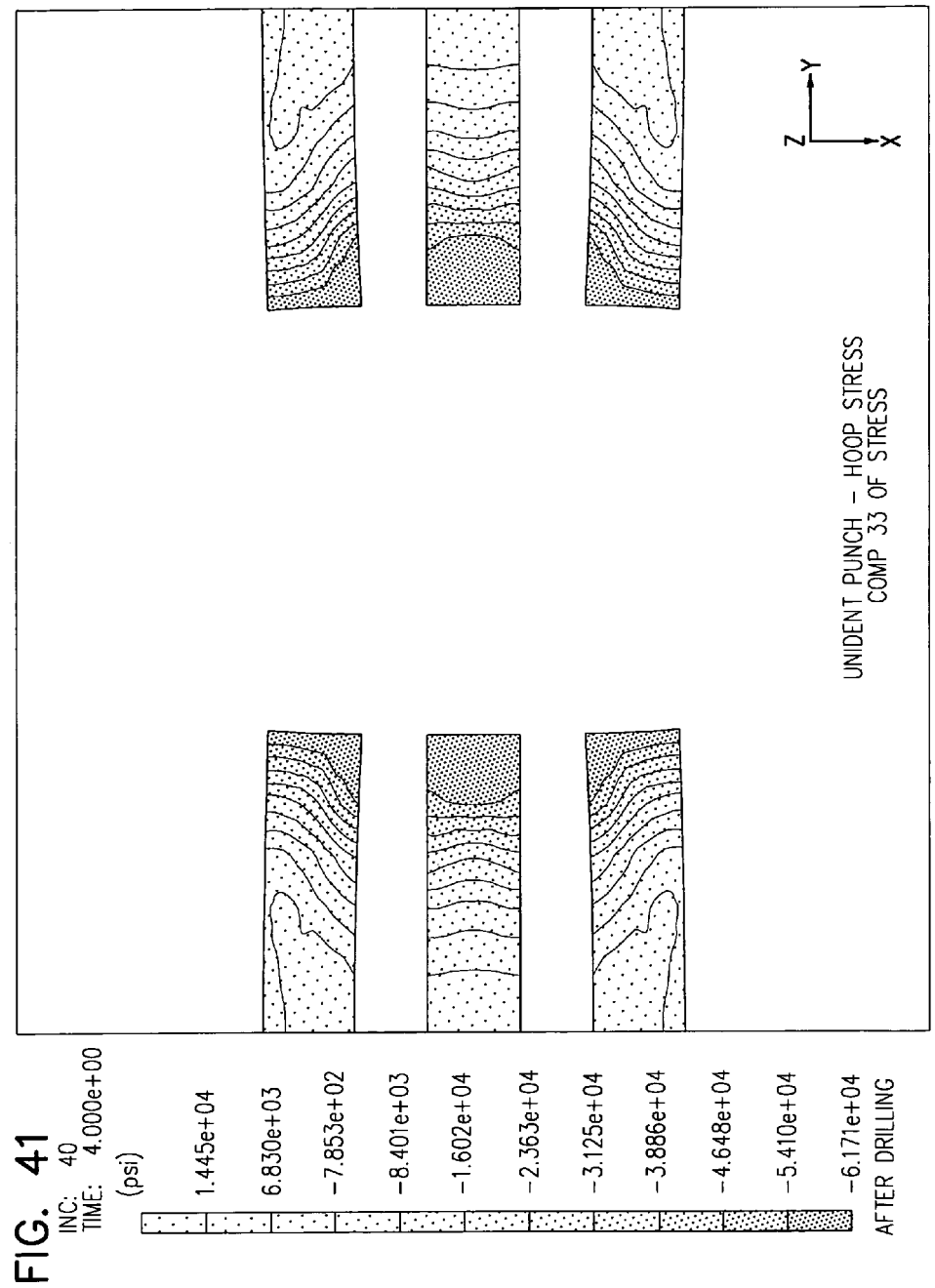
FIG. 41 is a modularly exploded cross-sectional view of three workpiece sheets after being cold worked by a pair of optimized shape indenters, as shown in FIG. 40, now showing in detail the stress field present in the workpiece sheets after drilling to create an aperture in the workpiece.

In contrast, with an optimized indenter, and using the methods taught herein, by examining closely the results shown in FIG. 40 and FIG. 41, it can be clearly seen in this modularly exploded cross-sectional view of three workpiece sheets being acted on at the obverse and reverse sides by an optimized indenter, that beneficial residual stress is imparted substantially uniformly throughout the workpiece structure. Particularly in FIG. 41, it can be seen that workpiece after drilling to create an aperture in the workpiece, provides a more uniform beneficial residual stress profile.

Figure 42:
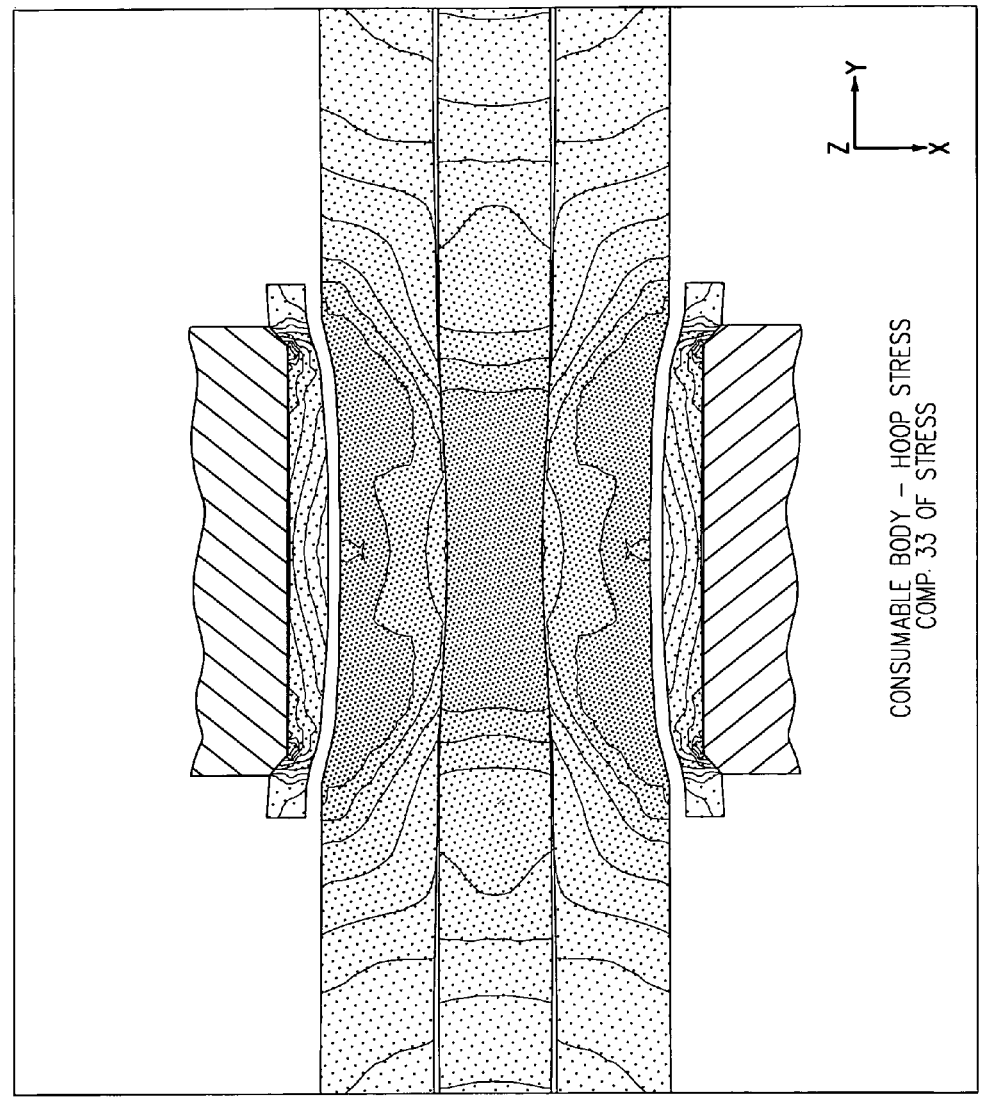
FIG. 42 is a modularly exploded cross-sectional view of three workpiece sheets after the step of working the workpiece sheets by utilizing indenters and a consumable lamina or wafer body between the workpiece sheets and each of the indenters, as the desirable deformation is imparted into both the obverse and reverse sides of the three workpiece package.
Figure 43:
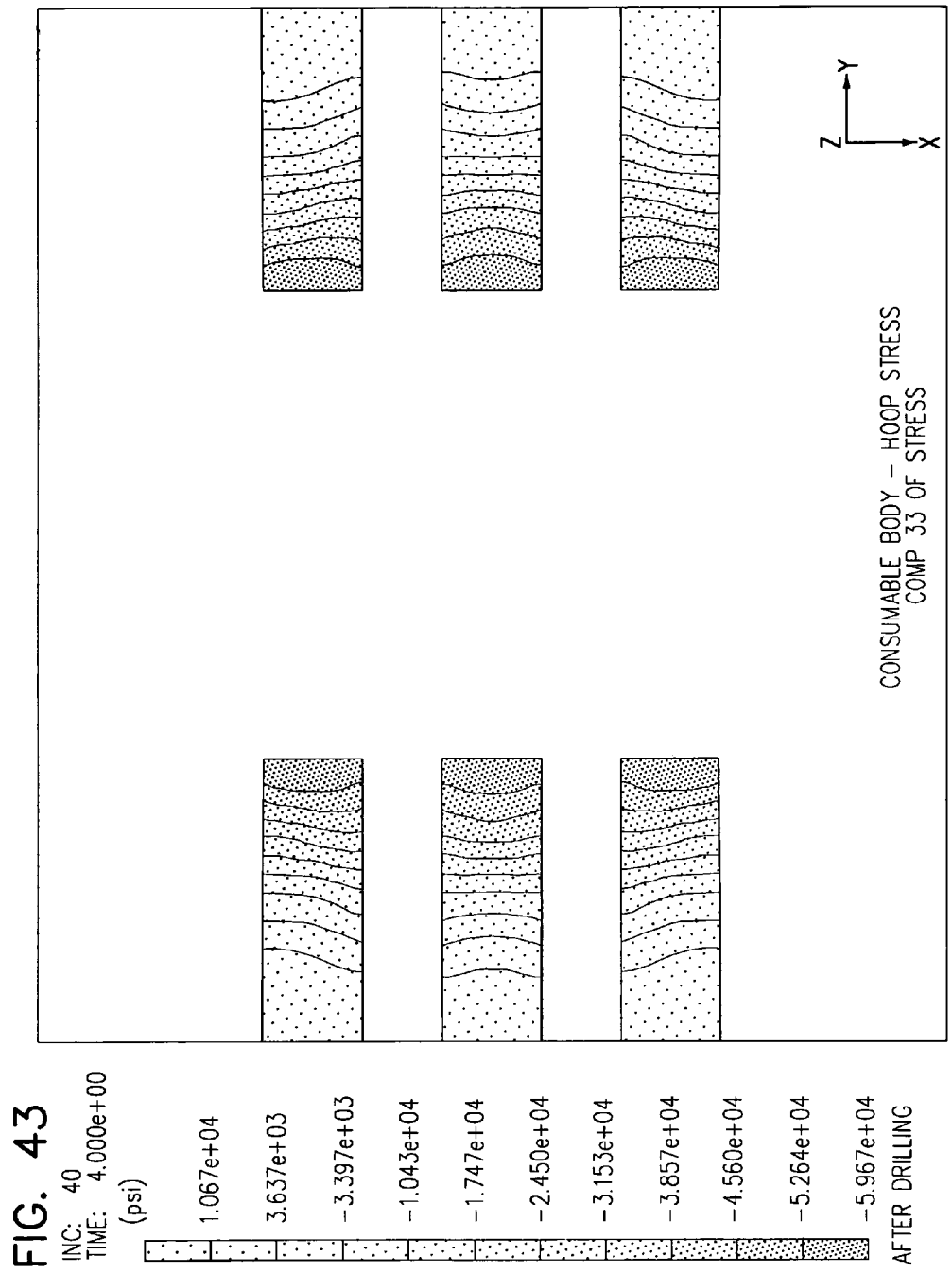
FIG. 43 is a modularly exploded cross-sectional view of three workpiece sheets after the step of drilling an aperture at a pre-selected location in a workpiece, after the step shown in FIG. 42 of utilizing indenters and a consumable wafer body between the workpiece sheets and each of the indenters, and now clearly showing the desirable and beneficial residual stress pattern provided substantially uniformly along the interior edge wall of the aperture in each of the workpiece sheets.

In one particularly advantageous embodiment, depicted in FIG. 42 and 43, an exploded cross-sectional view is shown of three workpiece sheets after the step of working three workpiece sheets by utilizing opposing indenters and a consumable wafer body between the indenters and the workpiece which the indenter strikes. Desirable deformation is imparted into both the obverse and reverse sides of each of the workpieces.

Importantly, FIG. 43 depicts a modularly exploded cross-sectional view of three workpiece sheets after the step of drilling an aperture at a pre-selected location through the stack of three workpieces, which step has been performed after the step shown in FIG. 42 of utilizing opposing indenters and a consumable wafer body between the indenters and the workpiece on which the indenters act. In this figure, it is now clearly shown how the desirable and beneficial residual stress pattern is provided substantially uniformly along the interior edge wall of the aperture in the workpiece. Thus, it can clearly be seen that uniformity is achieved in the beneficial residual stress along the aperture sidewall.

Figure 44:
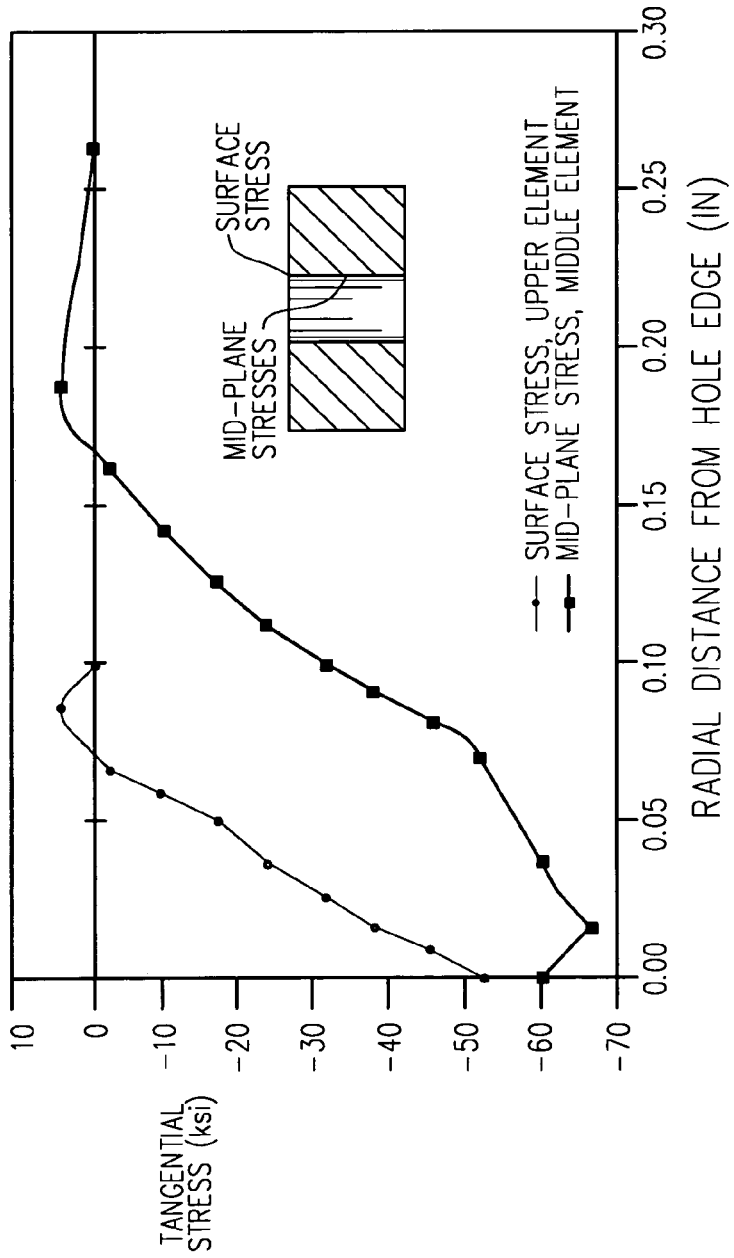
FIG. 44 is a graphical plot of the tangential stress (in thousand pounds per square inch) versus radial distance from a hole (aperture) edge in a structure which has been cold worked by prior art flat bottomed cylindrical mandrel methods.

This important finding can be further confirmed by comparison of FIGS. 44, and 45. In FIG. 44, the graphical plot of the tangential stress (in thousand pounds per square inch) versus radial distance from a hole (aperture) edge in a structure which has been cold worked by prior art flat bottomed cylindrical mandrel methods is shown. Clearly, there is a large departure between stress at some distance from the obverse or reverse surface edge of the hole. However, with the method(s) disclosed herein, using an optimized shaped end indenter, the beneficial residual stress in an aperture wall, when examined along the through-wall direction, becomes substantially matched between the surface and the mid-plane areas.

In fact, the improved method provides beneficial residual stress at least as good as the split sleeve process, as revealed in FIG. 46. In that graph, a plot of the residual tangential stress versus radial distance from a hole (aperture) edge, in a structure which has utilized the split sleeve method for improving fatigue life, as compared to both surface and aperture mid-plane residual tangential stress results for a structure fabricated utilizing in Type 2024-T3 Aluminum.

Most importantly, when direct comparisons of fatigue life are conducted, as is illustrated in FIG. 47, structures prepared by the process clearly show improved fatigue life. FIG. 47 is a semi-log graphical plot of the maximum net stress versus cycles to failure for (a) sample results reported for parts treated by split sleeve cold working; (b) untreated control samples of materials of the type treated and tested herein, and (c) results for sample structures treated by the method(s) taught herein. My samples showed fatigue life in the range of about 400,000 to about 4,000,000 cycles, more or less, depending upon applied loading, and slightly exceeded the predicted life for one of the best methods of fatigue life enhancement which is currently commercially employed, specifically, split-sleeve cold working.

It should also be noted that the present invention can be used with any convenient apparatus which utilizes an indenter with a preselected force to effect the necessary deformation of the workpiece to provide a desired residual stress pattern. However, it is preferably practiced with the use of an optimized, shaped indenter acting on a workpiece with sufficient force to effect adequate work in the workpiece. In the latter regard, electromechanical impact type apparatus may be advantageously applied by those of skill in the art and to whom this disclosure is directed, in order to achieve the results and to practice the improved methods taught herein.

A simplistic review of certain variations in the method of practicing my invention are shown in FIGS. 51A, 51B, 51C, 51D, and 5E. In FIG. 51A, the method(s) described herein are practiced with a single indenter 800 acting on only an obverse side 802 of workpiece 804. No support is required for the backside of the workpiece as the strength or inertia of the workpiece 804 structure provides sufficient reaction force for the indentation process. Also, although an anticipated aperture through workpiece 804 is defined by dotted line 806 so as to provide a through passageway defined by an edge wall at line 806, it should be understood that the process is advantageous for providing improved fatigue life where only a dead end hole is provided (e.g., starting at the obverse side 802 and ending at a bottom indicated by line 808), rather than a through passageway. Turning now to FIG. 51B, the method is shown being practiced with a single indenter 800 acting on workpiece 804, with use of a backing surface 810 on a relatively large backing structure 812. In this method of operation, a dimple is formed on the processed, obverse side 802 of the workpiece 804. This method may be advantageously employed when the inherent strength or inertia of the workpiece 804 is not sufficient to utilize the method depicted in FIG. 51A, or when working conditions utilizing this method may otherwise facilitate an easier process and/or an improved result. In FIG. 51C, another variation is depicted, where a single indenter 800 acts on the obverse side 802 of workpiece 804, and where an anvil 820 or other suitable backing structure, preferably of complementary size and shape to the indenter 800 and having a forming surface 822 complementary to the surface 824 shape of indenter 800, is provided to act on the reverse 826 side of workpiece 804. This variation of my method leaves dimples of substantially equal depth on the obverse 802 and the reverse 826 sides of the workpiece 804. Yet another variation is depicted in FIG. 51D, where the indenters 800 and 800' are used to act on the obverse 802 and reverse 826 sides of workpiece 804. This "two-sided" method provides optimal penetration depth of work in the workpiece, whether quasi-statically, or actuated at a high velocity, or "excited" with a stress wave to impart dimples in the workpiece, and thus provides the greatest depth of the resultant residual stresses. Finally, FIG. 51E depicts another two-sided process of a workpiece using unequal diameter and/or shaped indenters 800" and 800'''. This variation on my method may be utilized for the processing of a structure that contains flush type fasteners. Also, via comparison of FIG. 51E and 51C, it should be understood that unequal diameter and/or shaped indenters can be advantageously utilized. Also, the use of a wafer intermediate the indenter 800 and the workpiece 804 may be employed in any of the methods depicted in FIGS. 51A through 51E, in the manner just depicted above in relation to FIG. 50. Moreover, it should be appreciated that the indenters 800, etc., depicted in these FIGS. 51A through 51E can employ both prior art tooling, such as flat bottom punches, as well as my optimized tooling which provides a unique indenter end shape, and hollow indenters, and unequal diameter and/or shaped indenters, all as discussed and taught herein, while practicing my simple two-step (indent, drill) manufacturing process for structures having improved fatigue life fastener apertures therein.

Figure 52:
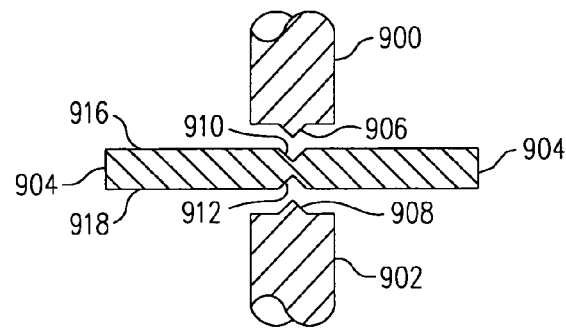
FIG. 52 shows the use of opposing indenters of equal size which have, on the face thereof, alignment punches.
Figure 53:
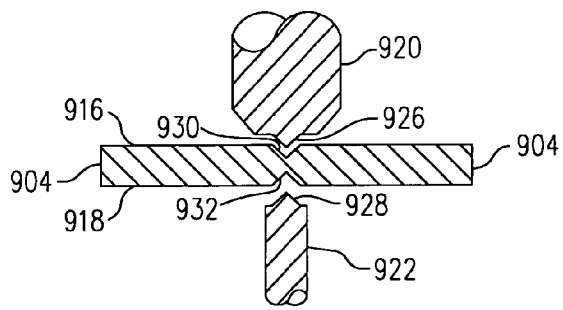
FIG. 53 shows the use of opposing indenters of unequal size which have, on the face thereof, alignment punches.

In addition to the variations in my method as just briefly reviewed, it should be appreciated that with respect to certain workpieces, and various robotic manufacturing devices or automated drilling equipment, it would be advantageous to add a drill locating feature to the tool used. Further variations on this theme are suggested in FIGS. 52, 53, and 54, as well as in FIGS. 144 through 148 further discussed below. In FIG. 52, equal size indenters 900 and 902 are shown acting on workpiece 904. Indenters 900 and 902 have centering guides 906 and 908, respectively, which are sized and shaped (preferably, generally cone shaped) for interfitting engagement with preformed depressions 910 and 912 (each V-shaped in this cross-sectional view), respectively, in obverse 916 and reverse 918 sides of workpiece 904. Similarly, in FIG. 53, unequal size indenters 920 and 922 are shown acting on workpiece 904. Indenters 920 and 922 have centering guides 926 and 928, respectively, which are sized and shaped (preferably, cone shaped) for interfitting engagement with preformed depressions 930 and 932 (each V-shaped in this cross-sectional view), respectively, in obverse 916 and reverse 918 sides of workpiece 904. As depicted in FIG. 54, in another embodiment an indenter 950 having a lower optimized shaped surface 952 is utilized, having at the center thereof a small downwardly projecting centering punch portion 954. The downwardly projecting centering punch portion 954 is preferably cone shaped, and, upon impact of the face (here, the obverse side 958 of workpiece 960), leaves a small indentation as projected by broken line 962, so as to form and therefore provide a centering mechanism for the subsequent hole forming operation. This latter embodiment is further discussed with respect to FIGS. 144 through 148 below.

Figure 57:
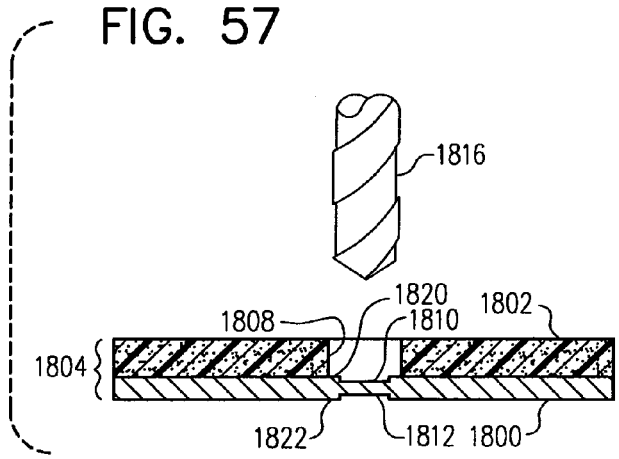
Figure 58:
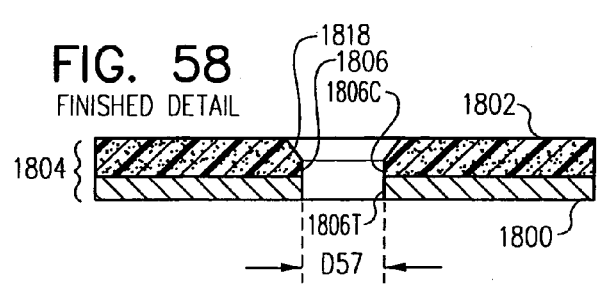

The disclosed method(s) of treating various shaped workpieces to improve the fatigue life has many unique and innovative applications for the manufacture of parts with improved fatigue life. For example, in FIGS. 55, 56, 57 and 58, a method for treating a composite structure is illustrated. As shown, this type of structure is often encountered in high performance aircraft construction, where titanium 1800 or other light metal such as aluminum is layered with a fibrous, high strength composite 1802 to provide a workpiece stack 1804 with desired high strength properties. To prepare a finished aperture defined by sidewall 1806 (see FIG. 58), an initial aperture in composite layer 1802 is provided, defined by sidewall 1808. The diameter D55 of the hole in the composite defined by sidewall 1808 is slightly undersized from the diameter D57 of the finished hole, as shown in FIG. 58. Importantly, diameter D55 is slightly larger than indenter I55A and I55B, to allow passage of the indenter I55A through the composite material 1802. The titanium 1800 is dimpled (1810, 1812, see FIG. 57) by indenters I55A and I55B, respectively. Then, the workpiece 1804 is match drilled by drill 1816 to provide final hole diameter D57 as defined by sidewall 1806. Note that sidewall 1806T in the titanium (or other metal) sheet now matches the diameter of sidewall 1806C in the composite portion, as illustrated in FIG. 58. Also note, as illustrated in FIG. 58, that the aperture can be provided with a countersunk shoulder 1818 to accommodate an aerodynamic flush fastener (not shown). Further, as noted in the various figures and accompanying discussion above, the titanium or other metal 1800 may be indented on either the obverse 1820 or the reverse 1822 side, or both.

Next, as illustrated in FIGS. 69 through 77, the unique method(s) described herein may be applied to tubular objects. Such objects are found in important applications such as medical implants, pressurized piping, drilling equipment, process equipment, or in aircraft applications such as struts, actuators and the like. As noted in FIG. 75–77, indenters I58A and/or I58B are provided to act on a tubular workpiece 1830 having inside diameter I.D. and outside diameter O.D. Indenters I58A and/or I58B have a unique concavity in the working surface 1831 which is designed to apply a substantially uniform pressure profile against the outer surface 1832 of workpiece 1830, as more generally described herein. Typically, the diameter D of indenters I58A and/or I58B is slightly less than the diameter D60 of the finished hole as noted in FIG. 77. Indenters I59A and/or I59B similarly act on workpiece 1830 when an optional support plug or mandrel 1840 is utilized as a backing anvil. Note that one or more holes defined by sidewall 1842 (and with diameter D60) can be provided in a workpiece 1830 by use of this method, after the step of machining the desired one or more holes completed.

Figure 70:
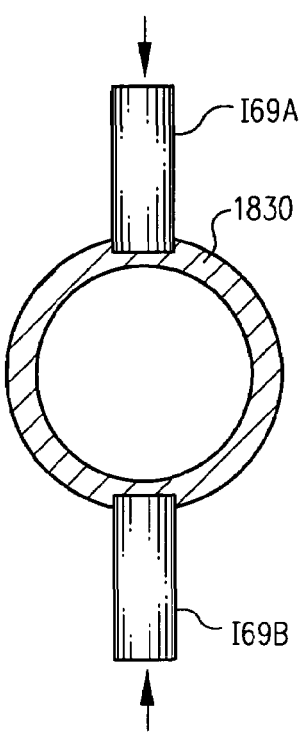
FIG. 70 shows the tubular structure first shown in FIG. 69 being treated without using an optional internal support or backing anvil.
Figure 71:
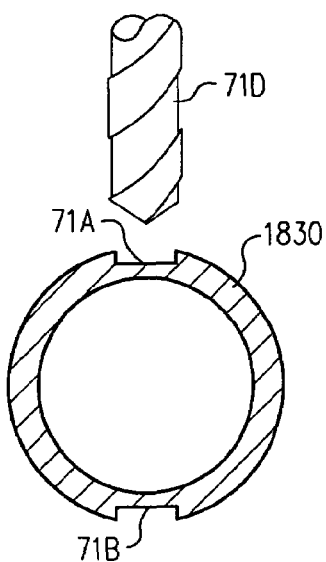
FIG. 71 shows the tubular structure first shown in FIGS. 68 and 69, with the process step of drilling out the hole after indenting the tubular structure at the preselected locations.
Figure 72:
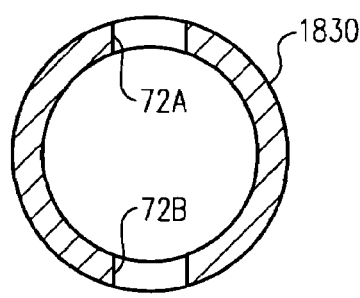
FIG. 72 illustrates the tubular structure first shown in FIGS. 69–72, as finished.

Similar processing steps are illustrated in FIGS. 69–72, which also illustrate the use of the method(s) described herein to treat a tubular structure for improving fatigue life of holes placed in the tubular structure. FIG. 70 shows the tubular structure 1830 being processed with first and second indenters I69A and I69B without using an optional internal support, mandrel, or backing anvil such as those shown in FIGS. 73 and 74. FIG. 71 shows the tubular structure 1830 at the step of drilling out a hole with drill 71D after indenting the tubular structure 1830 at the preselected first 71A and second 71B locations. FIG. 72 illustrates the tubular structure first shown in FIGS. 69 through 71 as finished, having therein holes therein defined by sidewalls 72A and 72B.

Figure 73:
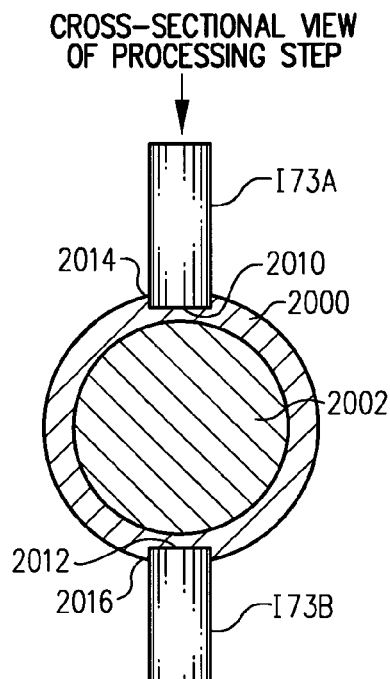
FIG. 73 illustrates the processing of a tubular structure, using an internal mandrel with a preferably uniform cross sectional area portion that serves as a "flat" anvil against which the internal surface of the tube is supported during processing; a pair of indenters is illustrated providing a dimpled area on the upper and lower surface of the tube.
Figure 74:
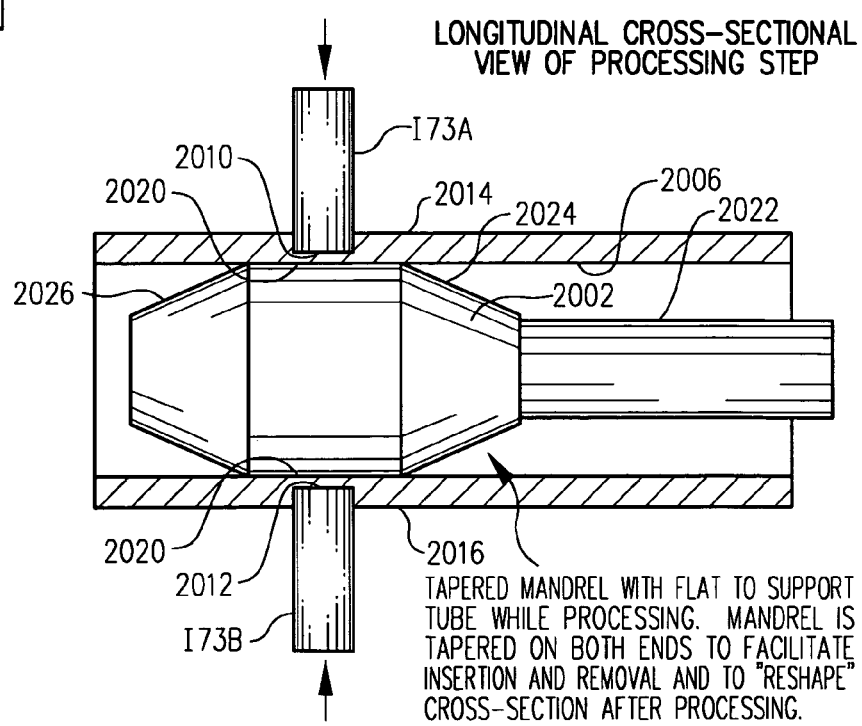
FIG. 74 illustrates the use of a tapered internal mandrel with a preferably uniform cross-sectional area portion that serves as an anvil against which the internal surface of a tube is supported during processing.
Figure 75:
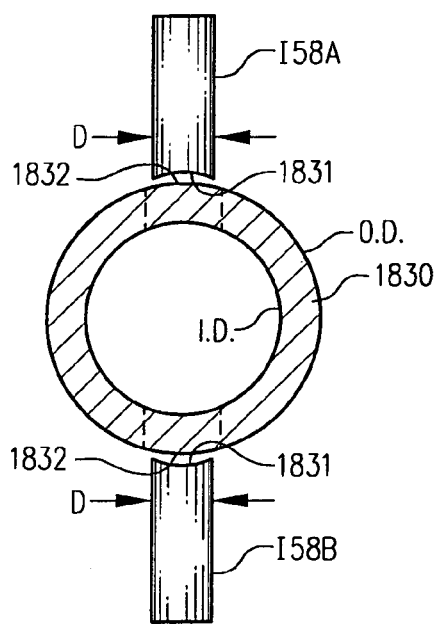
FIG. 75 illustrates a process to treat a tubular structure for improving fatigue life of holes placed in the structure, wherein the upper and lower indenters are provided with an indenter shape that conforms, at least in part, to the shape of the outer surface of the tube of preslected shape, with a preselected diameter provided for the cylindrical tube illustrated.
Figure 76:
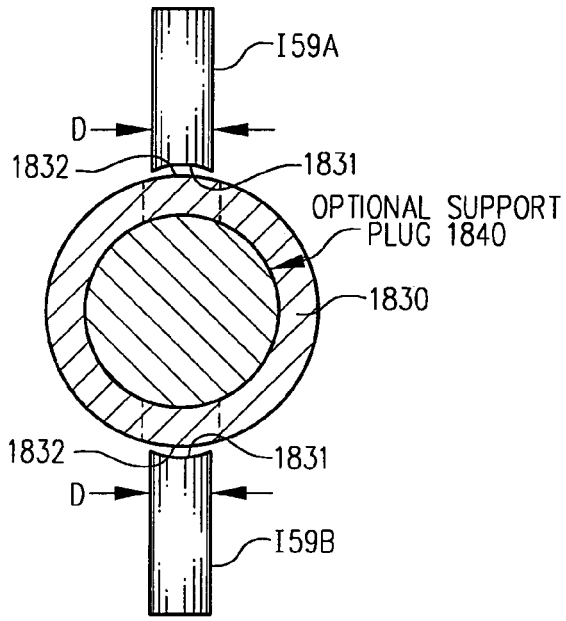
FIG. 76 shows the tubular structure first shown in FIG. 75, being treated by indenting the tubular structure at preselected locations, using an optional internal support or backing anvil, such as the tapered mandrel illustrated in FIGS. 73 and 74 above.
Figure 77:
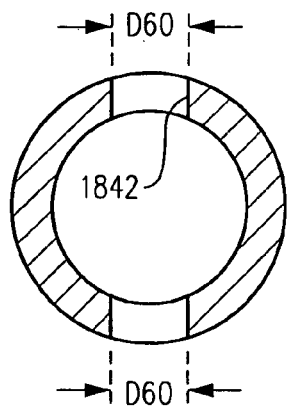
FIG. 77 shows the tubular structure first shown in FIGS. 75 and 76, as finished, after the process step of drilling out the hole, as illustrated in FIG. 71 above, thus now showing the tubular structure first shown in FIGS. 75 and 76, as finished.

FIGS. 73 and 74 illustrates the processing of a tubular structure 2000, using an internal mandrel 2002 with a preferably uniform cross sectional area portion 2020 that serves as a "flat" anvil against which the internal surface 2006 of the tube 2000 is supported during processing. A pair of indenters I73A and I73B are illustrated in FIG. 73 providing a dimpled area 2010 and 2012 respectively on the upper 2014 and lower 2016 surface of the tube 2000. In FIG. 74 the use of a tapered internal mandrel 2002 with a preferably uniform cross-sectional area portion 2020 that serves as an anvil against which the internal surface 2006 of tube 2000 is supported during processing. The mandrel 2002 is also provided with a pull rod portion 2022 for insertion and removal, as well as first 2024 and second 2026 tapered portions adjacent the uniform cross-sectional portion 2020, to minimize the length of the uniform cross-sectional surface 2020 of outside diameter equal to the inside diameter of tube 2000 as expressed by inside surface 2006.

The high strength mandrel or mandrel-like device 2002 with front 2024 and back 2026 tapers and a flat 2020 therebetween supports the tube 2000 and reacts the load provided from the indenters I73A and I73B. The front 2024 and back 2026 tapers facilitate installation and removal.

Because the indenters provide some cross-sectional deformation to the tubular bar it is desirable to have the mandrel 2002 connected to some sort of device with sufficient force to either push or pull the mandrel 2002 from the tube 2000 after processing. A tightly conforming mandrel reshapes the hollow cross section of the bar. It is desirable to put a lubricant, either wet or dry, on the mandrel 2002 to facilitate removal and to reduce galling. This hole fabrication method is effective for hollow tubes and bars under tensile, bending torsional and combined loads. Configurations of this sort can be found on pipes, tubing, medical implants, bushings, crank shafts, drive shafts and the like.

Figure 59:
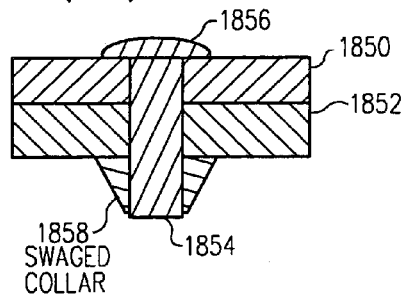
FIG. 59 shows the first step in a process for fastening structures together, such as wing structural components, showing two workpieces being held together with a tack fastener.
Figure 60:
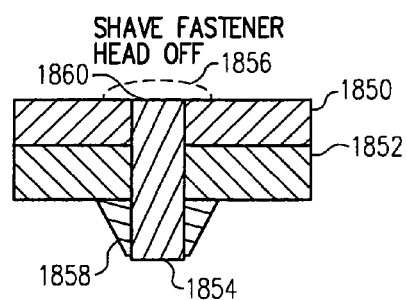
FIG. 60 shows the next step in a process for fastening the structures first shown in FIG. 59 together, showing the structure after the tack fastener head has been removed.
Figure 61:
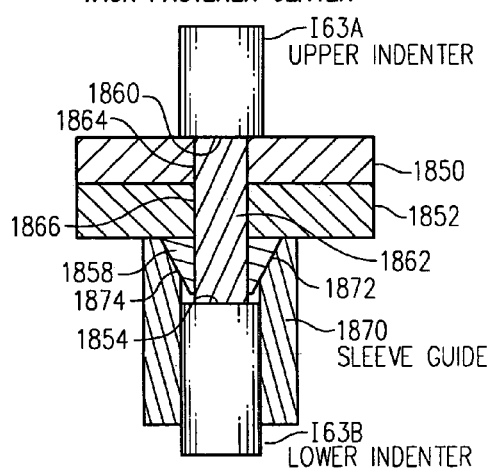
FIGS. 61 illustrates the step of preparing for, and then indenting a workpiece by using compression along the fastener shank, as well as utilizing the surfaces of one workpiece adjacent the fastener shank.
Figure 62:
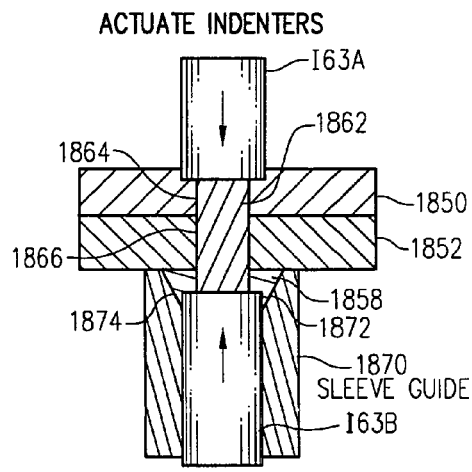
FIG. 62 illustrates the step of intending the wing part workpieces with upper indenter and lower indenter, noting that the lower indenter acts on the fastener shank.
Figure 63:
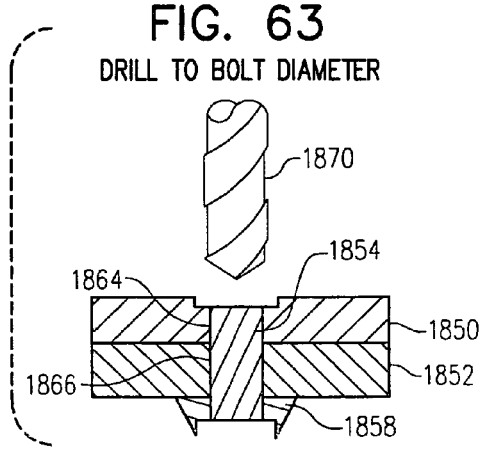
FIG. 63 illustrates the step of drilling the workpieces shown in FIGS. 59–63, including the step of drilling out the now deformed fastener to form an aperture of desired diameter.
Figure 64:
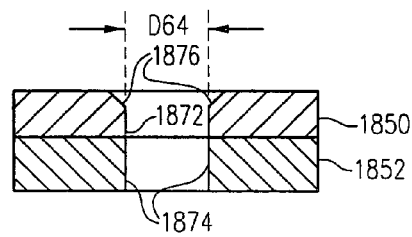
FIG. 64 illustrates the finished workpiece, such as a wing part, as prepared for installation of the final fastener.

Another important application of the method(s) disclosed herein is in the preparation, and particularly the joining, of aircraft wing components. Typically, wing skin and underlying structures are fastened with temporary fasteners called tack fasteners. Such fasteners are often removed, and then the holes are cold worked, with considerable labor and processing time involved. A much-improved method for accomplishing an equivalent or better result, from a fatigue life standpoint (and much improved from a manufacturing cost standpoint), is illustrated in FIGS. 59 through 64. In FIG. 59, a first workpiece 1850 and a second workpiece 1852 are joined with a temporary fastener 1854. As shown, a typically (but not necessarily) undersized fastener 1854 has a button type head 1856 (any convenient type head could be utilized) and a swaged collar 1858. This configuration as illustrated in FIG. 59 is to hold together in proper alignment the first and second workpieces 1852 and 1850, while the necessary coldwork to improve fatigue life are performed. In FIG. 60, the next step of shaving head 1856 off of the fastener 1854 is shown, leaving flush stub 1860. The next step, shown in FIG. 61, illustrates using the shank 1862 of fastener 1854 as a tool for radial expansion of the hole defined by sidewall 1864 in workpiece 1850, and by sidewall 1866 in workpiece 1852. Sleeve guide 1870, having swage containing sidewalls 1872 and 1874, are utilized to preclude radial movement of the complementary surfaces of the swaged collar 1858 during compression by indenters I63A and I63B. During compression, the diameter of shank 1862 increases, and thus force is transmitted against sidewalls 1864 and 1866. The radial movement of the shank 1862 is sufficient to provide radial plastic flow of sidewalls 1864 and 1866 of thus into the body of first and second workpieces 1850 and 1852. This action creates beneficial residual stresses in workpieces 1850 and 1852, particularly adjacent sidewalls 1864 and 1866, thereby increasing the fatigue life of holes used to join the workpieces 1850 and 1852. In FIG. 62, the step of indenting (compressing) shank 1862 radially into the body of first and second workpieces 1850 and 1852 is illustrated. FIG. 63 shows the step of using a drill 1870 to drill out the fastener shank 1854 and swage collar 1858 to provide a finished aperture diameter D64 as shown in FIG. 64. The aperture in first and second workpieces 1850 and 1852 is defined by new sidewalls 1872 and 1874, respectively. A countersunk sidewall 1876 can be provided, and normally is, for flush fasteners for aerodynamic surfaces. Then, a fastener of desired size can be installed for completing the finished joint, to provide a finished structure similar at least in external visual appearance such as those first illustrated in FIG. 48 or FIG. 49 above.

Figure 65:
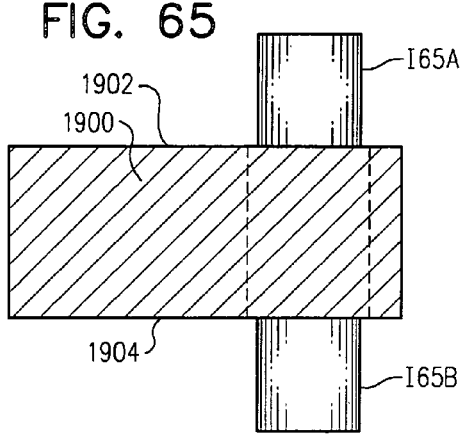
FIG. 65 shows the use of the stresswave process to treat the obverse and reverse sides of a lug structure.
Figure 66:
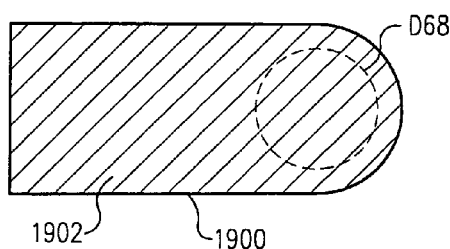
FIG. 66 shows a lug type structure where a preselected location has been identified for an aperture.
Figure 67:
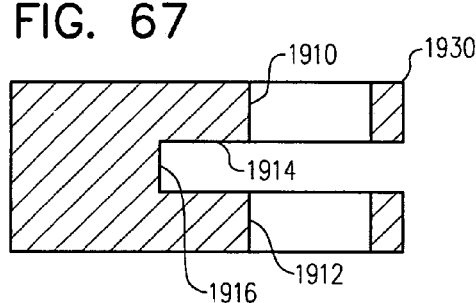
FIG. 67 shows a lug structure wherein both the hole and an internal slot have been milled out after the solid workpiece has been processed according to the stresswave process.
Figure 68:
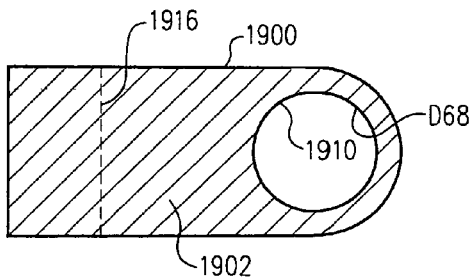
FIG. 68 shows a completed lug type structure having aperture sidewalls with residual compressive stress for enhancement of fatigue life.
Figure 69:
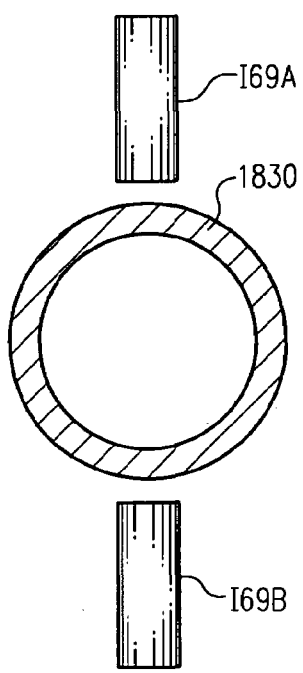
FIG. 69 illustrates the use of the stresswave process to treat a tubular structure for improving fatigue life of holes placed in the structure.

Also, in FIGS. 65 through 68, the use of the method(s) provided herein to treat a lug type structure is illustrated. In FIG. 65, a side view is shown of indenters I65A and I65B as they are used to impact the obverse 1902 and reverse 1904 sides of workpiece 1900 at a preselected location. The workpiece 1900 is compressed at a preselected location for a hole diameter D68 (see FIG. 68) to be formed later. Sufficient displacement of the obverse 1902 and reverse 1904 sides of workpiece 1900 by indenters preferably provides radial plastic flow throughout the entire thickness of workpiece 1900, to assure the presence of residual compressive stress at through hole walls 1910 (and 1912, where an optional slot 1914 with end wall 1916 is milled from workpiece 1900). Plan views of the workpiece 1900 are provided in FIGS. 66 and 68, showing the location of hole of diameter D68 defined by edge wall 1910.

FIGS. 65 through 68 shows the treatment of a "two-eared" lug using the method(s) described herein, starting from a solid, partially machined configuration. Partially machined is defined in this case as the holes and center slot have not yet been machined. The finished lug 1930 (see FIG. 67) now configured has residual stress sufficient for life improvement in both ears of the lug. The lug can be a single or multiple "eared" lug.

Attention is now directed to FIGS. 78 through 97, which show various steps for processing types of solid bars for improving the fatigue life of a hole therein, including normally but not necessarily a transverse hole therein. In FIG. 78, a first step shows the setup for processing the bar 2100 with indenters I78A and I78B. The dotted or hidden line 2102 in FIG. 79 shows the outline of a proposed transverse hole. Opposing indenters are positioned over the desired location of the hole. The indenters I78A and I78B have an end profile 2104 and 2106 for imparting optimized levels of beneficial residual stresses in workpiece 2100 necessary for fatigue life improvement. In a typical application the diameters of the indenters are smaller than the final diameter of the transverse hole defined by wall 2102. Additionally, the indenter I78A and I78B tooling is made from material that is higher in strength than the bar 2100 material. FIG. 79 shows the indenters acting on the bar 2100. The indenters are quasi-statically squeezed, actuated at a high velocity, or "excited" with a stress wave to impart dimples 2107 and 2109 of a prescribed depth to the bar 2100 (see FIG. 80). After indenting, the hole is machined out by drill of diameter D80 as shown in FIG. 80, removing the dimples left behind by the indenters. Alternate final cross sectional bar configurations are shown in FIGS. 81 and 82. The first configuration FIG. 81 shows the bar with the transverse hole defined by edge wall 2110. The second configuration shown in FIG. 82 shows the bar 2100 with the same transverse hole 2110, but hollowed out for reduced weight or other function and thus having a longitudinal passageway defined by interior wall 2112. Even with a large portion of material removed there is sufficient residual compressive stress around the upper $2110_U$ and lower $2110_L$ portions of hole 2110 to provide fatigue life improvement. The method(s) disclosed herein are effective for bars under tensile, bending, torsional and combined loads. Configurations of this sort can be found on pipes, tubing, medical implants, bushings, crank shafts, drive shafts and the like.

Figure 83:
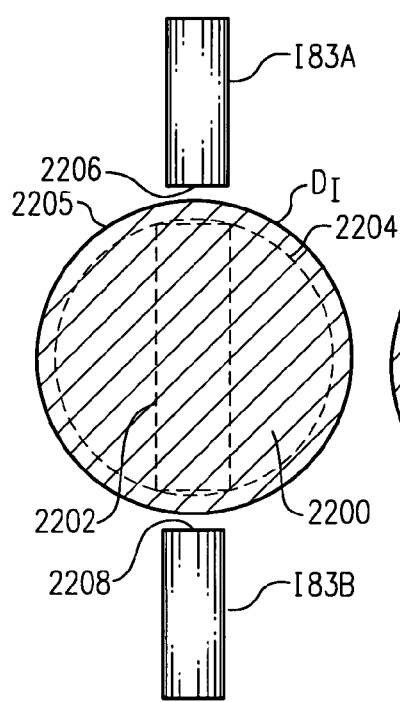
FIG. 83 illustrates the first, setup step in a process for treating a transverse hole in an initially solid bar, where the diameter of the bar is initially oversized.
Figure 84:
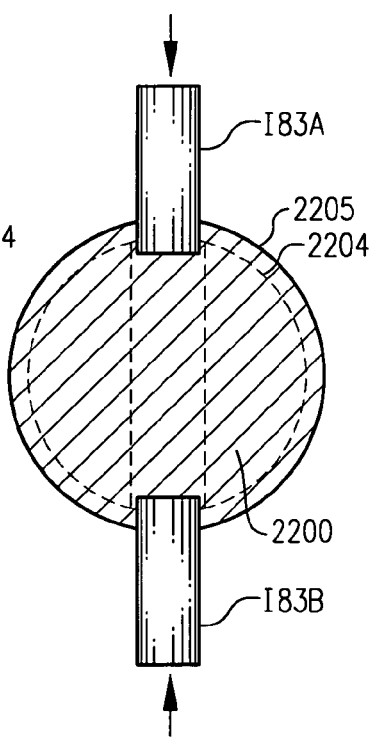
FIG. 84 shows the second, indenting processing step for treating a transverse hole in an initially solid bar, where the bar is initially oversized; as shown, the diameter of a cylindrical bar is oversized.
Figure 85:
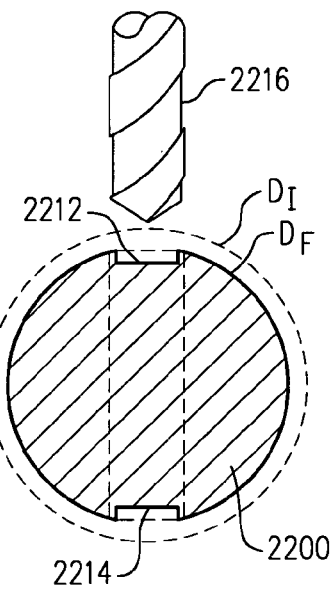
FIG. 85 illustrates the step of drilling a desired hole in an initially solid bar; (here a round bar is shown) after the step of indenting the outer surface to provide a desired stress profile has been accomplished.
Figure 86:
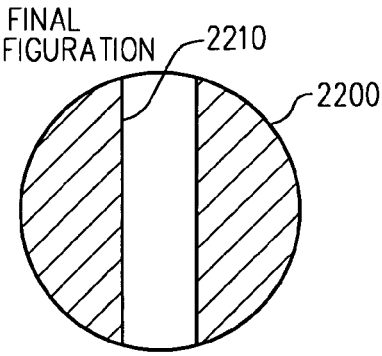
FIG. 86 illustrates a cross-sectional view of a round, solid bar after processing to provide (a) an outer surface having a desired size and shape (here, a desired diameter of a round bar), and (b) transverse hole having desirable fatigue life enhancement.
Figure 87:
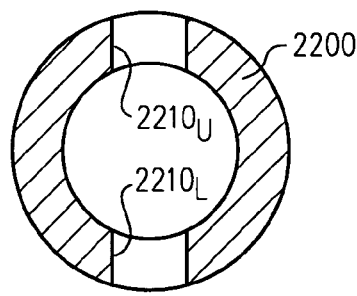
FIG. 87 illustrates a cross sectional view of a round, solid bar after processing to provide (a) an outer surface having a desired shape (here, a desired diameter of a round bar), (b) a transverse hole having desirable fatigue life enhancement, and (c) a longitudinal through passageway, so that a tubular component having one or more transverse outlet passageways results.

FIGS. 83 through 87 show the steps for another method of treating a transverse hole in an initially oversized solid bar 2200. In this instance the diameter $D_I$ of the solid bar is initially oversized to allow for "cleanup" of any surface upset caused by using the method of indenting shown in FIG. 84. A deeper dimple is necessary than was used in the method of FIG. 79, as the surface layer of the beneficial residual stresses will be machined away. The setup step for processing the bar 2200 is shown in FIG. 83. The dotted lines 2202 show the outline of a desired transverse hole, and the dotted lines 2204 show the final outside diameter $D_F$ of the bar while the solid line 2205 in FIGS. 83 and 84 shows the initial diameter $D_I$. The opposing indenters I83A and I83B are positioned over the desired hole location. The end shapes 2206 and 2208 of the indenters have a profile for imparting optimal beneficial residual stresses sufficient for fatigue life improvement using deeper dimple depths. FIG. 84 shows the indenters I83A and I83B acting on the bar 2200. The indenters are either quasi-statically squeezed, actuated at a high velocity, or "excited" with a stress wave to impart dimples 2212 and 2214 to the bar to a prescribed depth. The indenters may be pressed past the diameter (dotted line 2204) of the final bar 2200 shape. Some bar configurations may require a smaller dimple depth such that the indenters do not penetrate the boundary of the final bar diameter. Therefore, a residual dimple (as shown) may or may not be present during the hole machining process depending on which depth of indenter penetration was selected. After treatment by the indenters and turning down the bar 2200, the hole defined by edgewall 2210 is then machined out by drill 2216 as shown in FIG. 85. The final cross sectional bar configurations are shown in FIGS. 86 and 87. The first configuration in FIG. 86 shows the bar 2200 with a transverse hole 2210. The second configuration shown in FIG. 87 shows the bar 2200 with the same transverse hole defined by edge wall 2210, but hollowed out for reduced weight or other function, to provide upper sidewall portion $2210_U$ and lower sidewall portion $2210_L$.

Figure 88:
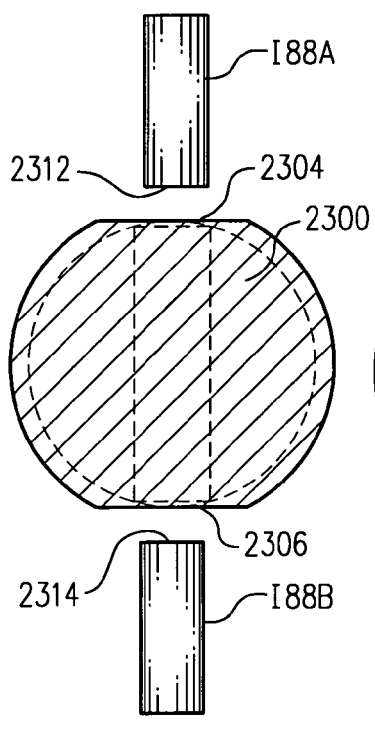
FIG. 88 illustrates a cross-sectional view of an initially oversized solid bar workpiece being setup for processing, wherein the bar is has a "flat" to facilitate the treatment of the workpiece.
Figure 89:
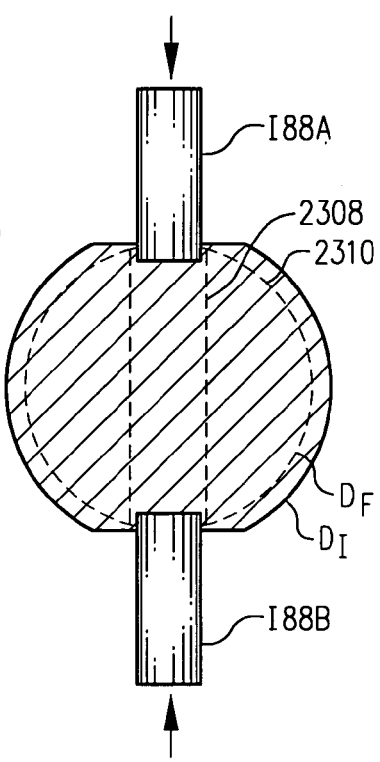
FIG. 89 illustrates a cross-sectional view of the solid bar just illustrated in FIG. 88, wherein the solid bar workpiece is being processed by upper and lower indenters on the "flat" portion, to facilitate the treatment of the workpiece.
Figure 90:
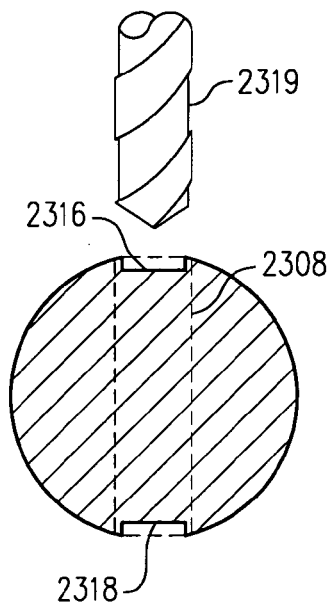
FIG. 90 illustrates the step of drilling out a desired hole in the solid bar workpiece just illustrated in FIGS. 88 and 89, and showing in hidden lines the desired through hole portion dimensions.
Figure 91:
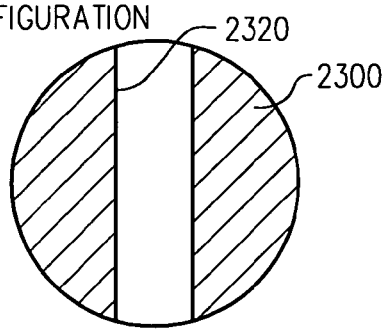
FIG. 91 illustrates a cross-sectional view of a round, solid bar after processing to provide (a) an outer surface having a desired size and shape, after processing an initially oversized bar (here, a desired diameter of a round bar is the finished product), and (b) transverse hole having desirable fatigue life enhancement.
Figure 92:
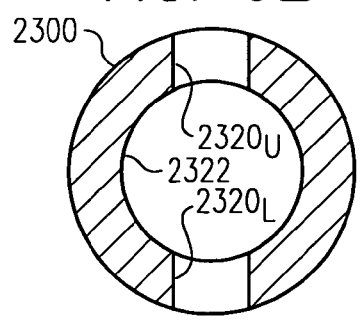
FIG. 92 illustrates a cross sectional view of a round, solid bar after processing to provide (a) an outer surface having a desired shape (here, a desired diameter of a round bar), (b) a transverse hole having desirable fatigue life enhancement, and (c) a longitudinal through passageway, so that a tubular component having one or more transverse outlet passageways results.

FIGS. 88 through 92 show the process steps for yet another method of treating a transverse hole in an initially solid bar 2300. In this instance the diameter of the bar is initially oversized and has first and second "flats" 2304 and 2306 to facilitate use of the method(s) disclosed herein. The flats 2304 and 2306 may be understood as a machined flat, counterbore, spot face and the like. The flat facilitates the use of indenter end shapes that are typically used for flat stock. The oversized bar diameter is necessary to produce the flats and allows for some "cleanup" of any surface upset caused by using the method shown in FIG. 89. The setup step for processing the oversized bar with flats is shown in FIG. 88, with the opposing indenters I88A and I88B positioned over the desired hole location. The dotted lines 2308 show both the outline of the transverse hole and the dotted lines 2310 show the final outside diameter $D_F$ of the bar while the solid line shows the current or initial diameter $D_I$ and flat configuration. The end shapes 2312 and 2314 of the indenters have an optimal profile for imparting levels of beneficial residual stresses for fatigue life improvement. FIG. 89 shows the indenters acting on the bar 2300. The indenters are quasi-statically squeezed, actuated at a high velocity, or "excited" with a stress wave to impart dimples 2316 and 2318 at a prescribed depth, to the bar 2300. The hole defined by sidewall 2320 is machined out by drill 2319 as shown in FIG. 90 completely removing the dimples 2316 and 2318. The final cross-sectional configurations are shown in FIGS. 91 and 92. The first configuration in FIG. 91 shows the bar 2300 with the transverse hole defined by edge wall 2320. The second configuration in FIG. 92 shows the bar with the same transverse hole 2320, but having upper sidewall portion $2320_U$ and lower sidewall portion $2320_L$, but hollowed out for reduced weight or other function as defined by interior sidewall 2322.

Figure 93:
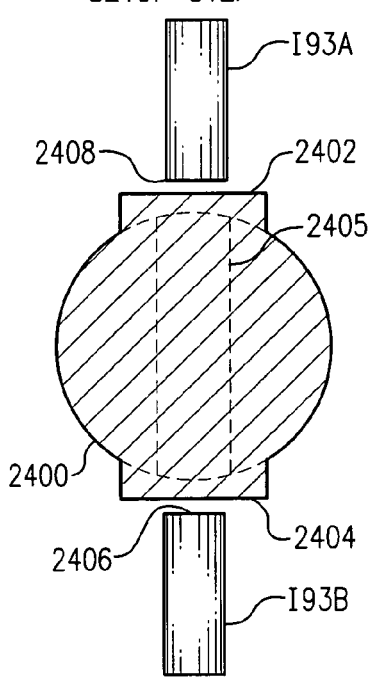
FIG. 93 illustrates a cross-sectional view of an oversized solid bar workpiece being setup for processing, wherein the bar is has a externally extending "flat" shoulder to facilitate the treatment of the workpiece.
Figure 94:
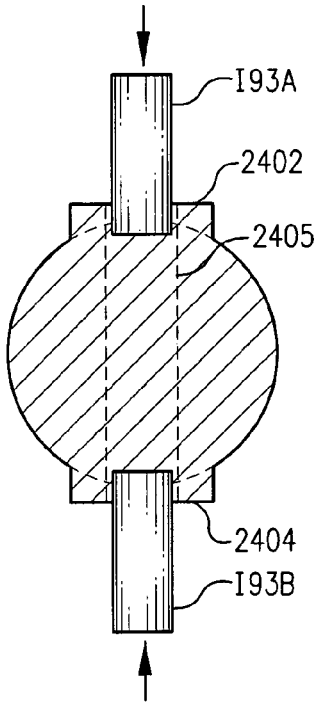
FIG. 94 illustrates a cross-sectional view of the solid bar just illustrated in FIG. 93, wherein the solid bar workpiece is being processed by upper and lower indenters acting against the "flat" portion, to facilitate the treatment of the workpiece.
Figure 95:
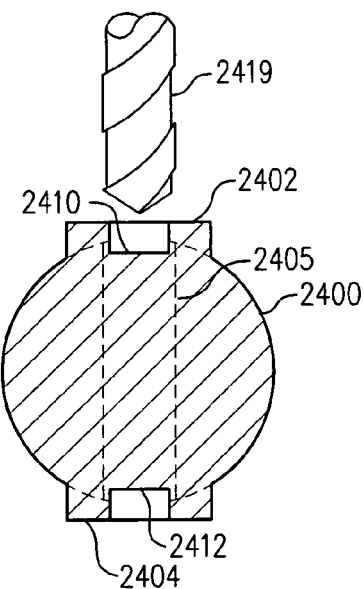
FIG. 95 illustrates the step of drilling out a desired hole in the solid bar workpiece just illustrated in FIGS. 93 and 94, and showing in hidden lines the desired through hole portion dimensions.
Figure 96:
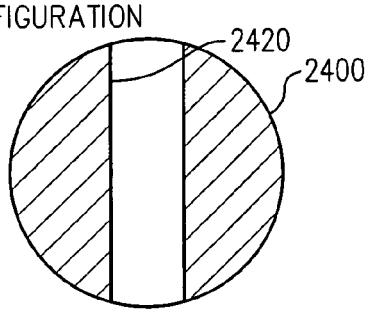
FIG. 96 illustrates a cross-sectional view of a solid bar having externally extending shoulder as illustrated in FIGS. 93, 94, and 95, illustrated after processing to provide (a) an outer surface having a desired size and shape, after processing a bar having a shoulder (here, a desired diameter of a round bar is the finished product), and (b) transverse hole having desirable fatigue life enhancement.
Figure 97:
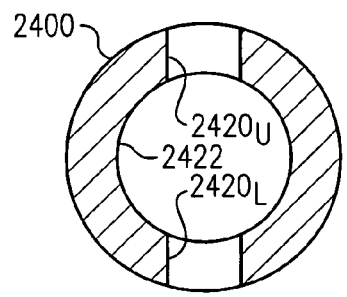
FIG. 97 illustrates a cross sectional view of a round, solid bar after processing to remove undesirable starting shoulders, to provide (a) an outer surface having a desired shape (here, a desired diameter of a round bar), (b) a transverse hole having desirable fatigue life enhancement, and (c) a longitudinal through passageway, so that a tubular component having one or more transverse outlet passageways results.

FIGS. 93 through 97 shows the process steps for yet another method of treating a solid bar 2400. In this instance the bar 2400 includes integrally cast or machined flats 2402 and 2404. The flat may be understood as a raised feature on the bar. The raised flat facilitates the use of indenter end shapes that are typically used for flat stock. The raised flats also allow for "cleanup" of any surface upset produced by the indentation method conducted in FIG. 94. The setup step for processing bar with integral flats is shown in FIG. 93. The solid line shows the final bar diameter and raised flat configuration and the dotted lines 2405 show the outline of the transverse hole defined by edgewall 2420. The opposing indenters I93A and I93B are positioned over the desired hole location as noted by dotted lines 2405. The end shapes 2406 and 2408 of the indenters I93B and I93A, respectively, have an optimal profile for imparting beneficial residual stresses sufficient for fatigue life improvement on the flats. FIG. 94 shows the indenters acting on the raised flats 2402 and 2404 on the bar 2400. The indenters are quasi-statically squeezed, actuated at a high velocity, or "excited" with a stress wave to impart dimples at a prescribed depth, to the bar. The hole is machined out by drill 2419 as shown in FIG. 95 entirely removing the dimples 2410 and 2412. The final cross sectional configurations are shown in FIGS. 96 and 97. The first configuration shows the bar with a transverse hole defined by edgewall 2420. The second configuration shown in FIG. 97 shows the bar with the same transverse hole but now having upper sidewall portions $2420_U$ and lower sidewall portions $2420_L$, but hollowed out for reduced weight or other function, as defined by interior sidewall 2422.

Figure 98:
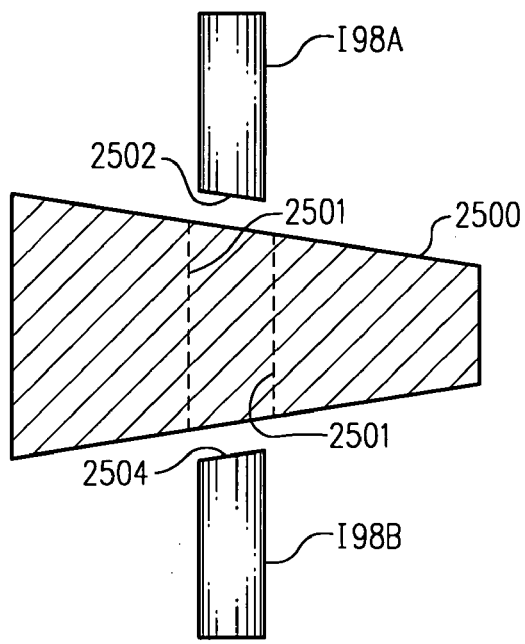
FIG. 98 shows the setup step for treatment of a tapered cross section component, with use of first and second indenters, one or more of which has a shaped surface adapted to conform, at least in part, to the respective first and second surface shapes of the tapered cross-section component.
Figure 99:
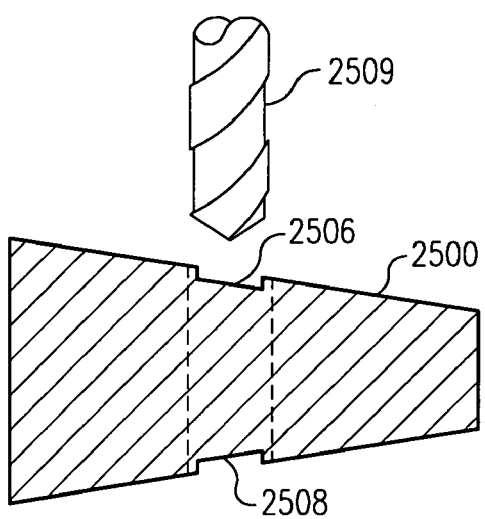
FIG. 99 illustrates the step drilling out a hole in a tapered cross-section component (such as a component of a wheel for an automotive vehicle).
Figure 100:
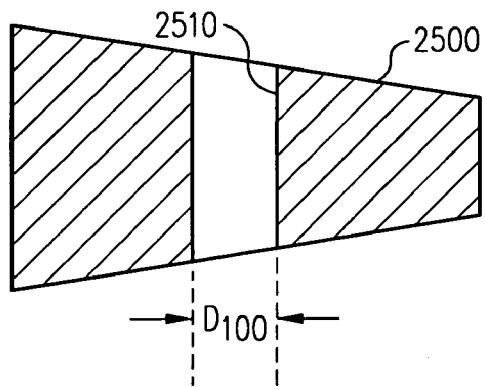
FIG. 100 illustrates a tapered cross-section component having therein a finished hole with improved fatigue life, as processed via the stresswave technique.

FIGS. 98 through 100 shows the treatment of a hole in a tapered cross-section workpiece 2500, such as an outwardly extending section of truck wheel, or a tapered access panel cover in an aircraft, for example. FIG. 98 shows the setup step for the process. Two opposing indenters I98A and I98B, smaller than the final hole diameter $D_{100}$ (see FIG. 100) are lined up at the desired hole location shown by hidden lines 2501. The indenters are actuated into the tapered section by quasi-statically squeezing, by being actuated at a high velocity, or by being "excited" with a stress wave to impart dimples in the tapered section. The end shapes 2502 and 2504 of the indenters I98A and I98B, respectively, are angled to conform to the tapered shape of the section and to provide a large zone of residual compressive residual stress in workpiece 2500. After the action of the indenters, the hole as defined by edgewall 2510 (see FIG. 100) is machined out by drill 2509, completely removing the dimples 2506 and 2508 (see FIG. 99). The final hole 2510 is surrounded by residual compressive stresses sufficient to improve the fatigue life of the workpiece adjacent the hole defined by edgewalls 2510.

Figure 101:
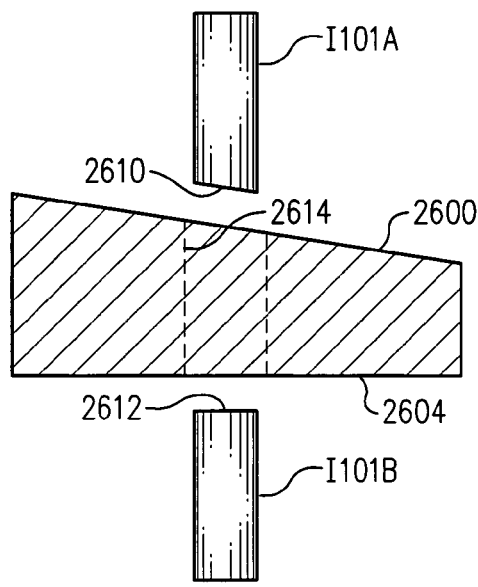
FIG. 101 shows the setup step for treatment of a tapered cross section component that has one flat side and one sloping or tapered side, via using first and second indenters of differing surface shape; here, a first indenter has a shaped surface adapted to conform, at least in part, to the respective first or sloping surface, and a second indenter having a surface adapted to conform, at least in part, to the respective second surface of the tapered cross-section component, where the second surface is relatively flat.
Figure 101A:
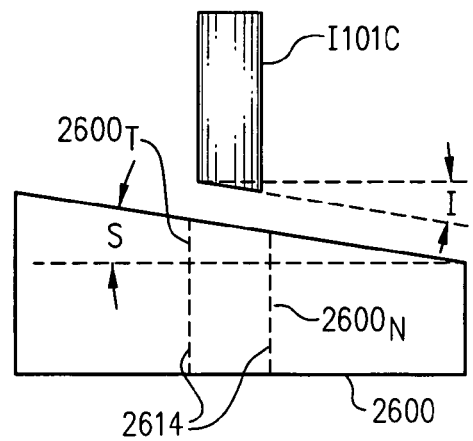
FIG. 101A shows the use of a sloped indenter, where the indenter has an interface angle I which is less than the slope angle S of the tapered workpiece, so that more indentation occurs on the thick portion of the workpiece location selected for installing a hole, than on the thin portion of the workpiece location selected for installing a hole.
Figure 102:
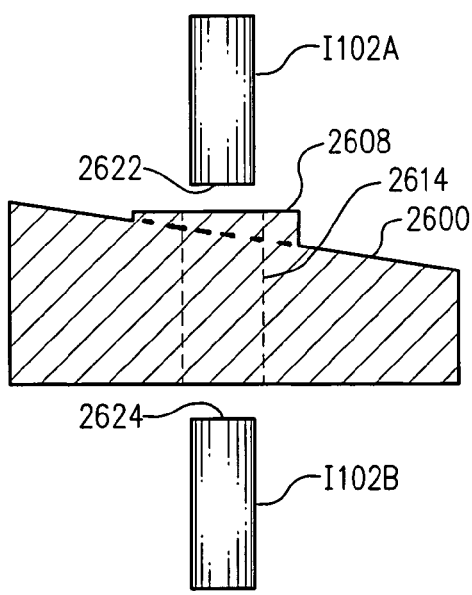
FIG. 102 shows the setup step for treatment of a tapered cross section component that has one flat side and one sloping or tapered side, as well as flat treatment shoulder, with the use of first and second indenters having substantially the same surface shape; here, a first indenter has a shaped surface adapted to conform, at least in part, to the respective first or for flat shoulder surface, and a second indenter having a surface adapted to conform, at least in part, to the respective second surface of the tapered cross-section component, where the second surface is relatively flat.
Figure 103:
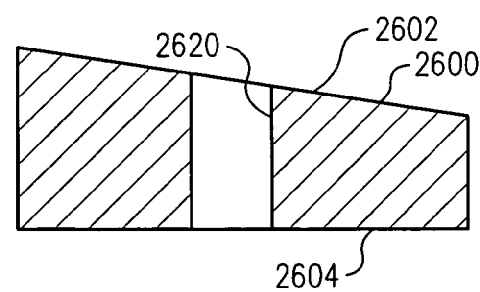
FIG. 103 illustrates a finished tapered cross-section component having therein a finished hole with improved fatigue life, as processed via the stresswave technique from the part of FIG. 101 or of FIG. 102.

FIGS. 101, 101A, 102, and 103 show the treatment of a hole in another tapered cross-section 2600. This section has one tapered side 2602 and one straight side 2604. In one instance, as shown in FIG. 102, the section 2600 has an integral raised flat 2608 to facilitate the indenting and residual stress forming process. FIG. 101 shows the setup step for the process. Two opposing indenters, in one embodiment as shown smaller than the final hole diameter defined by edgewall 2620, are lined up at the desired hole location shown by broken lines 2614. The indenters are actuated into the tapered section either by squeezing, or high-speed impact, or stress wave excitation. The end shape 2610 of a first one I101A of the indenters is angled to conform to the tapered side of the section and to provide a large zone of compressive residual stress. In workpiece 2600. The other indenter I101B end shape 2612 has a profile for working a flat surface. In the instance of an integral flat as illustrated in FIG. 102, both indenter I102A and I102B end shapes 2622 and 2624 are configured for processing a flat part. After the action of the indenters the hole is machined out completely removing the dimples in the manner earlier illustrated. In the instance of the integral flat, it too, is machined off. The final hole defined by edgewall 2620 is surrounded by residual compressive stresses sufficient to improve the fatigue life of the section.

FIG. 101A shows the use of a sloped indenter I101 C, where the indenter has an interface angle I relative to a reference plane which is less than the slope angle S of the tapered workpiece with respect to the same reference plane (horizontal, as shown) so that more indentation occurs on the thick portion $2600_T$ of the workpiece location selected for installing a hole, than on the thin portion $2600_N$ of the workpiece location selected for installing a hole.

Figure 104:
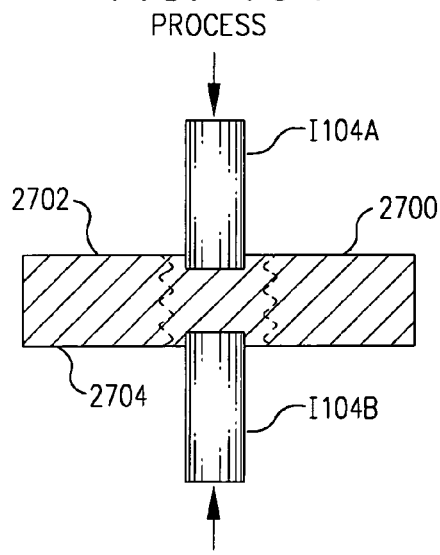
FIGS. 104 through 107 illustrate steps for finishing various sized holes with various mechanical structures, including threaded holes, keyways, and splines.
Figure 105:
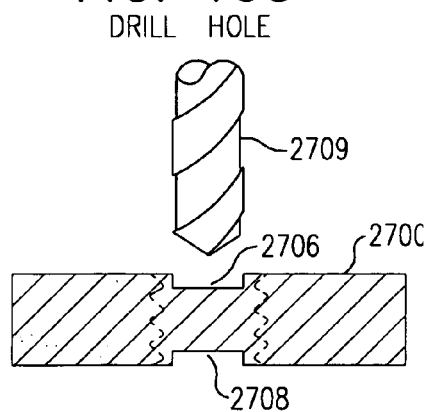
Figure 106:
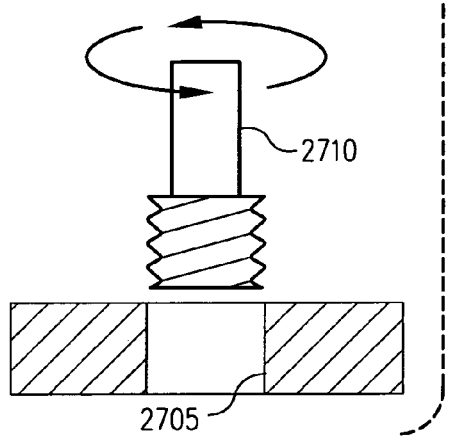
Figure 106A:
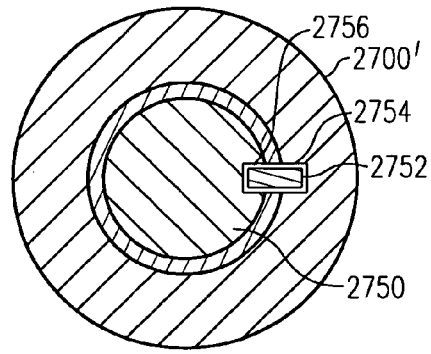
FIG. 106A illustrates the step of finishing the treatment of a hole by installation of a keyway, to interface with a shaft having a keyway accepting slot therein, so that the finished workpiece having improved fatigue life is joined with a shaft via a key.
Figure 106B:
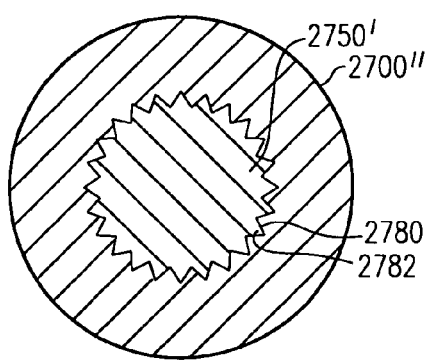
FIG. 106B illustrates the step of finishing the treatment of a hole by installation of splines, to interface with a splined shaft, so that a finished workpiece having improved fatigue life is joined with a shaft via splines.
Figure 107:
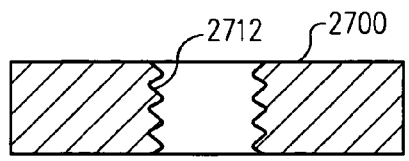

FIGS. 104 through 107 shows the treatment of a hole. More specifically, FIGS. 106 and 107 show finishing treatment of a threaded hole, FIG. 106A shows treatment of a hole having a keyway therein, and FIG. 106B shows treatment of a hole having a spline therein. The action of the indenters I104A and I104B on obverse 2702 and reverse 2704 sides of workpiece 2700 is shown in FIG. 104. Afterwards indenting to form dimples 2706 and 2708, the hole is drilled out by drill 2709 to an appropriate starting diameter defined by sidewall 2705. The diameter may be sized as appropriate for cutting threads as shown in FIG. 105, or for forming a keyway as noted in FIG. 106A, or for forming splines as shown in FIG. 106B. If a threaded hole is desired, then the hole is then machined or tapped with tool 2710 as shown in FIG. 106, to produce desired threads 2712 to accommodate a threaded bolt or fastener. The final configuration is shown in FIG. 107. Applications include panels, lug nuts, engine components or any other structure that has threaded holes to accommodate a threaded bolt. Keyways and spline connections, as provided in FIGS. 106A and 106B, are important in various industrial and agricultural applications. The are almost always involved with transmitting torque loads or rotational displacements from one shaft to another. A typical example is the power take off (PTO) shaft at the back end of a tractor. The power take off allows various powered equipment, such as a mower, to be attached quickly and easily. Typically a male shaft is connected to a female shaft member to transmit torque. Without a keyway or spline connection one shaft would spin relative to the other without transmitting torque. In FIG. 106A, a cross-section of the shaft 2750 and key 2752 are shown. Key 2752 fits a machined groove 2754 in workpiece 2700', and a groove 2756 in shaft 2750. Splines are similarly constructed, in that interfitting splines 2780 and 2782 are provided in workpiece 2700" and shaft 2750'. In each of these connections the structure is worked, either from one or both sides, using pre-selected indenter shapes, the hole is machined into the female connector and the keyway or spline geometry machined into the sidewall.

FIGS. 108 through 114 shows the setup for simultaneous or sequential treatment of a pattern or set of holes in a workpiece 3000. In FIG. 108, a plan form view shows of a pattern of four holes 3002 around a center hole 3004 (defined by edge wall 3016). This is not representative of all possible hole patterns, but is used for illustrative purposes. The holes 3002 in the pattern, or set, do not necessarily need to be the same size or require the same dimple depth. In high volume applications such as an engine blocks or automotive wheels, it is desired to treat many, if not most, of the holes simultaneously. This reduces the time required to treat each part or workpiece 3000 and increases production throughput. In those instances where it is not practical to treat the entire pattern simultaneously, then the processing can be broken down into sets of holes or even individual holes. The treatment of a pattern of holes can be performed, depending on the particular fatigue life requirements of the structure, from either one side or two sides. The indenter end shapes and dimple depths can be tailored to suit the hole diameter in the pattern. After treatment, the holes can be machined as straight through holes, straight non-through holes, stepped holes, countersink holes, or any other hole configuration.

FIG. 109 provides an optional external support, anvil, or backing device 3010. The support is typically a close fitting metal structure having an upper surface 3011 that resists deformation along a reverse side 3012 of the workpiece 3000 when processing holes 3002. In FIG. 110, simultaneous processing is shown for formation of at least two holes 3002. The specific configuration in FIG. 110 is for instructional purposes only, and more holes can be process at a single time. Here, upper indenters I110A and I110B are used in conjunction with lower indenters I110C and I110D.

The basic process of treating the holes sometimes involves a relatively large radial plastic flow of material outward from the contacting end $I109A_E$ and $I109B_E$ of indenters I109A and I109B. For structure where treated holes or other cutouts are near a free edge 3016, the radial plastic flow sometimes tends to distort or deform the free edge 3016. In some cases, this deformation is allowable, and a portion of the workpiece can be later trimmed to provide a finished workpiece having acceptable dimensions and finish. In another variation, the holes 3002 could be treated before the center hole 3004 defined by free edge 3016 is cut from the workpiece 3000.

Figure 112:
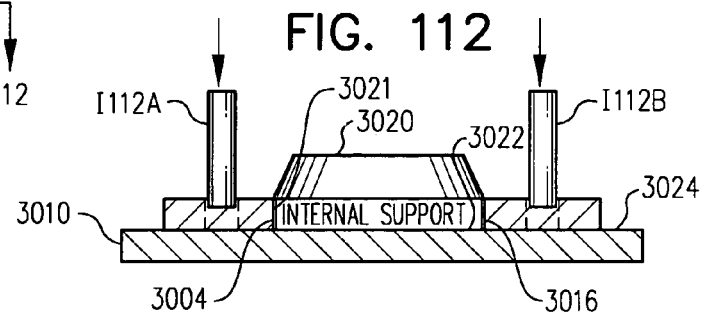
FIG. 112 shows the multi-hole workpiece first illustrated in FIG. 108, taken along line 112—112 of FIG. 111, now further illustrating the use of an optional internal support device, such as an anvil or other metal structure that resists deformation along an internal free edge of the workpiece, normal to the direction of the indenter, as might otherwise result from processing locations for future holes with the indenters as shown, so as to facilitate one sided processing of a workpiece.
Figure 113:
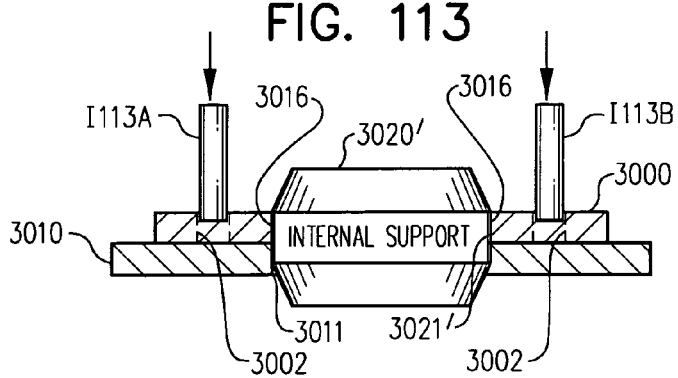
FIG. 113 is a view similar to FIG. 112 above, but now showing the use of a first, internal support to resist deformation along a free edge of the workpiece, and a second, backing support which resists motion opposite the direction of motion of the indenter, so as to facilitate one sided processing of a workpiece.

In instances where appreciable deformation is not allowable, a support device may be used as shown in FIGS. 111, 112, 113, and 114. Any appropriately shaped support device, whether an internal support plug, a straight rail, an outer ring structure and like, can be used to resist the deformation at a free edge. FIG. 112 shows an internal support 3020 that has a lateral side 3021 that resists the internal free edge 3016 deformation from the one-sided treatment of a hole or pattern of holes near the edge. The internal support 3020 is configured with a flat bottom 3022 that engages a preferably complementary upper surface 3024 of the underlying support 3010. FIG. 112 shows one-sided treatment of a part using an internal support 3020, with indenters I112A and I112B acting on the obverse side 3016. FIG. 113 is similar to FIG. 112 except that the internal support 3020' having a lateral side 3021' is allowed to pass through a hole 3011 in the underlying support 3010. Indenters I113A and I113B act on workpiece 3000.

Figure 114:
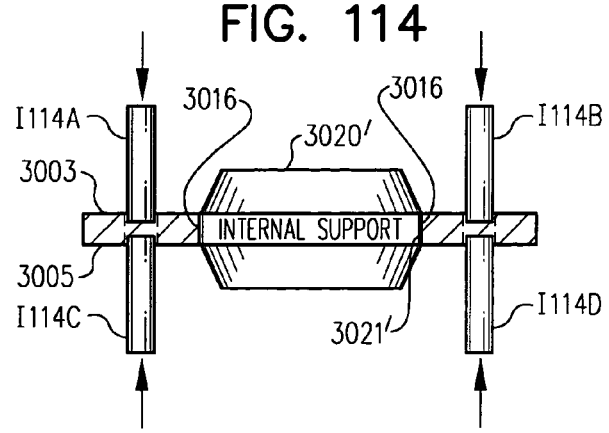

FIG. 114 is similar to FIG. 113 except that the internal support 3020' having a lateral side 3021' is allowed to pass through a hole 3011 in the underlying support 3010. This arrangement is helpful for high-volume applications where tools may be acting on both sides of the part, such as illustrated in FIG. 114. FIG. 114 shows two-sided treatment of a part using an internal support, with indenters I114A and I114B acting on the obverse side 3003, and indenters I114C and I114D acting on the reverse side 3005 of workpiece 3000. In each view, a support portion of the internal support 3020 (or 3020', as appropriate) matches the surface of the free edge 3016 of the part that it supports. The views show an edge that is perpendicular to the face of the part, but it should be understood a support can be made to match an angled, stepped, curved, grooved or other edge geometry.

FIGS. 115 through 118 shows the treatment of a stepped hole in a workpiece 3100 using a one-sided indenter method. A large anvil like structure 3102 that reacts to the force of the indenter I115 supports a workpiece 3100 component being treated. A first indenter I115, sized to treat the larger diameter D115 of the stepped hole, is used initially. FIG. 115 shows the first indenter being used on a thick part. A first dotted line indicated by reference numeral 3104 within the workpiece 3100 shows the outline of the stepped hole that will be machined into the part 3100 after final processing. After indenting with the first indenter, the larger diameter D115 portion of the hole is machined into the part as shown in FIG. 116 using reaming or other suitable tool 3106. The machining is done to provide a uniform, though not necessarily flat receiving surface indicated by reference numeral 3108 on which the second indenter I117 acts. The second indenter I117 is then used to treat the lower regions, i.e., the remainder of the workpiece 3100 that associated with the smaller diameter portion D117 of the hole as shown in FIG. 117, the anticipated diameter of which is indicated in broken lines by reference numeral 3109. After treatment with the second indenter I117, the hole is machined to final shape as illustrated in FIG. 118 and with lower hole portion defined by wall 3112. The hole, now treated to provide desirable residual stress along both the large (D115) and small (D117) hole portions, has improved fatigue resistance. An optional bushing or wear guide may be installed into the larger diameter portion D115 of the hole. The final hole with a plurality of diameter components has an upper or large diameter portion defined by sidewall 3114 and a lower or smaller diameter portion defined by sidewall 3112.

Turning now to FIGS. 119 through 127, the treatment of a very thick part (or a stack of workpieces in analogous manner) using the method(s) disclosed herein is illustrated. For very thick parts, a single treatment at a first surface of the part, or at a first and a second surface of the workpiece (i.e., either one-sided or two sided treatment), is not sufficient to improve the fatigue life along the entire length of the hole. Thus, a sequential process can be used much like the stepped hole just described above with respect to FIGS. 115 through 118. However, in the present process, a single indenter, or multiple indenters of the same or substantially the same diameter, are utilized throughout the process. FIG. 119 depicts the initial process step of treating a first surface of a workpiece 3200 with the indenter I119. The dotted lines labeled 3202 shows the anticipated final hole configuration. The dimple 3203 formed by the first indentation of indenter I119 and a portion of the depth of the hole inward from the dimple 3203 are machined into the part as shown in FIGS. 120 through 121, by first drilling and then reaming the hole, or by simply machining the hole, and in any case to produce a suitable second surface 3204 for further work thereon by an indenter. The machining by drill 3209 is done to provide a uniform, though not necessarily flat, surface 3204 for the next use of the indenter I119 as shown in FIG. 122 to create dimple 3205 which is indicated in FIG. 123. Further machining produces a third surface 3206 against which indenter I119 acts. This process of alternately indenting and machining proceeds through steps until a final dimple N in a series of dimples from 1 to N, here dimple 3207, is drilled and the entire length of the hole is treated by final drill 3219. Often, final drill 3219 may desirably be slightly oversized compared to prior drills utilized in the process. The final configuration is shown in FIG. 127, where a through hole defined by edge wall 3220 is provided through workpiece 3200. Also, for convenience, normally a backing anvil 3230 is provided to avoid movement of the workpiece.

Figure 134:
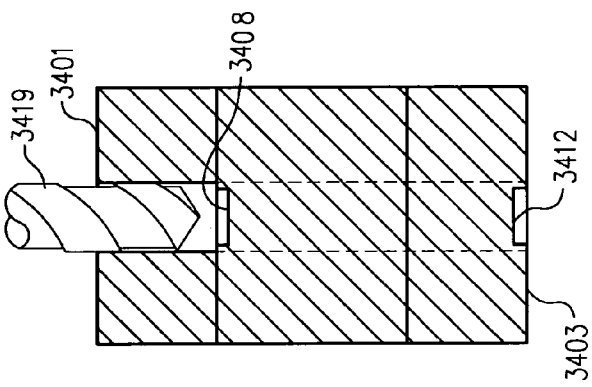
Figure 133:
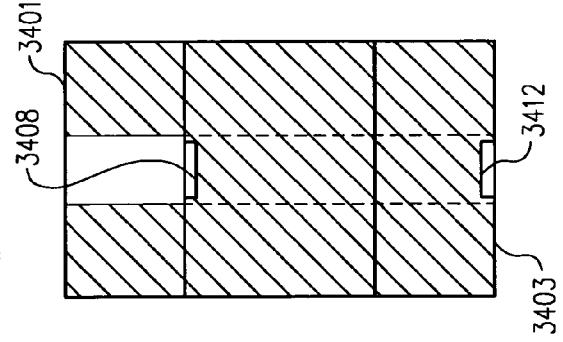
Figure 132:
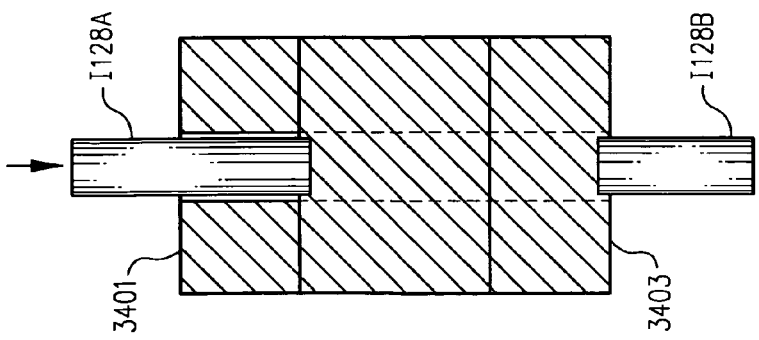

Next, attention is directed to FIGS. 128 through 131, which show the treatment of a stackup 3400 of several layers 3400A, 3400B, and 3400C of metal. While the figures show three layers, the process could be applied to any number of layers, or, alternately, a thick single workpiece could be treated in like manner. The process set forth in these FIGS. 128 through 135 is a sequential one, using differing shapes and/or sizes of indenters and, as necessary, with varying end shapes on the indenters, as required to achieve the desired residual stress. The indenters are driven to a treatment depth, suitable for a specific layer or thickness, especially in the case of a large single piece. Sequential operation is substantially similar to that just illustrated for a thick single workpiece. Indenters I128A and I128B work at obverse 3401 and reverse 3403 sides of workpiece 3400. Dimple 3402 is formed, and then machined out. Likewise, from the bottom side, dimple 3412 is formed, and then machined out. Machining is preferably done with a flat bottom or milling device 3409 that can cut a substantially flat bottom hole. After machining first dimple 3402, a first interior surface 3406 is provided, against which indenter I128A acts, forming second dimple 3408. If the fatigue enhancement profile is sufficient, then final drilling of the desired hole is performed. As indicated in FIG. 134, a final drill 3419 is used to complete the hole. The final drill 3419 is preferably of larger diameter than the earlier used bit 3409, shown in FIG 130. Thus, a final hole defined by interior sidewall 3420 is formed in workpiece 3400. Note that the final configuration of workpiece 3400 may include a countersink, step, or other such features as otherwise described herein. Also, note in FIGS. 129 and 130. for example, that in this embodiment, the indenters used in this method effectively eliminate surface upset, as shown here with respect to obverse side 3401 of workpiece 3400, and thus the thickness of workpiece 3400 is not changed except at the location where the indednter has acted.

In some cases only a portion of the hole in a thick stack needs to be treated. In those cases the intermediate and/or final indenter steps may be eliminated. This same process can be used to treat a non-through type (dead end) hole. In such instances, some of the final machining may be eliminated, yet still produce a satisfactory dead end hole configuration.

Attention is now directed to FIG. 136 which shows the uses of the method(s) described herein to treat slots and notches, such as are often encountered in turbine disks, shafts, gears (including toothed gears) and the like. The process works here by imparting residual stress in the area most needed—in this case the root of the notch or slot. The notch root 3602 of a workpiece 3600 is typically the area of highest stress concentration and thus the source of fatigue crack initiation. Indenters are used to form dimples 3601 in the workpiece 3600 in the manner generally described elsewhere herein, as to impart residual stress in the area of the notch root 3602, as indicated by residual stress lines 3603. Then, the notches or slots 3604 are machined at slot outlines 3605, to provide first slot wall 3608 and second slot wall 3610, to completely eliminate dimples 3601. The resulting residual stresses provide fatigue life in the area most needed; at the notch root. The various steps in the method are represented on a single workpiece in FIG. 136. A representative slot outline 3605 is shown in Step 1. Dimples 3601 are placed at the notch root 3602 locations in Step 2. Step 3 shows three notches which have been treated according to the method(s) set forth herein. Step 4 shows the portion of the workpiece having desirable residual stress therein, as indicated by lines 3603. In order to treat workpiece 3600, indenters may be used sequentially, or a plurality of indenters may act on the workpiece at or about the same time, or indenters can be actuated in a pattern, or set, of indenters. In any event, processing according to this method provides a set of workpieces having fatigue enhanced features, such as a gear set, a turbine rotor, a shaft end, or the like.

Importantly, the method(s) described herein can also be adapted to create large size round (see FIGS. 137–139) or non-round (see FIGS. 140–142) holes in workpieces 4000 or 4000', respectively, having fatigue enhanced properties along a bounding layer at an edgewall portion. FIGS. 137 through 142 shows how to process a large hole in a workpiece 4000 using a smaller diameter indenter with footprint defined by darkened area 4002 in FIG. 138. The indenter with footprint 4002 is used to create an overlapping pattern of dimples in an obverse 4009 or reverse 4011 (not shown) side of workpiece 4000. The overlapping pattern of dimple formation by an indenter indicated by overlapping circles 4004 creates a substantially uniform residual stress around the anticipated perimeter of the hole location as identified by broken line 4010 (FIG. 137) or 4021 (FIG. 140). In one embodiments illustrated, a plurality of dimples indicated by circles 4004 in obverse side 4009 of workpiece 4000 are provided sequentially, by working the part one portion at a time in the direction shown by arrow 4006. When a hole defined by edge wall 4012 (see FIG. 139) or by edge wall 4020 (see FIG. 142) is machined into the workpiece 4000 or 4000', the dimples just created are removed and a zone of residual stress remains in the workpiece material bounding the periphery of the hole, thereby improving the fatigue life of the final part provided from the workpiece 4000 or 4000'.

FIG. 140 is very similar to FIG. 137 except that the hole is non-circular. Thus, the same technique illustrated in FIG. 138 can be adapted to non-circular holes as well. This overlapping technique can also be used on application where a variety of hole diameters and hole shapes requiring treatment exist, but where the number of tool changes allowed by the automated machinery is low. This is quite advantageous and lowers the overall cost of implementing effective fatigue life enhancement around a bounding region of an aperture.

Finally, FIGS. 143 through 152 illustrate various aspects of alternate indenter shapes, and processing of selected workpieces with such shapes. In FIG. 143 another embodiment shows an optimized indenter I143 for use in creating desirable residual stress patterns in a workpiece to provide fatigue life improvement. In this embodiment, an indenter I143 a flat, centrally located portion 4200, a first chamfered portion 4210, and a curved blend portion 4220 are used to approximate a desirable and sufficiently effective curvature at the working end $143_E$ of the indenter I143. The proportions and exact shapes for the flat portion 4200, first chamfer portion 4210, and curved portion 4220 depend on several variables including: physical properties of the workpiece material being treated, workpiece thickness, or stack thickness and number of layers, the hole diameter, depth of indenter penetration, and indenter material. The curved portion of the indenter may be described as a constant radius, or as a parabolic shape, or as an elliptical shape, or as a hyperbolic shape, or a spline shape, or any other shape that when combined with a flat portion and/or a chamfer portion approximates a uniform pressure profile sufficiently so as to result in a residual stress profile providing an effective degree of fatigue life improvement in a workpiece. The flat, chamfer, and curved portions may be present in any desirable sequence and number. In some embodiments, one or more of these features may be non-existent. For example, broken lines 4204 illustrate the use of a chambered shoulder in the absence of a central flat 4200. Various features may optionally and preferably are connected with a blend curve, and in one embodiment, by a radiused curve such as curve portion 4220.

As an example, the dimension for an indenter I143 for working a 0.250 inch hole in a 0.250 inch thick titanium 6AI-4V mill annealed alloy plate are as follows: a flat 4200 with a radius dimension of 0.060 inches, a chamfer 4210 with a length of 0.040 inches at an angle theta (θ) of five (5) degrees from a plane normal to the indenter transverse axis (and here, the flat end 4204), and a 0.020 inch blend radius 4220. The foregoing dimensions sufficiently approximate a uniform pressure profile as described previously so that an effective residual stress is provided in the selected workpiece. For the workpiece material just identified, the desirable dimple depth for achieving a uniform residual stress profile is 0.0125 inches per side of the workpiece.

More particularly, FIG. 143 shows an indenter I143 end profile that approximates a uniform pressure profile shape. This end shape that can be more conventionally manufactured and has been shown to be effective at improving a structure's fatigue life. The shape can be described as having a centrally located flat portion with diameter that ranges in most cases from about ten (10) percent to about ninety (90) percent of the overall diameter of the indenter, although for some applications, no flat portion may be utilized, as just noted above. In many commonly encountered applications (considering especially workpiece material, thickness, and hole diameter) the flat 4200 diameter ranges from about ¼ to about ¾ of the overall diameter (2r) of the indenter I143. Moving outward from the center, a chamfered portion that has an angle, relative to the flat (or transverse axis of the indenter when no flat portion is utilized, that is, the chamfer starts at r=0), ranging from just above zero to as much as about thirty (30) degrees. For many applications (considering especially workpiece material, thickness, and hole diameter) an angle in the range of from about two (2) degrees to about ten degrees (10) may be adequate. The inside diameter dimension of the chamfered portion of the indenter starts at the outer diameter of the flat portion, in most cases ranges from ten percent to about ninety percent of the overall diameter of the indenter. The outside diameter dimension of the chamfer ranges from about twenty five (25) percent of the overall indenter diameter outward to the edge of the indenter diameter, as developed for a specific set of conditions. A varying smooth curve, or preferably a constant radius curve, blends the chamfered portion of the indenter end shape to the overall diameter of the indenter. The varying smooth curve or other blends ranges from about five (5) percent to about twenty five (25) percent of the overall diameter if the indenter.

FIG. 144 is similar to FIG. 143, but a raised, drill-centering feature 4300 has been added in this indenter I144. The drill center feature provides a drill center in a dimple, which allows a drilling tool to align itself with the center of the dimple to improve hole concentricity with the dimple, as well as to reduce drill chatter and improve the quality of the hole. The additional raised feature can be configured to conform to any selected drill geometry. The height P of the drill centering feature 4300 typically ranges from 0.020 to 0.100 inches depending on the overall indenter diameter.

The drill centering features just described may be conical, or in the form of a truncated cone, as easily seen in FIGS. 145 through 150. First, FIGS. 145 through 148 illustrate the use of two different styles of a drill aligning feature in an indenter. FIG. 145 and illustrates the setup step for two indenter end styles, wherein each of the indenter end styles includes a centering feature to create a drill aligning indentation in a workpiece 5000. Indenters I145A and I145C show the use of a conical drill aligning feature 5010. Indenters I145B and I145D both show the use of a truncated cone drill aligning feature 5020.

FIG. 146 illustrates the step of actuating the four indenters first depicted in FIG. 145, to provide displacement in the body 5002 of the workpiece 5000 to form dimples therein in order to impart desirable residual stress therein.

FIG. 147 shows a workpiece in which dimples 5030, 5032, 5034, and 5036 have been formed. Dimples 5030 and 5032 include drill centering conical indentation 5040 and 5042, respectively, for use with drill centering. Dimples 5034 and 5036 include drill centering truncated cone indentations 5044 and 5046, respectively, for use with drill centering. Each of the drill centering features have been sized and shaped to either enhance, or at least not substantially interfere with the dimples which have been formed to impart a desirable residual stress in the workpiece 5000.

FIG. 148 shows the setup step for using drill 5009 for drilling out a hole (location defined by broken lines 5050 in workpiece 5000, using the drill centering feature 5040 formed by use of the indenter I145A depicted in FIG. 145, in order to form a finished hole in the workpiece 5000.

Turning now to FIGS. 149 through 152, a relatively thick workpiece 149 is provided in which it is desired to form a relatively thin hole. FIG. 149 illustrates a setup step for treating a representative relatively thick workpiece 6000, by utilizing indenters I149A and I149B, each having a larger diameter $D_I$ than the desired final hole diameter $D_H$. The relative size and location of the desired hole being installed is illustrated in broken lines 6002. FIG. 150 shows the step of actuating indenters I149A and I149B into a relatively wide portion of the workpiece, for illustrative purposes shown as a treatment zone diameter $D_T$, to develop residual stress well beyond, laterally, the future wall of the small diameter $D_H$ of the hole to be installed in the workpiece 6000.

FIG. 151 illustrates the step of using cutters 6010 and 6012 for milling the dimple 6014 from the obverse side 6016 and/or dimple 6018 from the reverse side 6020 of the workpiece 6000 structure. Removal of dimples 6014 and 6018 provided by actuation of the indenters results a new obverse face 6016' and a new reverse face 6020', and importantly, leaves behind a large zone of desirable residual compressive stress, indicated by shaded areas 6024 and 6026 in FIG. 152. Thus, FIG. 152 shows the finished part 6000' constructed by performing machining of workpiece 6000 according to the steps illustrated in FIGS. 149 to 151. A relatively thick finished part 6000' is provided having a large zone of residual compressive stress, both through the workpiece thickness along the walls bounding of the finished hole 6030, and laterally outwardly therefrom.

It is to be appreciated that my novel processes for cold working parts to reduce fatigue stress degradation of the part, are an appreciable improvement in the state of the art of cold working metal parts subject to fatigue concerns. Importantly, the methods described herein treat the process of cold working from a new perspective, preferably by entirely treating the hole before it is machined. Thus, the methods disclosed herein provide substantial improvement over currently used treatment methods by eliminating expansion mandrels, sleeves, and hole lubricants.

In the further improved method described herein, the control of the magnitude and depth of residual stress is determined by the properties and characteristics of a particular workpiece, nature of the force imparted on the workpiece, which may be particularly and effectively accomplished via quasi-statically squeezing, actuating at a high velocity, or "exciting" with a stress wave to impart dimples in workpieces. Moreover, the processes disclosed herein are readily automated and can be put into any automated manufacturing environment. One further benefit of the process is that distortions and tears around the holes can be eliminated, unlike those anomalies experienced during expansion by mandrel methods.

Although only a few exemplary embodiments of this invention have been described in detail, it will be readily apparent to those skilled in the art that my novel methods for cold working metal, and the tooling and other apparatus for advantageously implementing such processes, may be modified from those embodiments provided herein, without materially departing from the novel teachings and advantages provided herein, and may be embodied in other specific forms without departing from the spirit or essential characteristics thereof. Therefore, the embodiments presented herein are to be considered in all respects as illustrative and not restrictive. As such, the claims are intended to cover the structures described herein and not only structural equivalents thereof, but also equivalent structures. Thus, the scope of the invention is intended to include all variations described herein, whether in the specification or in the drawing, including the broad meaning and range properly afforded to the language and description set forth herein to describe such variations.

It will thus be seen that the objects set forth above, including those made apparent from the preceding description, are efficiently attained. Since certain changes may be made in carrying out methods for coldworking of metals according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the figures of the drawing) may be combined in any combination, except combinations where at least some of the features are mutually exclusive. Alternative features serving the same or similar purpose may replace each feature disclosed in this specification (including any accompanying claims, the various figures of the drawing), unless expressly stated otherwise. Thus, each feature disclosed is only one example of a generic series of equivalent or similar features. Further, while certain materials are described for the purpose of enabling the reader to make and use certain embodiments shown, such suggestions shall not serve in any way to limit the claims to the materials disclosed, and it is to be understood that other materials, including other metals and various compositions, may be utilized in the practice of my methods, and in the manufacture of novel structures therewith.

The intention herein is to cover all modifications, equivalents, and alternatives falling within the scope and spirit of the invention, as expressed herein above and in the appended claims. As such, the claims are intended to cover the structures, apparatus, and methods described herein, and not only the equivalents or structural equivalents thereof, but also equivalent structures or methods. The scope of the invention, as described herein and as indicated by the appended claims, is thus intended to include variations from the embodiments provided which are nevertheless described by the broad meaning and range properly afforded to the language of the claims, as explained by and in light of the terms included herein, or the legal equivalents thereof.

The invention claimed is:

1. Tooling for working a structure to improve the fatigue strength at a selected location in said structure, said structure comprising a first surface, a second surface, and a body therebetween, said tooling comprising:

a first indenter, said first indenter comprising a contacting end for engagement with and deformation of a pre-selected portion of said first surface of said structure to impart a residual stress profile in said body of said structure, and wherein said contacting end of said first indenter comprises a shaped surface profile substantially conforming to a dimple shape in said first surface of said structure produced by the application of a substantially uniform pressure profile on said pre-selected portion of said first surface of said structure, and wherein said contacting end of said first indenter further comprises a surface shape defined by the equation:

$$u_z = \frac{C(4(1-v^2))}{E} P_m a \int_0^{\pi/2} \sqrt{1 - \frac{a^2}{r^2}(\sin^2\theta)}\, d\theta$$

wherein $u_z$=normal displacement of a selected surface location of said contacting end of said indenter above a flat reference plane, v=Poisson's Ratio of the material comprising said workpiece;

E=Elastic Modulus of the material comprising said workpiece;

$P_m$=contact pressure distribution that yields said workpiece;

a=radius of the contacting end of said indenter; and

θ, r=polar coordinates of a selected surface location on said contacting end of said indenter.

C=a constant ranging from 1 to 110.

2. Tooling as set forth in claim 1, further comprising a second indenter, said second indenter comprising a contacting end for engagement with and deformation of a pre-selected portion of said second surface of said structure to impart a residual stress profile in said body of said structure, and wherein said contacting end of said second indenter comprises a surface shape substantially conforming to a dimple shape in said second surface of said structure produced by the application of a substantially uniform profile on said pre-selected portion of said second surface of said structure, wherein said contacting end of said second indenter further comprises a surface shape defined by the equation:

$$u_z = \frac{C(4(1-v^2))}{E} P_m a \int_0^{\pi/2} \sqrt{1 - \frac{a^2}{r^2}(\sin^2\theta)}\, d\theta$$

wherein $u_z$=normal displacement of a selected surface location of said contacting end of said indenter above a flat reference plane;

v=Poisson's Ratio of the material comprising said workpiece;

E=Elastic Modulus of the material comprising said workpiece;

$P_m$=contact pressure distribution that yields said workpiece;

a=radius of the contacting end of said indenter;

θ, r=polar coordinates of a selected surface location on said contacting end of said indenter, and C=a constant from about 1 to about 110.

3. Tooling as set forth in claim 1, wherein said first indenter further comprises a downwardly projecting centering punch portion.

4. Tooling as set forth in claim 2, wherein said second indenter further comprises a downwardly projecting centering punch portion.

5. Tooling as set forth in claim 1, wherein said first indenter comprises a dynamic indenter, said dynamic indenter adapted for engagement of said shaped surface of said contacting end against said first surface of said structure.

6. Tooling as set forth in claim 2, wherein said second indenter comprises a second dynamic indenter, said second dynamic indenter adapted for engagement of said shaped surface of said contacting end against said second surface of said structure.

7. An apparatus for treating material bounding the location selected for creation of an opening in a workpiece, in order to provide beneficial residual stress in material bounding said opening, to thereby improve fatigue life of said workpiece, said apparatus comprising:

a support structure, said support structure adapted to securely support a workpiece;

a shaped indenter having a contacting end; and a dynamic indenter driver, said dynamic indenter driver adapted to drive said contacting end of said shaped indenter into a pre-selected surface portion of said workpiece at a velocity sufficient to cause formation of a stress wave in said workpiece in reaction to the action of said contacting end of said shaped indenter; and wherein said contacting end of said shaped indenter further comprises a surface shape defined by the equation:

$$u_z = \frac{C(4(1-v^2))}{E} P_m a \int_0^{\pi/2} \sqrt{1 - \frac{a^2}{r^2}(\sin^2\theta)}\, d\theta$$

wherein $u_z$=normal displacement of a selected surface location of said contacting end of said indenter above a flat reference plane;

v=Poisson's Ratio of the material comprising said workpiece;

E=Elastic Modulus of the material comprising said workpiece;

$P_m$=contact pressure distribution that yields said workpiece;

a=radius of the contacting end of said indenter;

θ,r=polar coordinates of a selected surface location on said contacting end of said indenter, and C=a constant from about 1 to about 110.

8. The apparatus as set forth in claim 7, further comprising an anvil, said anvil positioned in a firm backing relationship with said workpiece, said workpiece comprising an obverse and a reverse side, so that when said indenter acts on said obverse side of said workpiece, said reverse side of said workpiece is substantially supported by said anvil against movement in the direction of impact of said indenter.

9. The apparatus as set forth in claim 7, further comprising a second indenter and a second indenter driver, and an indenter driver controller, and wherein said first indenter driver and said second indenter driver are responsive to said indenter driver controller to simultaneously impact an obverse side and a reverse side of said workpiece, respectively.

10. The apparatus as set forth in claim 9, wherein said first indenter further comprises a pilot alignment guide, and wherein said second indenter further comprises a pilot alignment guide receiving portion, said pilot guide disposed through said workpiece for close interfitting engagement with said pilot guide receiving portion of said second indenter, so that during impact of said workpiece by said first indenter and said second indenter, said pilot alignment guide is received by said pilot guide alignment receiving portion.

11. The apparatus as set forth in claim 8, wherein said anvil further comprises a pilot alignment guide, and wherein said first indenter further comprises a pilot alignment guide receiving portion, said pilot guide disposed through said workpiece for close interfitting engagement with said pilot guide receiving portion of said first indenter, so that during impact of said workpiece by said first indenter, said pilot alignment guide is received by said pilot alignment guide receiving portion.

12. The apparatus as set forth in claim 7, further comprising at least one a deformable, consumable lamina disposed between said first indenter and said pre-selected surface portion of said workpiece, and wherein said consumable lamina comprises an obverse side and a reverse side, and wherein said obverse side is acted upon by said first indenter.

13. The apparatus as set forth in claim 9, further comprising a second deformable, consumable lamina disposed between said second indenter and a second pre-selected surface portion of said workpiece, and wherein said consumable lamina comprises an obverse side and a reverse side, and wherein said obverse side is acted upon by said second indenter.

14. The apparatus as set forth in claim 12 or in claim 13, wherein said obverse side of said consumable lamina further comprises a lubricant, said lubricant adapted to decrease friction between said first or said second indenter and said obverse side of said lamina.

15. The apparatus as set forth in claim 14, wherein said lubricant comprises a dry film lubricant.

16. The apparatus as set forth in claim 1, or in claim 7, wherein said indenter comprises a lubricant coated surface, said lubricant coated surface adapted to decrease friction between said indenter and workpiece.

17. The apparatus as set forth in claim 16, wherein said lubricant comprises a dry film lubricant.

18. A method of manufacturing a joint which includes overlapping at least first and second structural members, said method comprising:

(a) contacting a preselected portion of said first structural member with an indenter having a contacting end at a pressure greater than the yield point of the composition of said first structural member to deform a portion of said first structural member in a manner so as to impart a pre-selected residual stress at a location at or near a selected location for a first fastener aperture through said first structural member, and wherein said residual compressive stress is substantially uniform along the entire length of sidewall portions of said first fastener aperture and wherein said contacting end of said indenter comprises a shaped surface profile substantially conforming to a dimple shape in said pre-selected portion of said first structural member produced by the application of a pressure profile that provides an effective amount of beneficial residual compressive stress in said pre-selected portion of said first structural member;

(b) machining said first structural member to define said first fastener aperture via sidewall portions resulting from said machining;

(c) providing in said second structural member, a second fastener aperture defined by second sidewall portion; and (d) inserting a fastener through said first and said second fastener apertures.

19. The method of claim 18, further comprising the step of applying force to said fastener to seat said fastener within said first and said second fastener apertures.

20. The method of claim 19, wherein the step of seating said fastener further comprises deforming an end portion of said fastener in order to secure and retain said fastener against said first structural member.

21. Tooling for working a structure to improve the fatigue strength at a selected location in said structure, said structure comprising a first surface, a second surface, and a body therebetween, said tooling comprising:

a first indenter, said first indenter comprising a contacting end for engagement with and deformation of a pre-selected portion of said first surface and said body of said structure to impart a preselected beneficial residual stress profile in said surface and in said body of said structure, wherein said contacting end of said first indenter comprises a curved portion and or a slanted portion and has a pre-selected shaped surface profile for imparting a pre-selected dimple shape in said first surface and said body of said structure, said preselected shaped surface profile resulting in a dimple shape in said first surface which does not appreciably increase the thickness of said structure when said contacting end is engaged with said first surface, and wherein when a hole having a sidewall is installed between said first surface and said second surface of said structure, results in a substantially uniform residual compressive stress profile along said sidewall.

22. Tooling as set forth in claim 21, further comprising a second indenter, said second indenter comprising a contacting end for engagement with and deformation of a pre-selected portion of said second surface of said body of said structure to impart a pre-selected residual stress profile in said surface and in said body of said structure, and wherein said contacting end of said second indenter comprises a pre-selected shaped surface profile for imparting a pre-selected dimple shape in said second surface and said body of said structure, said preselected shaped surface profile resulting in a dimple shape in said first surface which does not appreciably increase the thickness of said structure when said contacting end is engaged with said first surface, and wherein when a hole having a sidewall is installed between said first surface and said second surface of said structure, results in a substantially uniform residual compressive stress profile along said sidewall.

23. Tooling as set forth in claim 21, wherein said first indenter further comprises a downwardly projecting centering punch portion for creating a centering feature in said first surface.

24. Tooling as set forth in claim 22, wherein said second indenter further comprises a downwardly projecting centering punch portion for creating a centering feature in said second surface.

25. Tooling as set forth in claim 21, wherein said first indenter comprises a dynamic indenter, said dynamic indenter adapted for engagement of said shaped surface of said contacting end against said first surface of said structure.

26. Tooling as set forth in claim 22, wherein said second indenter comprises a second dynamic indenter, said second dynamic indenter adapted for engagement of said shaped surface of said contacting end against said second surface of said structure.

27. Tooling for working a structure to improve the fatigue strength at a selected location in said structure, said structure comprising a first surface, a second surface, and a body therebetween, said tooling comprising:

a first indenter, said first indenter comprising a contacting end for engagement with and deformation of a pre-selected portion of said first surface of said structure to impart a residual stress profile in said body of said structure, and wherein said contacting end of said first indenter comprises a shaped surface profile substantially conforming to a dimple shape in said first surface of said structure produced by the application of a substantially uniform pressure profile on said pre-selected portion of said first surface of said structure, and wherein said first indenter comprises a dynamic indenter, said dynamic indenter adapted for engagement of said shaped surface of said contacting end against said first surface of said structure.

28. Tooling as set forth in claim 27, further comprising a backing anvil, said backing anvil adapted to firmly support said structure when said structure is subjected to engagement by said indenter, so that movement of said structure is substantially prevented in the direction of action on said structure by said dynamic indenter.

29. Tooling, as set forth in claim 27, further comprising a second indenter, said second indenter comprising a contacting end for engagement with and deformation of a pre-selected portion of said second surface of said structure to impart a residual stress profile in said body of said structure, and wherein said contacting end of said second indenter comprises a surface shape substantially conforming to a dimple shape in said second surface of said structure produced by the application of a substantially uniform pressure profile on said pre-selected portion of said second surface of said structure, and wherein said second indenter comprises a second dynamic indenter, said second dynamic indenter adapted for engagement of said shaped surface of said contacting end against said second surface of said structure.

30. A method for working a bounding portion of material in a structure, said structure comprising two or more work-pieces, said bounding portion adjacent a pre-selected location for an opening in said structure, in order to provide residual compressive stresses in said bounding portion for improving the fatigue life of said structure, said method comprising:

providing an indenter, said indenter comprising a contacting surface portion, said contacting surface portion comprising a curved portion and or a slanted portion and adapted to impact said structure at pre-selected surface locations adjacent said pre-selected location for said opening in said structure;

indenting said pre-selected surface location of said structure to provide a pre-selected amount of residual stress in said structure within said bounding portion of material.

31. The method as set forth in claim 30, further comprising removal of a selected portion of material from said structure, said selected portion of material removed from said structure having an outer border portion, said outer border portion located at or adjacent to said pre-selected surface location on said structure having been impacted by said shaped surface portion of said indenter.

32. The method as set forth in claim 30, wherein said indenter comprises a dynamic indenter.

33. The method as set forth in claim 30, wherein said opening comprises an elongated recessed portion.

34. The method as set forth in claim 31, wherein said opening comprises a through passageway.

35. The method as set forth in claim 33, wherein said elongated recessed portion further comprises a closed end portion.

36. The method as set forth in claim 31, wherein said indenter comprises a shaped indenter surface portion, said shaped indenter surface portion providing, when impacted on said workpiece at a pre-selected velocity, a pre-selected amount of permanent deformation in said workpiece sufficient to produce a shaped surface portion in said workpiece corresponding to that shape formed by indenting said pre-selected location in such workpiece material with a uniform pressure profile, and wherein said uniform pressure profile over said pre-selected location is at least as large as the yield stress pressure in said material.

37. The method as set forth in claim 31, wherein said surface portion comprises a flat surface portion.

38. A method for working a bounding portion of material adjacent a preselected location for an opening in the body of a workpiece, to create beneficial residual compressive stress in said bounding portion for improving the fatigue life of said workpiece, said method comprising:

providing an indenter, said indenter comprising a surface portion, said surface portion adapted to impact said workpiece at pre-selected surface locations adjacent said pre-selected location for said opening in said workpiece;

indenting the body of said workpiece at said pre-selected surface location of said workpiece with said indenter to provide an effective amount of beneficial residual compressive stress in said structure substantially uniformly along the bounding portion of material in said body of said workpiece;

removing from said body of said workpiece a selected portion of material, said selected portion of material removed to define a bounding portion adjacent an opening created by removal of said material, said material removed comprising at least a portion of said workpiece having been impacted by said shaped surface portion of said indenter, so that at least a portion of said bounding portion of said body of said workpiece material expands toward said opening.

39. The method as set forth in claim 38, wherein said opening comprises an elongated recessed portion.

40. The method as set forth in claim 39, wherein said elongated recessed portion further comprises a closed end portion.

41. The method as set forth in claim 38, wherein said opening comprises a through passageway.

42. The method as set forth in claim 38, wherein preselected surface location portion comprises a flat surface location.

43. The method as set forth in claim 38, wherein said workpiece comprises a section of non-uniform thickness.

44. The method as set forth in claim 38, wherein said workpiece is of uniform thickness in cross-section.

45. The method as set forth in claim 38, further comprising the step of providing an external support behind said workpiece prior to the step of indenting said workpiece, said external support positioned in a firm backing relationship with said workpiece, so that when said indenter acts on said workpiece, said workpiece is substantially supported by said external support against movement in a direction normal to the direction of impact of said indenter.

46. The method as set forth in claim 38, wherein said workpiece comprises an interior through passageway defined by an interior edge wall, and wherein the method further comprises the step of providing an internal support adjacent said interior edge wall to resist deformation of said workpiece during the step of indenting said workpiece.

47. The method as set forth in claim 38, wherein said workpiece comprises an interior through passageway defined by an interior edge wall, and wherein after the step of indenting said workpiece, the method further comprises the step of trimming a portion of said workpiece adjacent said interior edge wall.

48. The method as set forth in claim 38, wherein said workpiece comprises a plurality of locations at which openings are to be placed, and wherein the step of indenting said workpiece is performed at said each of said locations simultaneously.

49. The method as set forth in claim 38, wherein said workpiece comprises a plurality of locations at which openings are to be placed, and wherein the step of indenting said workpiece is performed at said each of said locations sequentially.

50. The method as set forth in claim 38, wherein the step of indenting and the step of removing material from said workpiece are each performed two or more times.

51. The method as set forth in claim 50, further comprising a subsequent step of removing sufficient material from said workpiece to form a finished passageway defined by a finished wall edge portion.

52. The method as set forth in claim 48, wherein said step of simultaneously indenting said workpiece comprising acting on an obverse and on a reverse side of said workpiece.

53. The method as set forth in claim 50, wherein the first removal step comprising removing material to form a first hole portion having a dead end portion in said workpiece a first diameter, and wherein a subsequent indentation step comprising acting said indenter against said dead end portion of said first hole portion.

54. The method as set forth in claim 53, further comprising, after the step of acting said indenter against said dead end hole the step of removing material to form a second hole portion in said workpiece, said second hole portion of a second diameter, wherein said second diameter is smaller than said first diameter of said first hole portion.

55. A method for working a bounding portion of material in a structure, said structure comprising two or more workpieces, said bounding portion adjacent a pre-selected location for an opening in said structure, in order to provide residual compressive stresses in said bounding portion for improving the fatigue life of said structure, said method comprising:

providing an indenter, said indenter comprising a shaped surface portion, said shaped surface portion adapted to impact said structure at pre-selected surface locations adjacent said pre-selected location for said opening in said structure, said shaped surface portion having at least in part a shaped surface profile effectively approximating to a dimple shape in a first surface of said structure produced by the application of a substantially uniform pressure profile on at least one pre-selected location of said first surface of said structure;

indenting said pre-selected surface location of said structure to provide a pre-selected amount of residual stress in said structure toward said bounding portion of material;

removing a selected portion of material from said structure, said selected portion of material removed from said structure having an outer border portion, said outer border portion located at or adjacent to said pre-selected surface location on said structure having been impacted by said shaped surface portion of said indenter, so that said bounding portion of material expands transversely to said outer border portion of said selected portion of material removed from said structure.

56. The method as set forth in claim 55, wherein said opening comprises a through passageway.

* * * * *